United States Patent
Kondoh et al.

[19]

[11] Patent Number: 5,976,214
[45] Date of Patent: Nov. 2, 1999

[54] SLIDE MEMBER OF SINTERED ALUMINUM ALLOY AND METHOD OF MANUFACTURING THE SAME

[75] Inventors: Katsuyoshi Kondoh; Yoshishige Takano, both of Itami, Japan

[73] Assignee: Sumitomo Electric Industries, Ltd., Osaka, Japan

[21] Appl. No.: 08/571,903

[22] PCT Filed: Apr. 13, 1995

[86] PCT No.: PCT/JP95/00720

§ 371 Date: Dec. 13, 1995

§ 102(e) Date: Dec. 13, 1995

[87] PCT Pub. No.: WO95/28505

PCT Pub. Date: Oct. 26, 1995

[30] Foreign Application Priority Data

Apr. 14, 1994 [JP] Japan ..................................... 6-101850
Sep. 26, 1994 [JP] Japan ..................................... 6-229644

[51] Int. Cl.$^6$ .............................. C22C 1/04; C22C 21/00; B22F 3/12; B22F 3/24
[52] U.S. Cl. ................................. 75/244; 75/249; 419/13; 419/28; 419/38; 419/45; 419/57
[58] Field of Search ................................. 419/13, 18, 38, 419/45, 57; 75/244, 249

[56] References Cited

U.S. PATENT DOCUMENTS

| 5,328,878 | 7/1994 | Kuszyk et al. | 501/96 |
| 5,409,661 | 4/1995 | Imahashi et al. | 419/10 |
| 5,478,418 | 12/1995 | Miura et al. | 148/438 |
| 5,516,734 | 5/1996 | Kuszyk et al. | 501/98 |
| 5,543,371 | 8/1996 | Katayama et al. | 501/97 |

*Primary Examiner*—Daniel J. Jenkins
*Attorney, Agent, or Firm*—W. F. Fasse; W. G. Fasse

[57] ABSTRACT

A slide member of a sintered aluminum alloy includes a matrix (1) formed of an aluminum alloy powder, and aluminum nitride films (2) dispersed along old, i.e. former original, powder grain boundaries of this matrix. When a state in which the aluminum nitride films (2) completely continuously enclose the peripheries of the old powder grain boundaries is defined as a dispersion ratio of 100%, the present aluminum nitride films (2) are discontinuously dispersed at a dispersion ratio of not more than 80%. A powder compact consisting of rapidly solidified aluminum alloy powder is heated and held in a nitrogen gas atmosphere, thereby facilitating reaction between aluminum and nitrogen through an exothermic phenomenon following deposition of elements solidly dissolved in the aluminum alloy, for forming aluminum nitride films dispersed on the aluminum alloy powder grain surfaces.

33 Claims, 15 Drawing Sheets

DISPERSION RATIO OF AlN FILMS: 100%

DISPERSION RATIO OF AlN FILMS: 80%

GROOVE SHAPE: FORWARD END ANGLE 45°, DEPTH 1.5 mm
ALLOY COMPOSITION: Al - 25Si - 3.5Fe - 3.5Ni - 1 Mg (WEIGHT %)
AlN AMOUNT: 15 WEIGHT %
SAMPLE SHAPE: LENGTH 42mm x WIDTH 15mm x THICKNESS 4mm

ALLOY COMPOSITION: Al - 25Si - 3.5Fe - 3.5Ni - 1 Mg (WEIGHT %)
AlN AMOUNT: 15 WEIGHT %
SAMPLE SHAPE: LENGTH 42mm x WIDTH 15mm x THICKNESS 4mm (x 1000)

(x 1000)

(x 1000)

{ ROTOR: Al-17Si-5Fe-3.5Cu-1Mg POWDER ALLOY
CYLINDER: A390 INGOT MATERIAL (T6 HEAT TREATMENT)

(x 1000)

ered metal carbide compared to those in the conventional SLIDE MEMBER OF SINTERED ALUMINUM ALLOY AND METHOD OF MANUFACTURING THE SAME

TECHNICAL FIELD

The present invention relates to a slide member of a sintered aluminum alloy and a method of manufacturing the same, and more particularly, it relates to a slide member of a sintered aluminum alloy which has high strength, high hardness characteristics, and is further excellent in wear resistance and to a method of manufacturing the same.

Slide members of sintered aluminum alloys are typically parts for compressors such as a vane, a shoe and a side plate, and slide parts such as an oil pump rotor. In the slide member of a sintered aluminum alloy according to the present invention, aluminum nitride films which are formed by a direct nitriding method are strongly bonded with an aluminum alloy matrix and dispersed, whereby the slide member exhibits excellent wear resistance and an excellent frictional sliding property. Therefore, no surface treatment such as Ni-P plating or ferrous thermal spraying is necessary.

BACKGROUND

In general, a ferrous material is employed for a part for a compressor or a part for an oil pump. In the case of the ferrous material, however, its weight comes into question. Particularly when the ferrous material is employed for a member such as a vane or a rotor which slides at a variable speed or high speed, inertial force or centrifugal force during acceleration or deceleration following sliding and rotation are increased in proportion to the mass. Further, these forces are increased in proportion to the square of an angular speed of rotation. In order to attain a high speed using a ferrous material, therefore, the overall appliance or apparatus must be increased in size and must be extremely strongly manufactured. In addition, there is an apprehension that the efficiency of the apparatus itself is reduced.

Thus, a low specific gravity material has been watched with interest. Magnesium, which is the lightest material, cannot attain matching with peripheral members since its thermal expansion coefficient is too large. Further, it cannot withstand employment as a slide member due to low hardness or low strength.

Then, employment of a lightweight aluminum alloy has been studied. In order to reduce thermal expansion and improve wear resistance in the aluminum alloy, it has been attempted by various manufacturing methods to add mainly Si in a large amount.

First, adding Si by means of an ingot technique such as fusion casting, fusion rolling, continuous casting or the like has been studied, while no satisfactory slide member has been obtained only by dispersion of Si primary crystals. Namely, it has been impossible to provide a slide member which can substitute for a ferrous material unless surface treatment such as hard alumite treatment or Ni-P plating is carried out. Particularly in the case of a vane for a compressor which is subjected to a high speed or a high load and used under a severe sliding condition such as a substitutional florocarbon atmosphere, abrasion damage or seizure takes place. After all, it has been impossible to obtain a wear resistant slide member which can withstand a severe environment even if Si is mainly added in a large amount by means of an ingot technique such as fusion casting, fusion rolling or continuous casting.

Then, an attempt has been made to increase amounts of addition of alloy components of transition metal elements such as Fe, Ni, Cr and the like by improving the solidification rate of the fusion casting method. However, the amounts of metal elements which can form fine intermetallic compounds by being bonded with aluminum are limited. Namely, the limit for the total amount of transition metal elements is about 4 weight %, in order to improve wear resistance without deteriorating strength and toughness in case of dispersing fine intermetallic compounds of an Fe, Ni or Fe—Ni aluminide. If the elements are added in excess of this amount, coarse crystallized substances or deposits are formed at the solidification rate of the fusion casting method, to deteriorate the strength.

When elements of Zr, Ti, Mo and V are added, a matrix is hardened by fine deposits and hence wear resistance can be further improved. When the fusion casting method is employed, however, reduction of the strength is caused if the total sum of the amounts of addition thereof exceeds 1 weight %. It is difficult to add the elements such as Fe, Ni, Mo, Ti, Zr, V and the like in practice due to a problem of segregation in the molten metal and the like, and it has been impossible to implement an aluminum alloy which is so excellent in wear resistance that this aluminum alloy can substitute for a ferrous material with no surface treatment, even if the same are added simultaneously with Si.

In powder metallurgy, on the other hand, it is possible to obtain dispersion-strengthened alloy powder which is fine and has a homogeneous structure by adding the aforementioned transition metal elements in large amounts simultaneously with a large amount of Si by employing a rapid solidification method. If rapidly solidified aluminum alloy powder is employed as a raw material and solidified by powder metallurgy, it becomes possible to prepare a high silicon containing aluminum alloy or a high transition element containing aluminum alloy, which has been impossible to obtain in a fusion method. When fine crystallized substances and deposits thereof are homogeneously dispersed in a matrix, further, wear resistance is improved. It is known that the structure is further refined by increasing the solidification rate for the raw material powder and excellent characteristics are attained in this case.

For example, Japanese Patent Application No. 62-59684 (Japanese Patent Laying-Open No. 1-132734) "Aluminum Alloy for Vane Material", discloses a known material for a vane of an aluminum alloy employing rapidly solidified aluminum alloy powder. However, a satisfactory result has not been attained also in the case of employing such rapidly solidified aluminum alloy powder. In a present rotary compressor for a car air conditioner, switching from the conventional fluorocarbon medium to a substitutional florocarbon medium represented by R134a is in progress. Consequently, the frictional sliding environment between a vane and a cylinder case and between the vane and a rotor in the compressor is more severe due to reduction of the lubrication performance of a solvent. Consequently, abrasion damage and a seizure phenomenon readily take place in the powder aluminum alloy disclosed in Japanese Patent Application No. 62-59684, and further improvement has been awaited as a material for a vane.

As another method of improving wear resistance and seizure resistance of an aluminum alloy, development of a composite material in which hard grains such as ceramic or whisker short fiber are dispersed in an aluminum alloy has been studied.

In Japanese Utility Model Application No. 59-141396 (Japanese Utility Model Laying-Open No. 61-55188) "Vane for Rotary Compressor", for example, the following method has been proposed: SiC, $Al_2O_3$ and $Si_3N_4$ are selected as hard grains, and 3 to 30 volume % of these hard grains are added and mixed into Al—Si—Fe alloy powder, and a green compact is prepared by cold isostatic pressing (CIP). Thereafter the composite material is solidified by hot extrusion, and this composite material is positioned on a forward end portion of a vane which is under more severe frictional sliding conditions.

Further, Japanese Patent Application No. 59-169016 (Japanese Patent Publication No. 5-33298) "vane" discloses means of mixing 2 to 7 weight % of ceramic of SiC or $Si_3N_4$ of 5 to 50 $\mu$m in grain size into Al—Si alloy powder, solidifying this mixture and applying the same to a vane. Japanese Patent Application No. 1-290696 (Japanese Patent Laying-Open No. 3-151589) "Composite Vane for Compressor and Method of Manufacturing the Same" discloses means of mixing 1 to 30 volume % of ceramic such as SiC, $Al_2O_3$, $K_2Pi_4O_2$ or the like in the form of whiskers or grains to Al—6 to 16 weight % Si alloy powder, solidifying the mixture and applying the same to a forward end portion of a vane.

Further, Japanese Patent Application No. 60-8894 (Japanese Patent Publication No. 6-96188) "Fiber-Reinforced Metal Composite Material" discloses an aluminum alloy prepared by forming a matrix of a hyper-eutectic Al—13 to 30 weight % Si alloy and making this matrix contain 5 to 15 volume % of alumina fiber or aluminasilica fiber of not more than 10 $\mu$m in mean diameter.

Further, Japanese Patent Application No. 4-280543 (Japanese Patent Laying-Open No. 5-311302) "Low-Frictional Aluminum Alloy Excellent in High-Temperature Strength and Wear Resistance" discloses an aluminum alloy having a matrix of an Al—10 to 25 weight % Si—5 to 20% Ni—1 to 5% Cu alloy, which is improved in wear resistance and seizure resistance by mixing and molding powder or whisker fiber of a nitride, a boride, an oxide, a carbide or the like into the same.

In every ceramic dispersed aluminum alloy or fiber-reinforced aluminum alloy proposed in the aforementioned manner, however, abrasion damage and seizure of an A390 ingot aluminum alloy of a cylinder case member and an Al—Si—Fe powder alloy of a rotor material readily take place in evaluation of durability wear resistance under unprecedentedly severe substitutional fluorocarbon environment, and further improvement has been demanded. The cause for this is conceivable as follows: The added ceramic is extremely hard and has an effect of remarkably improving heat resistance and hardness by being composed with the aluminum alloy. However, the hard ceramic is weak in adhesion in the interface between the same and the matrix, and hence the ceramic may seperate fall out or away from the matrix during sliding. In this case, the ceramic serves as an abrasive along the sliding surface and hence the vane of the ceramic dispersed aluminum alloy itself is readily worn while seizure to the counter material is readily caused by a new sliding surface. Further, it wears the counter material too.

In the aforementioned method, further, there have been a problem of economy, and a problem of production factors and the like since the high-priced ceramic is employed and the so-called two-layer structurization is carried out on the forward end portion and the plate type portion through different materials.

To this end, development of a vane of an aluminum alloy in substitutional fluorocarbon has been studied. As the result, a method of forming a hard plating layer or a plating layer containing a self-lubricant component on an outer peripheral portion of a vane and a method of forming an ion plating film consisting of a mixed phase of a metal and a nitride are employed at present in view of improving wear resistance and seizure resistance. For example, Japanese Patent Application No. 61-311256 (Japanese Patent Laying-Open No. 63-167092) "Vane Type Compressor" discloses means of forming an ion plating film of titanium nitride on a forward end portion of a vane which is made of an Al—Si alloy and forming an electric plating layer mainly composed of iron on its side surface. Japanese Patent Application No. 63-288508 (Japanese Patent Laying-Open No. 2-136586) "Vane Type Compressor" discloses means of providing a plating layer mainly composed of iron or nickel on a side surface of a vane of an aluminum alloy.

Further, Japanese Patent Application No. 62-186826 (Japanese Patent Laying-Open No. 64-32087) "Vane Type Compressor" discloses means of providing an electrolytic or electroless Ni—P plating layer on an outer surface of a vane which is made of an Al—Si alloy. Japanese Patent Application No. 3-82405 (Japanese Patent Laying-Open No. 4-314868) "Slide Member" discloses means of improving wear resistance and seizure resistance by forming an Ni—P plating or Ni—P/BN or SiC composite plating layer on a surface of a vane of an aluminum alloy.

When surface coating treatment is performed, however, it is necessary to first carry out rough working (primary working) of the surface of the vane material for ensuring dimensional accuracy for providing a surface treated coat. Then, it is necessary to carry out high-priced surface treatment (pretreatment, as the case may be). In a vane requiring further strict dimensional accuracy, finish working (secondary working) by polishing, grinding, etc. is finally required. In the current method of manufacturing a vane of an aluminum alloy requiring a number of steps of primary working→pretreatment→surface treatment→secondary working for finishing a final product from the material of the aluminum alloy, therefore, omission of the surface treatment is the most important subject in view of economy. If the surface treated layer is separated during employment, the vane immediately loses its reliability, as a matter of course.

SUMMARY OF THE INVENTION

An object of the present invention is to provide a slide member of a sintered aluminum alloy which has high strength and high hardness characteristics, and is excellent in wear resistance.

Another object of the present invention is to provide a method capable of manufacturing a slide member of a sintered aluminum alloy which has high strength and high hardness characteristics and is excellent in wear resistance without carrying out surface treatment such as Ni—P plating or thermal spraying efficiently with high economy.

The inventors, by carrying out various experiments and studies have discovered that a slide member of a sintered aluminum alloy which is excellent in wear resistance and seizure resistance can be manufactured by a method which is excellent in economy without carrying out surface treatment. A slide member of a sintered aluminum alloy obtained according to the present invention can be sufficiently used as a vane for a rotary compressor which is employed under a substitutional fluorocarbon environment, for example, having more strict sliding conditions.

In one aspect, the slide member of a sintered aluminum alloy according to the present invention is obtained by molding and sintering aluminum alloy powder, and includes a matrix of the aluminum alloy, and aluminum nitride films which are dispersed along old, i.e. former or original powder grain boundaries of this matrix. Assuming that a state in which the aluminum nitride films completely continuously enclose the peripheries of the old powder grain boundaries defines a dispersion ratio of 100%, the aluminum nitride films according to the invention are discontinuously dispersed at a dispersion ratio of not more than 80%.

Preferably, the aluminum alloy powder is powder which is rapidly solidified at a solidification rate of at least $10^{2°}$ C./sec. Further, the slide member is typically a vane material for a compressor.

Preferably, the thickness of the aluminum nitride films is not more than 2 $\mu$m. Assuming that the overall sintered aluminum alloy is 100 weight %, the content of the aluminum nitride films is at least 5 weight % and not more than 25 weight %.

In a preferred embodiment, the matrix contains at least 10 weight % and not more than 30 weight % of Si, at least 2 weight % and not more than 6 weight % of Fe, at least 2 weight % and not more than 6 weight % of Ni, and at least 0.05 weight % of Mg, with the rest of Al and unavoidable impurities, assuming that the overall aluminum alloy matrix excluding the aluminum nitride films is 100 weight %.

Preferably, a relational expression of $15\% \leq W_{si} + W_{A1N} \leq 50\%$ is satisfied assuming that the content of Si in the sintered aluminum alloy is $W_{si}$ on the basis of weight and the content of aluminum nitride is $W_{A1N}$ on the basis of weight. Preferably, the maximum grain size of Si crystals in the sintered aluminum alloy is not more than 15 $\mu$ and the mean grain size is not more than 10 $\mu$m.

In the preferred embodiment, the matrix of the aluminum alloy contains Fe and Ni. A relational expression of $0.8 \leq W_{Fe}/W_{Ni} \leq 1.25$ is satisfied assuming that the content of Fe in the matrix is $W_{Fe}$ on the basis of weight and the content of Ni is $W_{Ni}$ on the basis of weight.

Preferably, spherical intermetallic compounds of $Al_9FeNi$ of not more than 5 $\mu$m in mean grain size are dispersed in the sintered aluminum alloy. More preferably, the sintered aluminum alloy has a true density ratio of at least 97%, hardness (HR-A) of at least 55, transverse rupture strength of at least 600 MPa, and a thermal expansion coefficient of at least $12 \times 10^{-6}$/° C.

In another aspect, the slide member of a sintered aluminum alloy according to the present invention is characterized by the following feature. Namely, a sintered body in which aluminum nitride is dispersed and formed on the surface and the interior is formed by heating and holding a powder compact consisting of aluminum alloy powder which is rapidly solidified at a solidification rate of at least $10^{2°}$ C./sec., and this sintered body is solidified by hot forging or hot extrusion. Films of aluminum nitride are formed on surfaces of aluminum alloy grains by nitriding of the powder compact, whereby aluminum nitride is dispersed and present on the surface and in the interior of the sintered body upon formation of the sintered body.

In a preferred embodiment, the hardness (HR-A) of the slide member of an aluminum alloy is at least 55, and transverse rupture strength is at least 600 MPa.

In one embodiment, the aluminum alloy powder contains 3 to 40 weight % of Si, and the maximum grain size of Si crystals in the sintered body is not more than 15 $\mu$m, and the mean grain size is not more than 10 $\mu$m.

In another embodiment, the aluminum alloy powder contains 2 to 7.5 weight % of Fe and 2 to 7.5 weight % of Ni. In the sintered body, spherical intermetallic compounds of $Al_9FeNi$ of not more than 5 $\mu$m in mean grain size are dispersed and present.

In one aspect, a method of manufacturing a slide member of a sintered aluminum alloy according to the present invention comprises a step of forming a powder compact by pressure-molding rapidly solidified aluminum alloy powder, a step of facilitating reaction between aluminum and nitrogen through an exothermic phenomenon following deposition of elements which are solidly dissolved in the aluminum alloy by heating and holding the powder compact in a nitrogen gas atmosphere for forming aluminum nitride on surfaces of the aluminum alloy powder grains, and a step of solidifying the sintered body by hot forging or hot extrusion.

Preferably, the aluminum alloy powder employed as a starting material is powder which is rapidly solidified at a solidification rate of at least $10^{2°}$ C./sec. In a preferred embodiment, the step of forming aluminum nitride on the surfaces of the aluminum alloy powder grains and the step of sintering the powder compact progress at the same time.

In one embodiment, components of the aluminum alloy powder employed as the starting material are expressed in a general formula Al—a.Fe—b.Ni, and composition weight ratios thereof satisfy a: 2 to 7.5%, b: 2 to 7.5%, rest: Al and unavoidable impurities, and $0.8 \leq a/b \leq 1.25$.

In another embodiment, components of the aluminum alloy powder employed as the starting material are expressed in a general formula Al—a.Si—b.Fe—c.Ni, and composition weight ratios thereof satisfy a: 3 to 40%, b: 2 to 7.5%, c: 2 to 7.5%, rest: Al and unavoidable impurities, and $0.8 \leq b/c \leq 1.25$.

In still another embodiment, at least one element selected from a group consisting of Cr, Ti, Mo, Zr and V is added into the aluminum alloy powder in a range of not more than 5% on the basis of weight.

In a further embodiment, at least one element selected from a group consisting of C, BN, $MoS_2$ and $CaF_2$ is added into the aluminum alloy powder in a range of not more than 5% on the basis of weight.

In a further embodiment, Cu is added in a range of 0.4 to 8.0% on the basis of weight, and/or Mg is added in a range of 0.5 to 1.5% on the basis of weight into the sintered aluminum alloy powder.

In a further embodiment, the aluminum alloy powder employed as the starting material has fluidity satisfying conditions of not more than 60 seconds/50 g in an orifice tube of 4 mm$\phi$.

In a further embodiment, the step of forming a powder compact includes a step of solidifying the aluminum alloy powder to be 50% to 80% in true density ratio by cold stamp molding. The aluminum nitride forming step and the step of sintering the powder compact include steps of heating and holding the powder compact in nitrogen gas atmospheres of temperatures of 500° C. to 570° C. for at least 30 minutes. The solidification step by hot forging or hot extrusion includes a step of making the true density ratio of the sintered body at least 97%.

In a further embodiment, the method further comprises a step of heating the sintered body to 400° C. to 500° C. in advance of the solidification step by hot forging or hot extrusion.

In a further embodiment, the method comprises a step of performing solution heat treatment on the sintered body at a temperature of 300° C. to 500° C. for 0.5 to 4 hours after the solidification step by hot forging or hot extrusion. In this case, the method preferably comprises a step of carrying out aging treatment on the sintered body at not more than 200° C. after the solution heat treatment step.

In a further embodiment, the method comprises a step of forming a groove on a pressurized surface of the sintered body in case of solidifying the sintered body by hot forging. The sectional shape of the groove is preferably a V shape. More preferably, the method further comprises a step of rupturing the sintered body along the groove by applying a shearing load or a bending load onto the pressurized surface of the solidified said sintered body.

Preferably, the step of forming aluminum nitride films on the surfaces of the aluminum alloy powder grains and the step of sintering the powder compact are simultaneously carried out in a nitrogen atmosphere which is controlled in a temperature range of 500 to 570° C., so that aluminum nitride films of at least 5% and not more than 25% on the basis of weight are discontinuously dispersed along the old powder grain boundaries in the aluminum alloy sintered body.

The true density ratio of the sintered body after hot forging or hot extrusion is at least 97%.

In one embodiment, components of the aluminum alloy powder employed as the starting material are expressed in a general formula Al—a.Si—b.Fe—c.Ni—d.Mg, and composition weight ratios thereof satisfy a: 10 to 30%, b: 2 to 6%, c: 2 to 6%, d: at least 0.05%, rest: Al and unavoidable impurities, and $0.8 \leq b/c \leq 1.25$.

Figure 1:
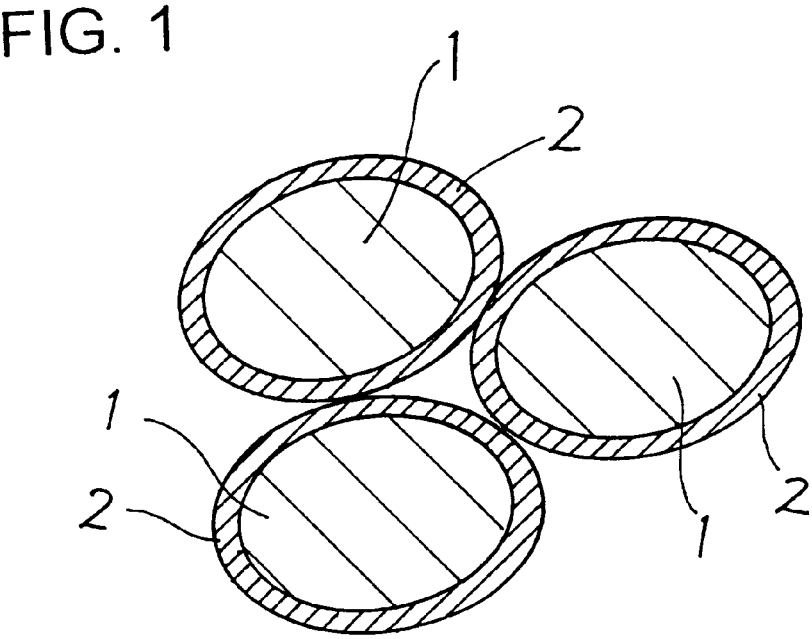
FIG. 1 is a diagram showing a state in which the dispersion ratio of aluminum nitride films is 100%.

DETAILED DESCRIPTION OF PREFERRED EMBODIMENTS AND OF THE BEST MODE OF THE INVENTION (1) Outline Up to Development of the Invention A slide member of a sintered aluminum alloy obtained according to the present invention has excellent wear resistance, and can be applied to a frictional sliding part. A vane for a rotary compressor, which is one possible frictional sliding part, used under severe sliding conditions, is illustratively used here, to give an outline up to the present invention.

When a vane material, for example, is formed by a conventional ceramic dispersed or fiber-reinforced aluminum alloy which is not subjected to surface treatment such as hard plating or thermal spraying and this is employed for a compressor in practice, the following problems are caused. Namely, in the first place, hard phases of ceramic grains or whisker fiber which are added and dispersed in an alloy matrix for improving wear resistance and seizure resistance fall out during sliding, to cause abrasion-damage of the vane material itself and the counter material.

When, in the second place, the content of the ceramic which is added for improving wear resistance and seizure resistance is increased, the following problem is caused. Namely, mechanical characteristics of the aluminum alloy are reduced since bondability at the interfaces between the ceramic dispersed in the old powder grain boundaries and the aluminum matrix is weak. Further, the thermal expansion coefficient of the aluminum alloy is reduced and difference in thermal expansion coefficient between a rotor member or a cylinder case member forming the compressor and the vane material is increased, to induce efficiency reduction of the compressor caused by the difference in thermal expansion coefficient in high-temperature driving in the vicinity of 150° C. as the result. Thus, the conventional hard grain dispersed type wear resistant aluminum alloy cannot satisfy wear resistance, further cannot satisfy mechanical characteristics required as a vane material, and further cannot solve the problem caused by the difference in thermal expansion coefficient.

The inventors have carried out various types of abrasion tests for evaluating wear resistance, seizure resistance and attackability of aluminum alloys, and discovered that aluminum nitride (AlN) is proper as hard phases to be dispersed in an alloy matrix as the result. In the powder metallurgy of simply adding and mixing this AlN as grains or whisker fiber similarly to the conventional case, however, AlN falls from the matrix during sliding since adhesion in the interfaces between the matrix (Al) and AlN is weak as described above.

Then, the inventors have sought after the possibility of forming AlN films on the powder grain surfaces by direct reaction of nitrogen gas (N) and aluminum (Al) not by adding and mixing AlN powder into the aluminum alloy powder but by heating the aluminum alloy powder in a nitrogen gas atmosphere in view of suppressing the falling out of the hard phases during sliding. As the result of energetically making experiments and studies, the inventors have established a method of forming AlN films on surfaces of aluminum alloy powder grains by direct reaction between Al and nitrogen gas and finally homogeneously dispersing AlN in an aluminum alloy sintered body.

The feature of the present invention resides in that rapidly solidified aluminum alloy powder is employed as raw material powder. Preferably, the aluminum alloy powder is rapidly solidified at a solidification rate of at least $10^{2°}$ C./sec.

In aluminum alloy powder in which various types of elements are forcibly solidly dissolved in a matrix in a large amount by a rapid solidification method, an exothermic phenomenon is caused when the solidly dissolved elements are deposited. The inventors have noted this exothermic phenomenon. Namely, the inventors have discovered that it is possible to manifest or facilitate the aforementioned direct nitriding reaction (Al+N→AlN) when the aluminum alloy powder is heated in a relatively low temperature range through a self exothermic phenomenon.

The AlN films which are formed in the powder in the aforementioned method strongly adhere to Al of the matrix, and such a problem that AlN falls from the matrix in sliding is completely solved. Since the powder is heated in the relatively low temperature range (500 to 570° C.) which does not cause coarsing of the rapidly solidified structure, whereby a fine structure originally provided in the raw material powder can be maintained and a wear-resistant sintered aluminum alloy having both of high strength and high hardness characteristics can be obtained.

In the aforementioned direct nitriding method, impurity oxygen (O) contained in the nitrogen gas atmosphere, or oxygen in aluminum oxide films on the powder grain surfaces broken by heat generation is bonded with AlN in a process of formation of AlN by nitriding reaction, to form AlN (AlON) containing oxygen. When such AlN containing impurity oxygen is formed in the sintered body, heat conductivity of the sintered aluminum alloy is so reduced that frictional heat arising during driving readily entirely heats up the vane as the result, and softens the material to cause strength reduction. Further, mismatching at the interfaces between the AlN films and the matrix is caused to such an extent that the AlN films fall from the matrix during sliding as the result.

With respect to such a problem, the inventors have discovered that it is effective to prove an extremely small amount of Mg contained in the aluminum alloy powder. Namely, an extremely small amount of Mg of about 0.05 weight % is preferably contained in the aluminum alloy powder in the present invention. Then, Mg is preferentially reacted with oxygen (O), and inhibits such reaction whereby oxygen is bonded with AlN to form AlON in the process of formation of AlN. A preferred embodiment of the present invention is characterized in that AlN containing no oxygen is formed by containing an extremely small amount of Mg.

A slide member consisting of an AlN dispersed aluminum alloy is manufactured in the following manner. Rapidly solidified aluminum alloy powder and solid lubricant components which are added as needed are homogeneously mixed with each other and a green compact having porosity of 20 to 50% is prepared by stamping or molding of this mixed powder. When this green compact is thereafter heated and held in a nitrogen gas atmosphere which is maintained in a temperature range of 500 to 570° C., AlN films of 3 to 40 weight % are formed along old powder grain boundaries of the sintered body in a discontinuously dispersed manner simultaneously with sintering of the green compact.

In order to ensure mechanical characteristics suitable as a vane material, the following method is effective. A sintered body in which aluminum nitride films are discontinuously dispersed along old powder grain boundaries is again heated at 400° C. to 500° C. Thereafter a region of an aluminum alloy in a matrix is plastically deformed in this sintered body by hot forging thereby closing holes in the sintered body and solidifying the same to be at least 97% in true density ratio for improving strength of the sintered aluminum alloy.

In order to further improve productivity and economy in the method of manufacturing the vane material, preferably the green compact is solidified by hot forging immediately after the same is sintered in nitrogen gas. In such a method, the aforementioned re-heating step can be omitted. It is possible to reduce the nitriding treatment time by making the nitrogen gas atmosphere not a normal pressure but a pressurizing atmosphere, and improvement of economy is enabled.

While it is possible to make the slide member of the sintered aluminum alloy exhibit target performance by hot extrusion, hot forging described later is more preferable in order to manufacture a vane material having a strip shape under more excellent productivity.

In the sintered aluminum alloy of the present invention, it is possible to improve mechanical characteristics at the normal temperature e.g. room temperature and in a temperature range of about 150° C. by conventional heat treatment (T4 treatment or T6 treatment etc., for example) by adding a proper amount of Cu.

(2) Method of Forming Aluminum Nitride

The feature of the present invention resides in that aluminum and nitrogen gas are reacted with each other to form and disperse aluminum nitride (AlN) in a sintered aluminum alloy. In relation to direct nitriding reaction, some experiments and studies have heretofore been made. While the outline of the conventional methods is described below, there are problems in all these conventional methods in points of productivity and economy, and those materials obtained by the methods are improper in performance as slide members such as vanes.

"Synthesis of High Purity AlN by Nitridation of Li-Doped Al—Melt" (J. of the European Ceramic Society 6 (1990) 237–242) discloses that direct nitriding reaction of Al (solid)+N (gas)→AlN (solid) at 580° manifests in theory from thermodynamic reaction. However, direct nitriding reaction is neither theoretically nor experimentally confirmed at temperatures less than 580° C. The mean grain size of aluminum powder employed in this prior art is 18 $\mu$m. When aluminum powder having such a small mean grain size is made a starting material, the productivity will be extremely disadvantaged in mass production steps based on general powder metallurgy.

"Various Synthesizing Methods for Aluminum Nitride Powder" (Nihon Kinzoku Gakkai Kaiho Vol. 29, No. 7 (1990)) discloses a direct nitriding method of forming AlN by heating Al powder in nitrogen gas in a temperature range of 1150° to 1550° C. According to this method, however, high temperature sintering of 1150° C. to 1550° C. is necessary. When rapidly solidified aluminum alloy powder is employed, therefore, it is predicted that the fine structure of the powder is disrupted and becomes a coarse structure, and the advantages characteristics of the alloy are extremely reduced. Further, an oxide coating of the aluminum alloy powder of the raw material suppresses nitriding reaction on the powder grain surfaces, and hence extreme reduction of 0.05 weight % is required in relation to the oxygen content of Al powder described in this prior art. Consequently, a specific oxidation suppression mechanism is required in steps of preparing the powder. Therefore, the cost for the raw material powder is increased as the result, to cause a problem in economy.

In a method of preparing a sintered aluminum alloy disclosed in Japanese Patent Laying-Open No. 6-57363 "Nitrogen Compounded Aluminum Sintered Alloy and Method of Preparing the Same" or Japanese Patent Laying-Open No. 6-33164 "Method of Manufacturing Nitride Dispersed Al Alloy Member", aluminum alloy powder containing about 0.2 to 5 weight % of Mg as an essentially contained element is heated in a nitrogen gas atmosphere at 500 to 600° C. Due to this heating, AlN is formed on the powder grain surfaces by reaction between aluminum and nitrogen gas, and this is solidified thereby obtaining a sintered aluminum alloy in which AlN is dispersed. The feature of the preparation method disclosed in this prior art resides in that AlN is formed through a function of Mg reducing or breaking oxide coatings on the powder grain surfaces in sintering by containing Mg in the aluminum powder. This preparation method is absolutely different from the function and effect of Mg addition in the method of the present invention.

While a solidification rate of at least $10^{2°}$ C./sec. is required in relation to the raw material aluminum alloy powder which is disclosed in Japanese Patent Laying-Open No. 6-57363, this is aimed at solidifying a metastable phase during sintering and liquid-phase sintering the same. To this end, it is an effective method of forming the metastable phase in the powder to make the solidification rate at least $10^{2°}$ C./sec. Therefore, this differs from the objects and the functional effect of the present invention.

The inventors have made various experiments and analyses, in order to solve the aforementioned problems. As the result, they have discovered a method of forming AlN by nitriding reaction while requiring neither a high temperature sintering process exceeding 1000° C. nor employment of low oxygen containing aluminum powder and fine powder.

This method utilizes a mechanism which is absolutely different from the effects of Mg reducing or breaking oxide coatings on powder grain surfaces.

Namely, direct nitriding reaction is facilitated in a relatively low sintering temperature range by utilizing a self exothermic phenomenon which is caused when rapidly solidified aluminum powder is heated, to form AlN films in a matrix. Such a method is absolutely different from conventional methods.

It is said that strong oxide coatings are present on the surfaces of aluminum alloy powder grains and these oxide coatings inhibit nitriding reaction (a step wherein aluminum and nitrogen gas are reacted with each other to form AlN). According to the present invention, a powder compact is sintered in a relatively low temperature range of 500 to 570° C. At this time, the inventors have noted an exothermic phenomenon caused when respective elements forcibly solidly dissolved in the powder matrix by rapid solidification are deposited, and have discovered that the oxide coatings on the powder grain surfaces can be broken by utilizing this phenomenon. As the result, Al+N→AlN (hereinafter referred to as direct nitriding reaction) is facilitated between aluminum of the powder matrix and the nitrogen gas enclosing the same with no requirement for a catalyst. According to this method, AlN films are formed along old powder grain boundaries of the aluminum sintered body.

When raw material powder containing at least 0.05 weight % of Mg is employed assuming that the overall matrix of the sintered body is 100 weight %, it is possible to inhibit a reaction whereby oxygen is bonded with AlN to form AlON in the process of forming AlN, by preferentially reacting Mg and oxygen with each other. In particular, a range of 0.07 to 0.15 weight % is preferable as the content of Mg. If the Mg content is less than 0.05 weight %, there is a possibility that AlN (AlON) containing impurity oxygen is formed.

In order to facilitate direct nitriding reaction through a self exothermic phenomenon, it is necessary to make the degree of quenching (solidification rate) for the rapidly solidified aluminum alloy powder which is used as the raw material powder at least $10^{2°}$ C./sec. The amount of elements which can be forcibly solidly dissolved in the matrix is small if the degree of quenching is less than $10^{2°}$ C./sec., and hence a heating value which is sufficient for facilitating the direct nitriding reaction when the above-mentioned elements are deposited by heating cannot be achieved, and the aluminum oxide films covering the surfaces of the powder grains cannot be sufficiently broken. Consequently, the direct nitriding reaction does not sufficiently progress in the relatively low temperature range of 500 to 570° C., and a target amount of AlN cannot be formed.

With respect to Al—35 weight % Si rapidly solidified powder, for example, several types of samples whose degrees of quenching (solidification rates) were varied were prepared, molded to true density ratios of 65 % as to the respective types, and thereafter sintered in a nitrogen gas atmosphere at 540° C.×1 hr. Table 1 shows results of analysis of AlN amounts in these sintered bodies.

TABLE 1

| Degree of Quenching (° C./sec.) | $5 \times 10$ | $7 \times 10$ | $1 \times 10^2$ | $2 \times 10^2$ | $7 \times 10^2$ | $1 \times 10^3$ | $2 \times 10^3$ |
|---|---|---|---|---|---|---|---|
| AlN (wt. %) | 0.1 | 0.7 | 8.3 | 16.6 | 22.4 | 27.2 | 35.4 |

As obvious from Table 1, it is understood that a target amount of AlN cannot be formed when powder having a degree of quenching of less than $1 \times 10^{2°}$ C./sec. is employed.

Preferably, the rapidly solidified aluminum alloy powder contains at least 0.05 weight % of Mg. If the Mg content is less than 0.05 weight %, oxygen which is present in the alloy cannot be completely fixed by reaction with Mg, and hence remaining oxygen is contained in AlN as an impurity. Consequently, there arise problems such as reduction of vane material strength caused by reduction in thermal conductivity of the sintered body and reduction of frictional slidability caused by mismatching of the AlN coatings and the matrix.

It is possible to homogeneously form AlN layers containing no oxygen in the sintered body by controlling the solidification rate for the rapidly solidified aluminum alloy powder which is employed as raw material powder and an extremely small amount of Mg contained therein, thereby facilitating direct nitriding reaction in a relatively low sintering temperature range of 500 to 570° C. through a self exothermic phenomenon caused in sintering.

The relation between solidification rates for rapidly solidified aluminum alloy powder containing a small amount of Mg and amounts of formation of AlN were investigated. In more concrete terms, Al—40 weight % Si alloy powder (Mg content: 0.05 weight %) was employed to prepare several types of samples whose solidification rates were varied. These samples were prepared and molded to true density ratios of 70% in relation to the respective types, and thereafter subjected to sintering in a nitrogen gas atmosphere at 540° C.×4 hr. Table 2 shows results of analysis of AlN formation amounts in the sintered bodies. As obvious from Table 2, it is understood that a target amount of AlN cannot be formed when aluminum alloy powder having a degree of quenching of less than $1 \times 10^{2°}$ C./sec. is employed.

TABLE 2

| Degree of Quenching (° C./sec.) | $6 \times 10$ | $8 \times 10$ | $1 \times 10^2$ | $2 \times 10^2$ | $7 \times 10^2$ | $1 \times 10^3$ | $2 \times 10^3$ |
|---|---|---|---|---|---|---|---|
| AlN (wt. %) | 0.4 | 2.8 | 6.4 | 12.4 | 18.0 | 24.3 | 29.8 |

(3) Shape, Dispersibility and Amount of Formation of Aluminum Nitride Film

Figure 2:
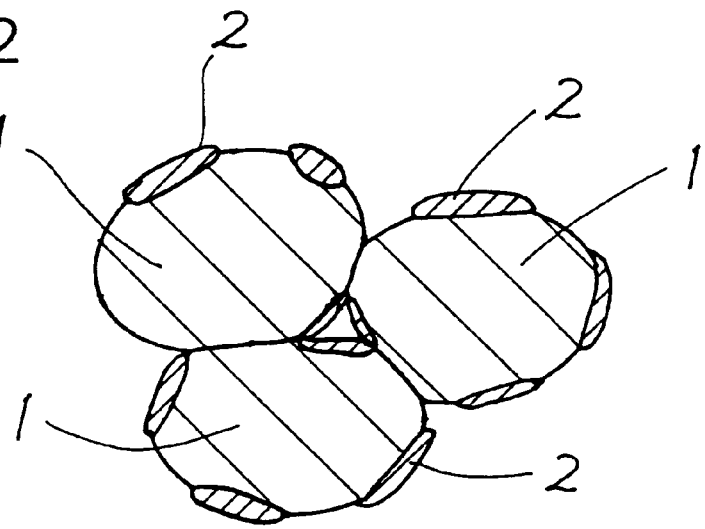
FIG. 2 is a diagram showing a state in which the dispersion ratio of aluminum nitride films is not more than 80%.

AlN films formed by the direct nitriding method according to the present invention are discontinuously formed and dispersed along old powder grain boundaries or on old powder grain surfaces in the sintered aluminum alloy. Referring to FIGS. 1 and 2, reference numeral 1 denotes aluminum alloy powder grains, and reference numeral 2 denotes aluminum nitride films. Assuming that a state in which the AlN films 2 completely continuously enclose the peripheries of old powder grain boundaries of the aluminum alloy powder grains 1 as shown in FIG. 1 is defined as a dispersion ratio of 100%, the AlN films according to the invention are discontinuously formed and dispersed along old powder grain boundaries of the aluminum alloy powder grains 1 at a dispersion ratio of not more than 80% in the sintered aluminum alloy of the present invention, as shown in FIG. 2. In regions where no AlN films are present, diffusion and sintering phenomena progress between the aluminum alloy powder grains.

Preferably, the film thicknesses of the AlN films are not more than 2 μm. Preferably, the amount of formation of AlN is at least 5 weight % and not more than 25 weight %, assuming that the overall sintered aluminum alloy is 100 weight %.

The reason for the aforementioned limitation as preferable ranges is now described. The AlN films improve wear resistance and seizure resistance of the sintered aluminum alloy, while the same may reduce mechanical characteristics to the contrary. Namely, the AlN films are formed on the old powder grain boundaries or the old powder grain surfaces, and hence there is a possibility that the AlN films may inhibit bondability between the aluminum alloy powder grains and reduce the mechanical characteristics of the sintered body, depending on the amount of formation, the shapes or the dispersion ratio etc. of the AlN films.

In more concrete terms, it has been confirmed that bondability between raw material powder grains is inhibited and strength for serving as a vane material (in more concrete terms, transverse rupture strength of at least 600 MPa) cannot be attained as the result when the thicknesses of the AlN films exceed 200 μm, or when the dispersion ratio of the AlN films covering the powder grain surfaces exceeds 80%.

The amount of formation of AlN is related to the total content of Si dispersed in the matrix described later. In order to ensure wear resistance and seizure resistance for serving as a vane material, however, at least 5 weight % of AlN is required. If the AlN formation amount is less than 5 weight %, wear resistance and seizure resistance for serving as a vane material cannot be sufficiently attained, and hence the vane material is abrasion-damaged or suffers seizure with the counter material, to be incapable of withstanding practical use.

As to the upper limit value of the AlN formation amount, 25 weight % is preferable due to restriction in mechanical characteristics and workability of the vane material. When the AlN formation amount exceeds 25 weight %, bondability between the raw material aluminum alloy powder grains is inhibited and the strength for serving as a vane material is reduced as the result, while there arises such a problem that chipping is caused in regions having weak bondability between the powder grains when a sample is worked.

In order to satisfy all of the requirements of wear resistance, seizure resistance, mechanical characteristics and workability for serving as a vane material, preferably the thicknesses of the AlN films are not more than 2 μm, the dispersion ratio of the AlN films is not more than 80%, and the amount of formation of the AlN films is at least 5 weight % and not more than 25 weight %.

(4) Alloy Structure (Including Unavoidable Impurities)

[1] Si:

It is possible to improve wear resistance and seizure resistance of the sintered body by homogeneously dispersing Si in the powder base, similarly to the AlN films. In order to sufficiently provide this effect, preferably it is desired to set sizes of Si crystals to be not more than 15 μm in maximum grain size while setting the mean grain size to be not more than 10 μm. When the maximum grain size of the Si crystals exceeds 15 μm, or the mean grain size exceeds 10 μm, there arises such a problem that the Si crystals attack the counter material during sliding, or breakage and falling of the Si crystals take place to cause seizure with the counter material. When coarse Si crystals are dispersed, further, it results in chipping (stress concentration) upon action of a load, to induce reduction in strength of the alloy.

In relation to the content ($W_{si}$) of Si, Si which is present in the sintered body influences the mechanical characteristics, wear resistance, seizure resistance and the thermal expansibility of the sintered body. The Si content is closely related with the AlN formation amount ($W_{AlN}$) in the sintered body. In order to employ the sintered aluminum alloy of the present invention as a vane material in practice, it is necessary to satisfy all of the aforementioned characteristics by optimizing the total content of Si and AlN.

The inventors have made various experiments and analyses, whereby excellent wear resistance, seizure resistance and mechanical characteristics for serving as a vane material of a sintered aluminum alloy can be exhibited when Si crystals and AlN satisfying the expression (1) described below are dispersed in the sintered body.

$10\% \leq W_{Si} \leq 30\%$ (weight basis)

$15\% \leq W_{Si} + W_{AlN} \leq 60\%$ (weight basis) (1)

When the Si content is less than 10 weight %, or the total content of Si and AlN is less than 15 weight %, sufficient wear resistance and seizure resistance cannot be attained. Further, it is difficult to ensure adequate hardness required as a vane material, at least 55 in HR-A hardness in more concrete terms. When the Si content exceeds 30 weight %, or the total content of Si and AlN exceeds 60 weight %, on the other hand, wear resistance and seizure resistance of the sintered body are not further improved but strength and toughness of the sintered body are extremely reduced on the contrary.

The thermal expansibility is now studied. When a difference in thermal expansion coefficient between a rotor or a cylinder case and the vane material is increased, a clearance between the vane and the rotor or between the vane and the cylinder is increased in high-speed driving, and there arises a problem of reduction in performance of a compressor as the result. In such a point of view, the thermal expansion coefficient of the vane material is preferably at least $12 \times 10^{-6}/°C$.

Since elements greatly contributing to reduction of the thermal expansion coefficient are Si and AlN in the slide member of a sintered aluminum alloy, it becomes necessary to restrict the upper limit value of the total content of these elements in view of the thermal expansion coefficient. In more concrete terms, it is necessary to satisfy the following expression (2), in order to ensure a thermal expansion coefficient of at least $12 \times 10^{-6}/°C$. which is required for the vane material:

$$W_{Si} + W_{AlN} \leq 50\% \text{ (weight basis)} \qquad (2)$$

From the above, it is desirably necessary to satisfy both of the expression (1) and the expression (2), in order to use the sintered aluminum alloy as a vane material in practice. In other words, the Si content and the total content of Si and AlN in the sintered body must satisfy the following expressions (3):

$$10\% \leq W_{Si} \leq 30\% \text{ (weight basis)}$$

$$15\% \leq W_{Si} + W_{AlN} \leq 50\% \text{ (weight basis)} \qquad (3)$$

In the present invention, the AlN films are made of a nitrogen compound through reaction of aluminum and nitrogen gas, and hence the proper AlN amount (5 to 25 weight %) in the vane material according to the present invention is about 1.5 to 9 weight % in terms of the nitrogen content.

[2] Fe and Ni:

Fe and Ni have an effect of improving heat resistance and rigidity of the sintered aluminum alloy by forming fine metastable phases (non-equilibrium phases) with aluminum and being dispersed in the base. Namely, seizure with the counter material during sliding is remarkably suppressed by improving heat resistance, and hence addition of Fe and Ni is effective. Further, it is possible to suppress growth of Si crystals in heating or sintering by finely and homogeneously dispersing such thermally stable intermetallic compounds, thereby remarkably improving cuttability of the aluminum alloy as the result.

According to the present invention, desirably the content of Fe contained in the matrix is in a range of 2 to 6 weight %, and the content of Ni is in a range of 2 to 6 weight %, assuming that the overall matrix of the sintered body consisting of aluminum alloy powder is 100 weight %. Further, it is preferable to satisfy a relational expression of $0.8 \leq W_{Fe}/W_{Ni} \leq 1.25$ assuming that the content of Fe in the matrix is $W_{Fe}$ on the basis of weight and the content of Ni is $W_{Ni}$ on the basis of weight. With such contents of Fe and Ni, heat resistance of the sintered body is extremely improved.

When rapidly solidified aluminum alloy powder having the aforementioned composition is prepared by an atomization method (a spraying method) and this green compact is sintered, spherical intermetallic compounds consisting of fine $Al_9FeNi$ of not more than 5 $\mu$m in grain size are homogeneously dispersed in the matrix in the sintered body, whereby the sintered body has excellent heat resistance strength in a temperature range of 150 to 200° C. as the result.

When the content of either one or both of Fe and Ni is less than 2 weight %, or the content ratio ($W_{Fe}/W_{Ni}$) thereof is less than 0.8 or exceeds 1.25, the aforementioned intermetallic compounds of fine $Al_9FeNi$ are not formed and hence it is difficult to attain excellent heat resistance strength. While Al—Ni and Al—Fe intermetallic compounds are also formed in the aforementioned preferable range, the inventors have also discovered that the effect by the intermetallic compounds of $Al_9FeNi$ is by far superior to an effect of improvement of heat resistance by these dispersion effects.

On the other hand, the effect related to heat resistance is not improved when either one or both of Fe and Ni are added in excess of 6 weight %, but instead, the intermetallic compounds dispersed in the matrix are coarsered or brought into needle states on the contrary, and hence there arises such a problem that strength and toughness of the solidified sintered aluminum alloy are reduced.

[3] Cr, Ti, Mo, Zr and V:

These high melting point metal elements are thermally stable and hard, and hence it is possible to improve heat resistance and hardness of the aluminum alloy when the same are homogeneously dispersed in the base in grain sizes of not more than 1 $\mu$m, preferably not more than 0.5 $\mu$m. Therefore, it is preferable to contain one or at least two elements selected from Cr, Ti, Mo, Zr and V in the rapidly solidified aluminum alloy powder in a range not exceeding 5 weight % in total, as needed. If the total amount of addition exceeds 5 weight %, there arises a problem of strength reduction caused by conversion of the powder solidified body into a fragile state, and an atomization temperature in powder preparation steps is increased to also cause an economical problem of cost increase of the powder due to increase in power consumption during dissolution.

[4] C, BN, $MoS_2$ and $CaF_2$:

When the aluminum alloy is used as a sliding part such as a vane or a pump rotor, it is important to ensure slidability (conformability) with a cylinder part or a pump case part in an initial stage of starting. To this end, it is effective to add at least one or two of these solid lubricants having effects as self-lubricant components in a range not exceeding 5 weight % as needed. The effect is not improved if the same are added in excess of 5 weight %, but instead there arises such a problem that the strength of the alloy is reduced, on the contrary.

When $MoS_2$ is added, the lubricant component is thermally decomposed from around 300° C. and reacted with $O_2$ gas to form $SO_2$ gas if oxygen gas is present in the sintering atmosphere, and hence $MoS_2$ as a lubricant component is not sufficiently retained in the sintered body. In this case, the aforementioned effect cannot be attained. Further, the $SO_2$ gas shields the powder grain surfaces, and hence there also arises such a problem that the aforementioned direct nitriding reaction is suppressed and formation of AlN films is hindered. In order to avoid such problems, it is necessary to control oxygen concentration in the nitrogen gas atmosphere in case of adding $MoS_2$.

[5] Cu:

When mechanical characteristics and corrosion resistance of the powder aluminum alloy are improved as needed, it is effective to contain a 0.4 to 8 weight % of Cu. In more concrete terms, it is possible to improve the mechanical characteristics by performing solution heat treatment at 300 to 500° C. for 0.5 to 4 hr., or further performing aging treatment at not more than 200° C. The aforementioned functional effect is insufficient if the amount of addition of Cu is less than 0.4 weight %. If Cu exceeds 8 weight %, on the other hand, influence by a temperature in environment of use is readily exerted and heat resistance and hardness of the base are reduced.

[5] Flowability of Raw Material Powder

In the method according to the present invention, raw material powder is first supplied to a mold and formed into a shape which is in line with the final product shape, i.e., which is similar to the final product shape. Thus, economical effects such as improvement of the raw material yield and reduction of the working cost can be expected. In order to implement this, however, flowability and chargeability with respect to the powder are required. When the grain size of the powder is fine, fluidity of the powder to the mold particularly comes into question, and the amount of flowing of nitrogen gas differs in the interior of the compact since density distribution in the powder compact is heterogeneous. Consequently, the amount of AlN formed—dispersed by direct nitriding reaction is heterogeneous in the interior of the sintered body, and hence the aforementioned wear resistance and seizure resistance cannot be ensured. On the other hand, the powder is hard to charge into mold corner portions, and hence there arises such a problem that corner portions of the powder compact are chipped if fluidity of the powder is inferior. Thus, fluidity of the powder is an important required characteristic in the slide member of an aluminum alloy according to the method of the present invention.

In more concrete terms, it is preferable to set flowability of the powder so that the flow rate of the powder in an orifice 4 mm$\phi$ is not more than 60 seconds/50 g, in order to make it possible to produce the slide member with no economical problem in mass production steps. When the employed rapidly solidified aluminum alloy powder does not satisfy this condition, however, it is preferable to improve the fluidity in a state of sufficiently maintaining the degree of quenching and physical characteristics of the powder by mechanically granulating and mixing the powder.

[6] Manufacturing Method

Figure 3:
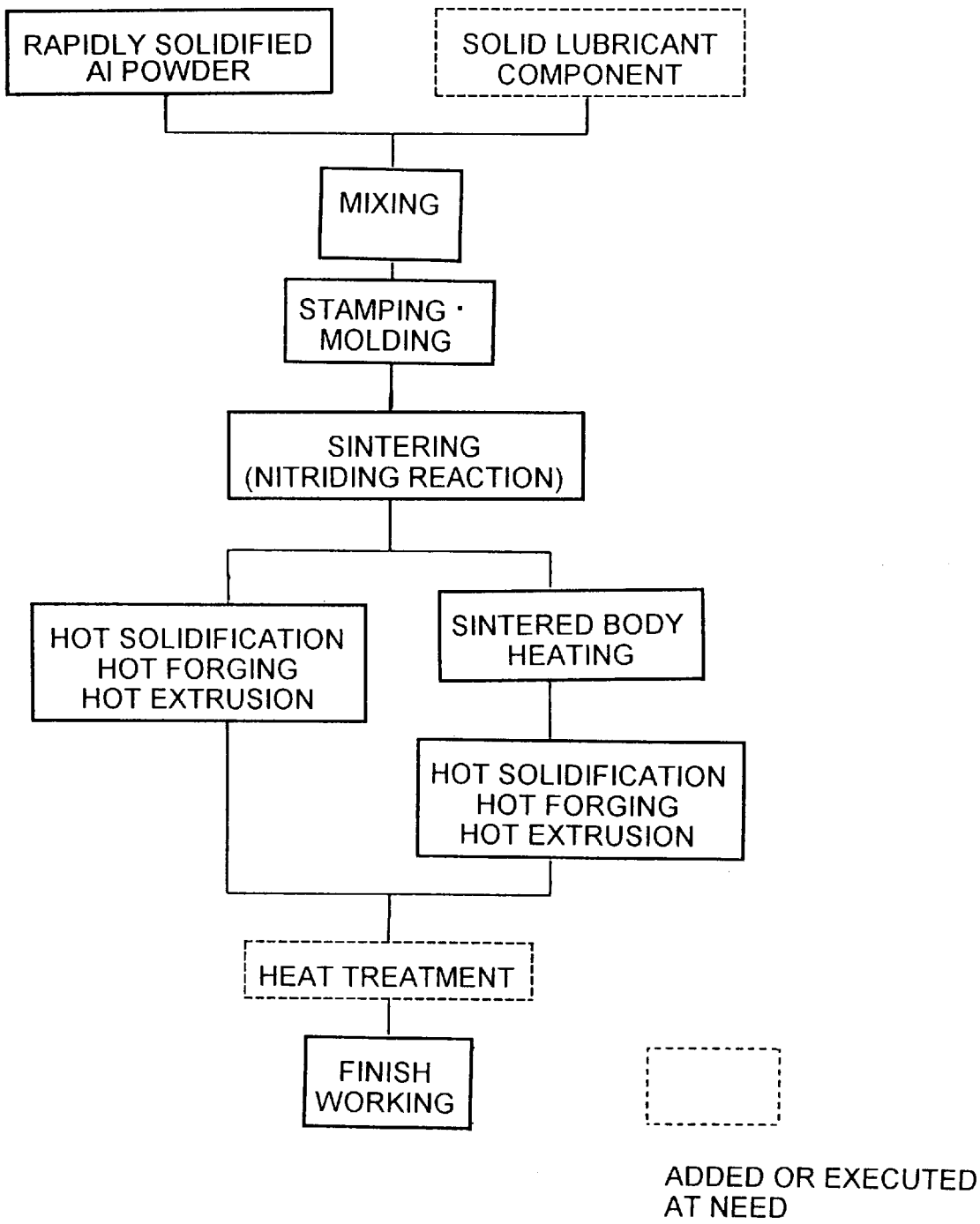
FIG. 3 is a diagram showing an example of a manufacturing method according to the present invention.

FIG. 3 shows an example of a method of manufacturing a slide member of a sintered aluminum alloy according to the present invention.

[1] Stamping or Molding

A green compact (powder compact) formed by molding raw material powder is prepared. This green compact is sintered in a nitrogen gas atmosphere, thereby forming AlN films on old powder grain boundaries or old powder grain surfaces in the sintered body in a discontinuously dispersed state. The green compact must be not more than 80% in true density ratio, so that the nitrogen gas homogeneously flows into the interior of the green compact in the sintering process. If it exceeds 80%, flowing of the nitrogen gas into the green compact is difficult, and hence it is difficult to homogeneously form the AlN films in a short time. In a green compact which is less than 50% in true density ratio, on the other hand, the green compact has inadequate in handleability since strength thereof is small and productivity is extremely reduced by such a problem that the green compact is easily chipped in a carriage process, although the nitriding reaction homogeneously progresses in a short time. Therefore, the green compact is preferably 50% to 80% in true density ratio.

Stamping or molding are preferably carried out in a temperature range where the temperature of the powder is the normal temperature e.g. room temperature, or in a temperature range where the temperature does not exceed 300° C. Atmosphere control is required for oxidation suppression if the temperature exceeds 300° C., while the characteristics of the aluminum alloy may be reduced if the temperature exceeds about 450° C., since the rapidly solidified structure of the powder may be disrupted depending on the heat treatment conditions.

[2] Sintering (Direct Nitriding Reaction):

It is possible to form 3 to 40 weight % of AlN films in the sintered body by heating and sintering the green compact in a nitrogen gas atmosphere which is maintained at a temperature of 500° C. to 570° C. As to the formation mechanism of the AlN films, the green compact is heated in a nitrogen gas atmosphere of 500° C. to 570° C. as described above, thereby facilitating direct nitriding reaction of aluminum of the powder base and nitrogen gas enclosing the same through exothermic reaction at the time when respective elements which were forcibly solidly dissolved in the powder base by rapid solidification are deposited, for forming the AlN films along the old powder grain boundaries in the sintered body in a discontinuously dispersed state as the result.

In relation to the sintering temperature, a long-time sintering process exceeding about 20 hours is necessary for facilitating direct nitriding reaction of Al+N→AlN when the temperature is less than 500° C., and hence a problem in economy is caused. If the temperature exceeds 570° C., on the other hand, the rapidly solidified structure is damaged by coarsening of Si crystals and deposits and hence the characteristics of the sintered body are reduced, although formation of the AlN films by nitriding reaction is possible.

Then, the sintering time is studied. It has been possible to confirm formation of about 10 weight % of AlN films when heating and sintering were carried out for 5 minutes under a nitrogen gas atmosphere of 500° C. to 570° C. employing a relatively small green compact sample (a rectangular parallelepiped of 10×10×50 mm, for example) in a precedent experiment. However, temperature difference between the interior and a surface layer part is caused when the size of the green compact is further increased, and hence heating of at least 30 minutes is necessary in order to homogeneously form AlN films in the sintered body. In order to form a target amount of AlN by direct nitriding reaction, therefore, sintering of at least 30 minutes is preferable.

In relation to the nitrogen gas to be used according to the invention, the manufacturing method of the present invention has absolutely no problem in economy since it is possible to sufficiently facilitate the direct nitriding reaction even with nitrogen gas that is employed for industrial use in general.

[3] Hot Forging:

Objects of carrying out hot forging are to finely pulverize the AlN films which are formed on the old powder grain boundaries or the old powder grain surfaces in the first place, to attain improvement in strength and hardness of the sintered body by closing holes in the sintered body, diffusion-bonding metal (Al) parts with each other on interfaces thereof and solidifying the same to at least 97% in true density ratio in the second place, and to provide a V-shaped groove in a pressurized surface of the powder solidified body in the third place.

The aforementioned objects can be attained either by immediately solidifying the nitride green compact, which has been heated by sintering, by means of hot forging, or by re-heating a temporarily cooled sintered body to 400° C. to 570° C. and thereafter solidifying the same by hot forging. In the case of re-heating, however, an extremely high forging pressure is necessary for achieving plastic deformation since deformation resistance of the sintered body is large in the case of heating of less than 400° C. Consequently, a problem of abrasion damage of the mold is caused or use of a large press is required, to reduce economy. With a re-heating temperature exceeding 500° C., there arises the necessity for controlling the heating atmosphere in view of prevention of oxidation of the sintered body in the heating process. In excess of 570° C., further, the characteristics of the sintered body are reduced since Si and deposits are coarsened. From the above, the re-heating temperature is preferably 400° C. to 570° C., particularly preferably 450° C. to 500° C.

Then, hot forging conditions are studied. It is possible to attain refinement pulverization of the aforementioned AlN films and an increase of strength and of hardness of the sintered body by applying a forging pressure of at least 4 tons/cm$^2$ to the sintered body. Concrete characteristics of a sintered body which can be put into practice as a vane material are transverse rupture strength of at least 600 MPa and HR-A hardness of at least 55. Under a forging pressure of less than 4 tons/cm$^2$, the density of the sintered aluminum alloy is less than 97% in true density ratio, and hence there arises such a problem that the vane material is readily influenced by the environment of usage due to bonding holes, in addition to the fact that sufficient strength and hardness for serving as the vane material cannot be attained as the result. Further, a target frictional slidability cannot be implemented since refinement pulverization of the AlN films is not sufficient.

Figure 4:
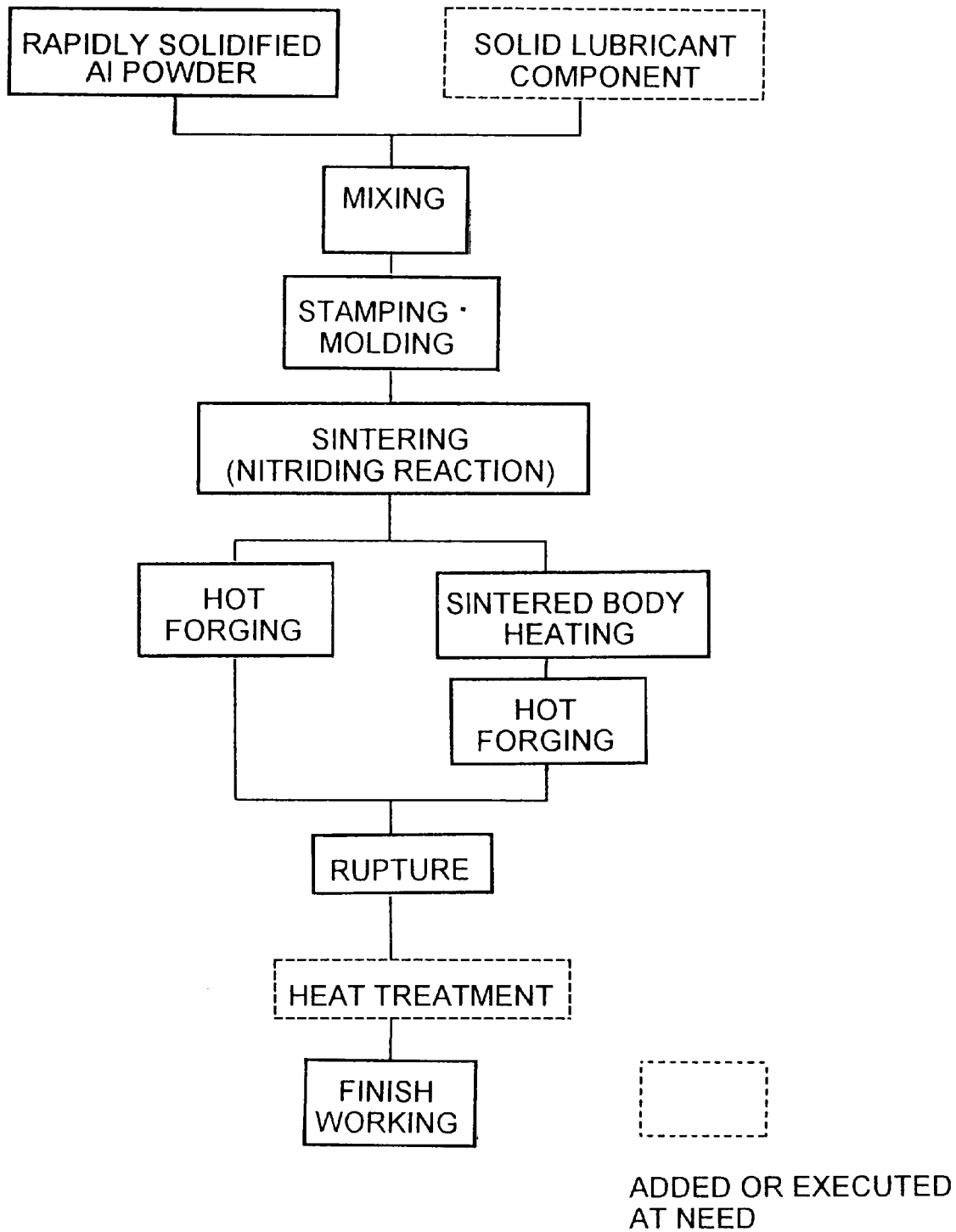
FIG. 4 is a diagram showing another example of a manufacturing method according to the present invention.
Figure 5:
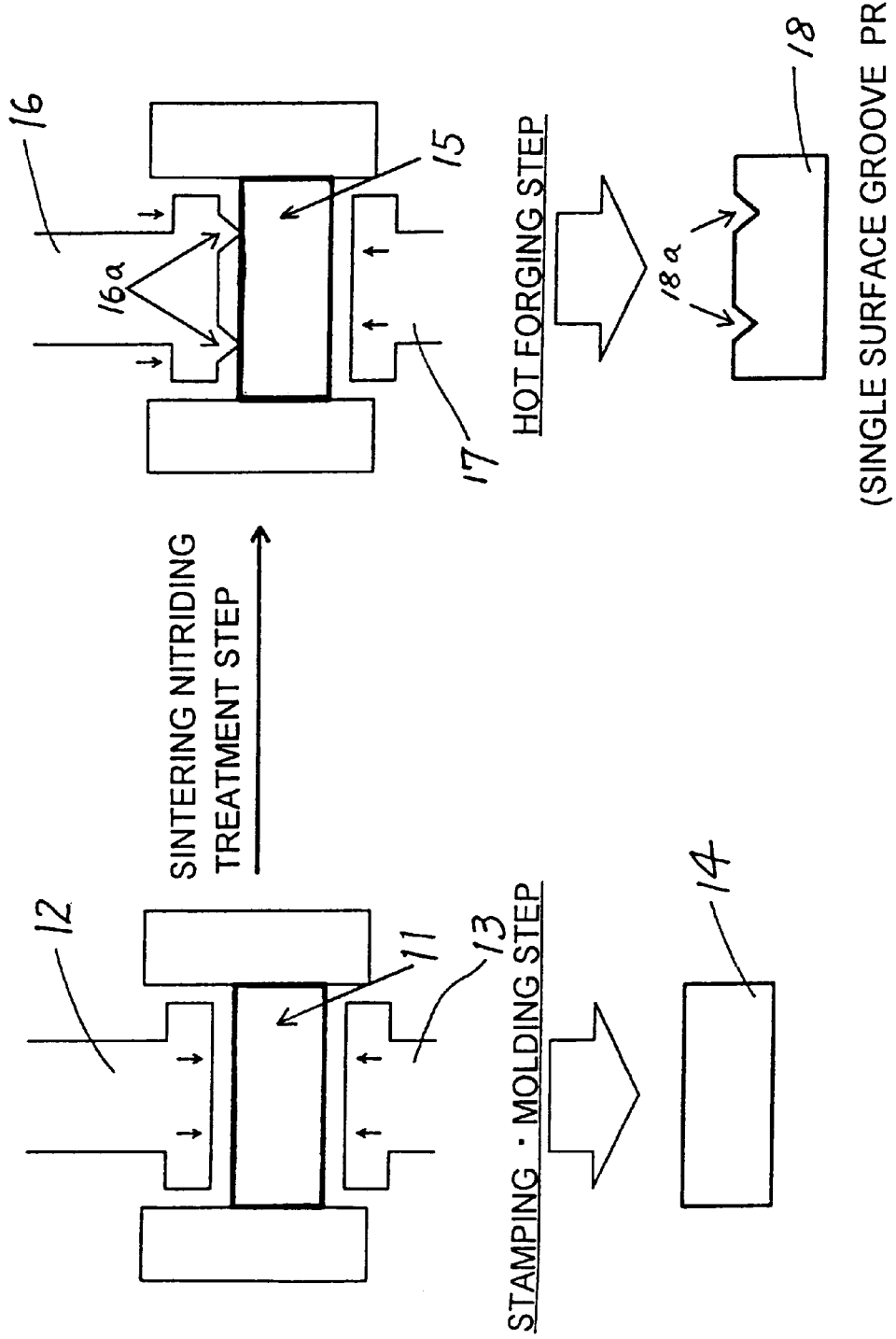
FIG. 5 is a diagram illustratively showing a hot forging method of providing grooves.

FIG. 4 shows another example of the manufacturing method according to the present invention. A point which is different from the method shown in FIG. 3 is that it comprises a rupture step after a solidification step by hot forging. In advance of this rupture, V-shaped grooves are provided in the pressurized surface of the sintered body in hot forging. This operation is described with reference to FIG. 5.

First, in a stamping or molding step, rapidly solidified aluminum alloy powder 11 is pressure-molded by an upper punch 12 and a lower punch 13, to form a powder compact 14. In a sintering nitriding step, the powder compact 14 is sintered. At the same time, aluminum nitride films are formed along old powder grain boundaries in the sintered body. In a hot forging step, the sintered body 15 is pressurized and solidified by an upper punch 16 and a lower punch 17. In this solidification, grooves are formed in a pressurized surface of the sintered body 15. The upper punch 16 has wedge portions 16a, for forming these grooves. Thus, V grooves 18a are formed in the surface of a forged solidified body 18. A shearing load or a bending load is applied to the pressurized surface of the solidified sintered body, thereby rupturing the forged solidified body 18 along the V grooves 18a, although this is not shown in FIG. 5.

Grooves which are formed in a pressurized surface of a forged solidified sintered aluminum alloy define recesses, whereby a powder solidified body can be readily ruptured along the grooves when a shearing load or a bending load is applied to the pressurized surface of the solidified sintered body. In this case, cracking of the rupture progresses substantially perpendicularly to a plate thickness direction. On the other hand, it has been recognized that no small cracking is caused.

Figure 6:
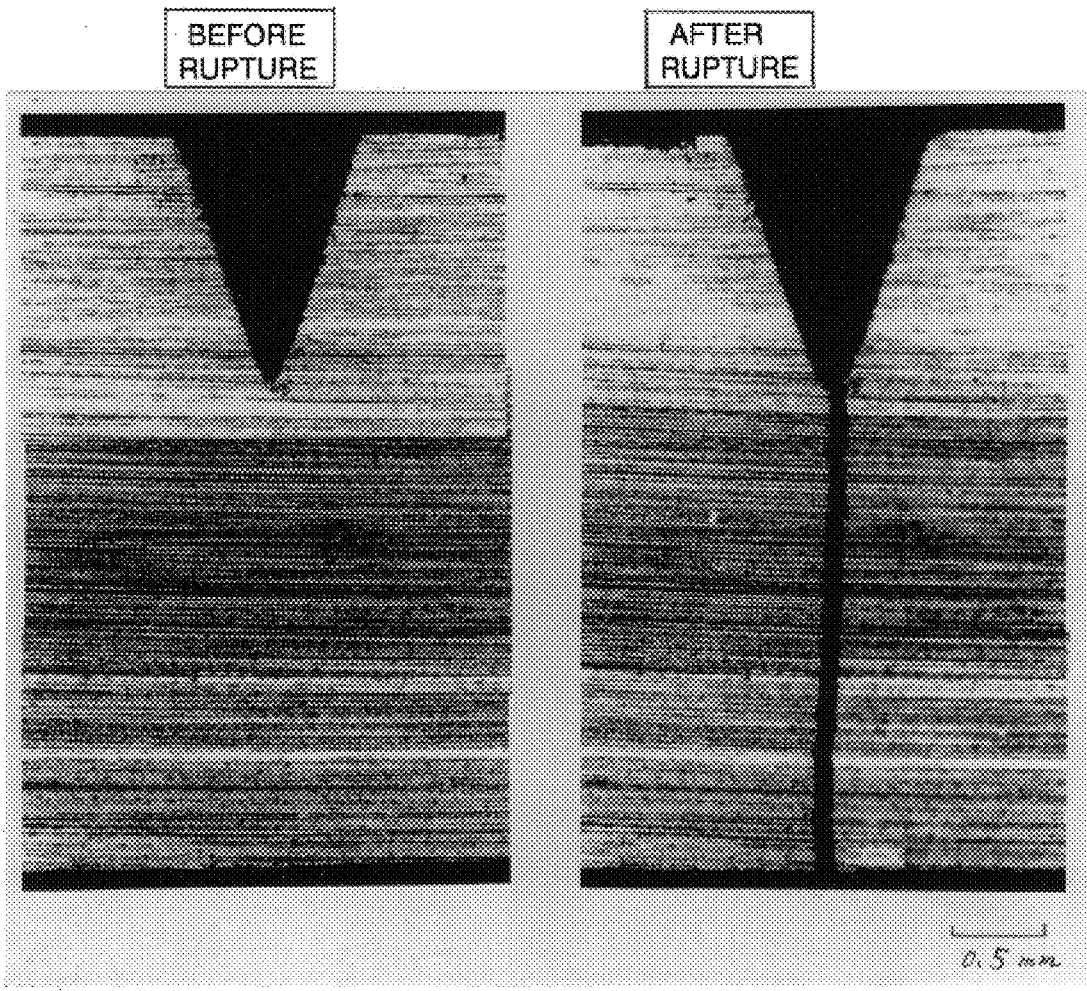
FIG. 6 shows photographs of sections of a powder-forged aluminum alloy having a V-shaped groove before and after rupture.

FIG. 6 shows sectional photographs before and after rupture of a powder forged aluminum alloy in which AlN is dispersed. As obvious from FIG. 6, it is possible to rupture a sintered body with a low load of about 40 kgf by having a V groove, and it is recognized that cracking thereof substantially perpendicularly progresses with respect to the pressurized surface of the aluminum alloy.

Figure 7:
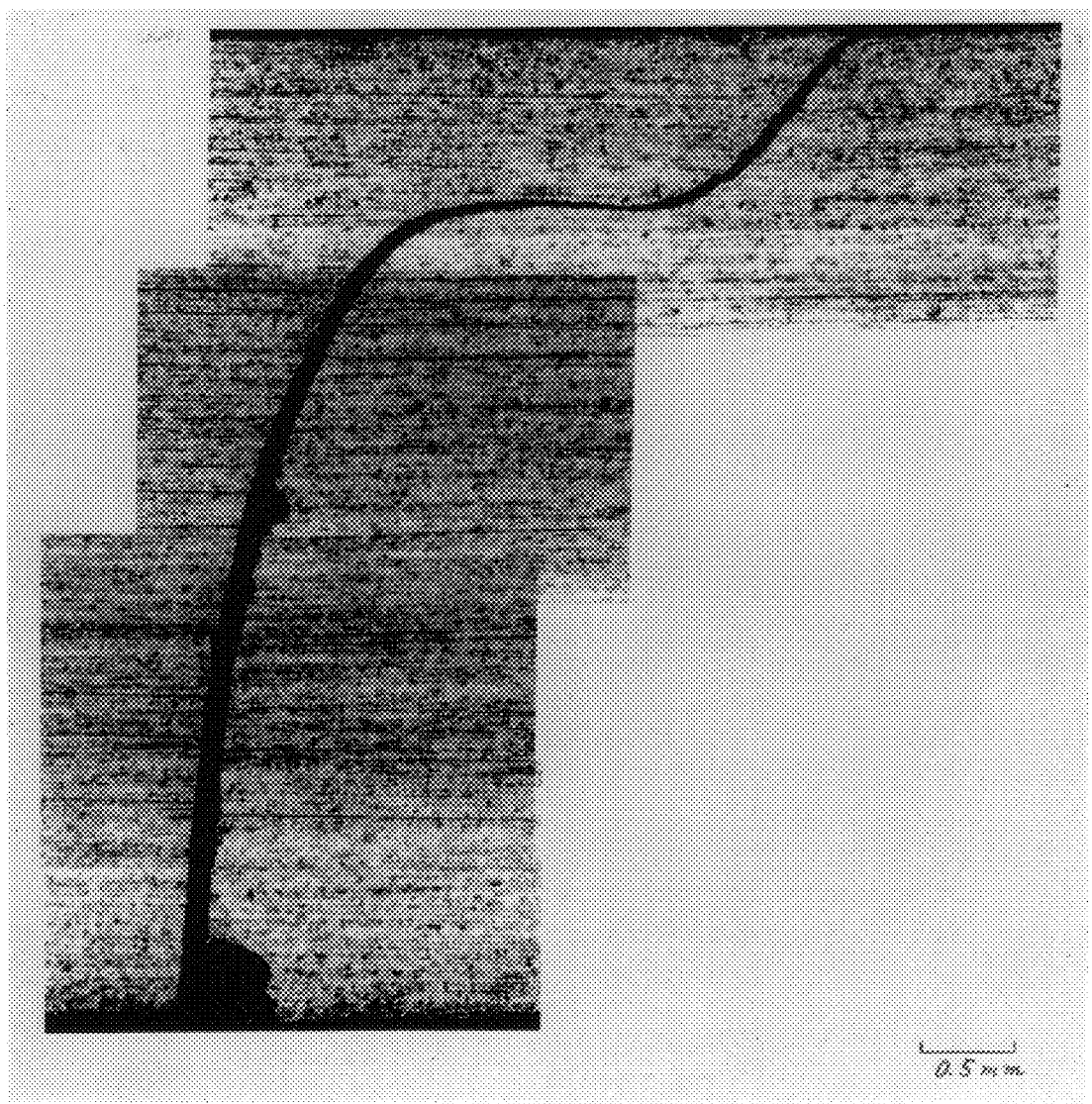
FIG. 7 is a sectional photograph of a powder-forged aluminum alloy having a V-shaped groove after rupture.

FIG. 7 shows a sectional photograph of a powder forged aluminum alloy having no V groove after rupture. As obvious from FIG. 7, it has been recognized that cracking progresses along a curved crack propagation line in a test piece, and a rupture load is extremely large at about 260 kgf, when no V groove has been provided.

V-shaped grooves can be provided in a large powder solidified body through a single hot forging step by employing the aforementioned manufacturing method, and it is possible to manufacture two or more vane materials from one sintered body.

Japanese Patent Laying-Open No. 1-272705 "Method of Preparing Powder Forged Part" discloses the following method of manufacturing a sintered part. Namely, a marking groove is provided in a preliminary powder compact, and exposed into the atmosphere after sintering before forging to form an oxide coating on the marking groove part. Then, this groove is closed in forging, but powder grains are not completely bonded with each other but remain as tears due to the presence of the oxide coating. A load is applied to this portion, thereby rupturing (separating) the compact along the tears.

The method of the aforementioned prior art and the manufacturing method of the present invention are now compared with each other. First, the object of the present invention is to efficiently prepare at least two final powder solidified bodies from a single solidified body by rupturing and dividing the same.

On the other hand, the aim is to prepare products which are engaged along ruptured surfaces thereof after division, in the method of the prior art. In the present invention, further, a sample in the form of a rectangular paralellopiped having no grooves is employed for a preliminary powder compact, and V-shaped grooves are provided in the forging step after sintering for rupturing the final compact under a low load through this recess effect. In the method of the aforementioned prior art, on the other hand, grooves are formed in the preliminary compact and the grooves are temporarily closed in the forging step after sintering to rupture the final compact by employing insufficient bondability (tears) thereof as propagation paths of cracking.

As hereinabove described, the method of the present invention and the method disclosed in Japanese Patent Laying-Open No. 1-272705 are different from each other with regard to the object of the invention, while there is an extreme difference in steps of providing the grooves necessary for rupturing the final compacts and the methods thereof.

When a powder aluminum alloy is prepared by the method of the present invention, there is no particular restriction in the shapes and sizes of the grooves which are provided in the pressurized surface of the powder solidified body. In relation to the angle of the grooves, it is possible to rupture the solidified body perpendicularly with no problem as long as the groove angle is smaller than 180°.

The grooves may be formed only in one pressurized surface of the powder solidified body, or the grooves may be formed in both pressurized surfaces. When the grooves are provided in both surfaces, it is necessary to control the positions of the both grooves. In order to make cracking progress perpendicularly to the plate thickness direction in rupturing, straight lines connecting groove bottoms of grooves formed on both surfaces are preferably perpendicular to the pressurized surface of the solidified body.

The recess effect of the hot forged body is attained as the angles of forward ends of projections of a punch for providing the grooves are reduced. On the other hand, however, abrasion damage on the forward ends of the projections is readily caused, and hence the forward angles of the projections are preferably at least 45°.

As obvious from the above, [1] the compact can be readily ruptured in an extremely short time as compared with a cutting work time for an extruded member, and [2] an economical benefit is achieved in that cutting margins of the material can be remarkably reduced in the present invention, as compared with the case of manufacturing an aluminum alloy part on the basis of the conventional hot extrusion method.

When a vane of an aluminum alloy is manufactured by the method of the present invention, the same is obtained by rupturing an aluminum alloy material having grooves, and hence corner portions are removed in the obtained aluminum alloy member as shown in FIG. 6, for example. When a forward end portion (blade portion) or a rear tail portion of a vane material having a curvature is worked, therefore, the working margin (cutting margin) thereof is reduced and hence it is possible to also expect such an effect in economy that the working time can be reduced.

Also in the case of solidifying a sintered body subjected to nitriding by the conventional hot extrusion method for preparing a vane material, however, it can form an excellent vane material with absolutely no problem in performance. In order to attain strength required for serving as a vane material by improving bondability between the powder grains, it is preferable to apply an extrusion ratio of at least 6.

EXAMPLE 1

Aluminum alloy powder (43 $\mu$m in mean grain size) having a composition of Al—40 Si (weight basis) that was rapidly solidified at $7 \times 10^{2\circ}$ C./sec. in degree of quenching was formed into a powder compact of 60% in true density ratio by cold stamp molding. The dimensions of the powder compact were 10×30×10 mm. The powder compact was heated and held in an atmosphere which was fed with nitrogen gas (20 l/min.) under sintering conditions of 540° C.×30 minutes, and thereafter immediately worked into a powder solidified body of 100% in true density ratio by hot forging (7 tons/cm$^2$ in surface pressure). The dimensions of the powder solidified body were 11×31×5 mm. As to such an aluminum alloy obtained by the manufacturing method of the present invention, FIG. 8 shows a metallographic photograph with an optical microscope, and FIG. 9 shows the results of analysis of raw material powder and its alloy by X-ray diffraction.

Figure 8:
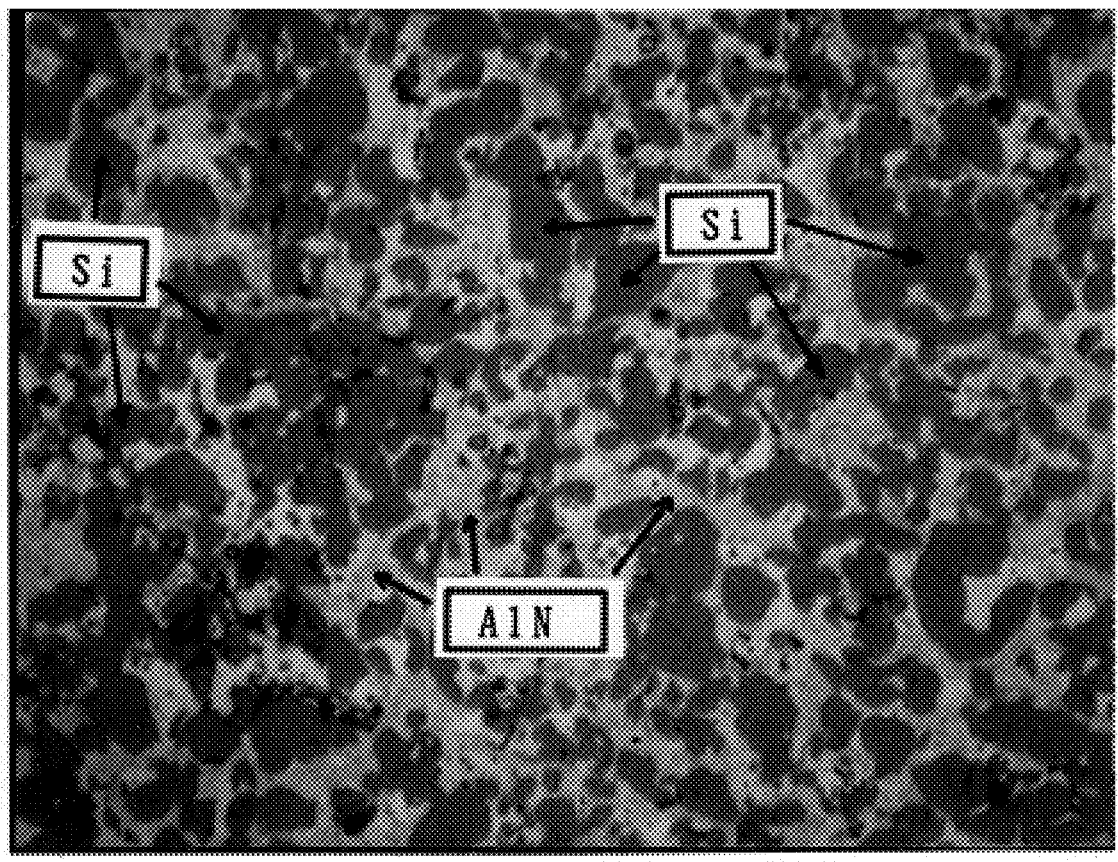
FIG. 8 is a metallographic photograph through an optical microscope.
Figure 9:
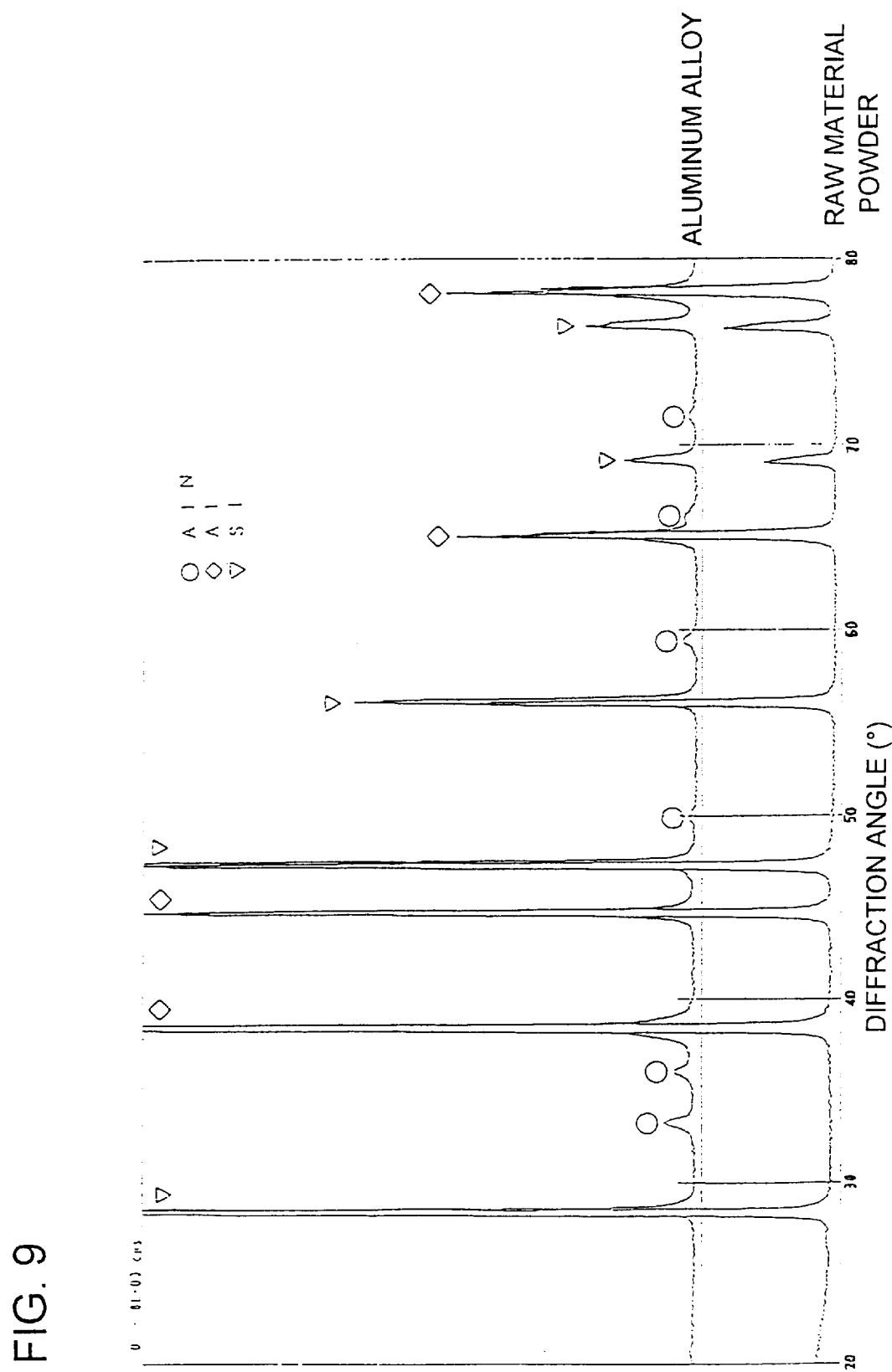
FIG. 9 is a diagram showing results of X-ray diffraction.

The metallographic photograph of FIG. 8 has a magnification of 1000. As obvious from FIG. 8, AlN layers have a mean grain size of 6 $\mu$m and Si crystals have a mean grain size of 8 $\mu$m. It is recognized that both of these are finely and homogeneously formed and dispersed in the alloy. From FIG. 9, further, AlN is identified in the aluminum alloy subjected to sintering treatment although no AlN is detected in the raw material powder, and thereby it is also recognized that direct nitriding reaction progressed under the aforementioned sintering conditions.

EXAMPLE 2

Aluminum alloy powder (43 $\mu$m in mean grain size) having a composition of Al—35 Si—2 Fe—2 Ni (weight basis) that was rapidly solidified at $7 \times 10^{2\circ}$ C./sec. in degree of quenching was formed into a powder compact of 60% in true density ratio by cold stamp molding. The dimensions of the powder compact were 10×30×10 mm. This powder compact was heated and held in an atmosphere which was fed with nitrogen gas (20 l/min.) under sintering conditions of 540° C.×30 minutes, and thereafter immediately worked into a powder solidified body of 100% in true density ratio by hot forging (7 tons/cm$^2$ in surface pressure). The dimensions of the powder solidified body were 11×31×5 mm. As to the aluminum alloy thus obtained, FIG. 10 shows a metallographic photograph with an optical microscope, and FIG. 11 shows the results of analysis of raw material powder and its alloy by X-ray diffraction.

Figure 10:
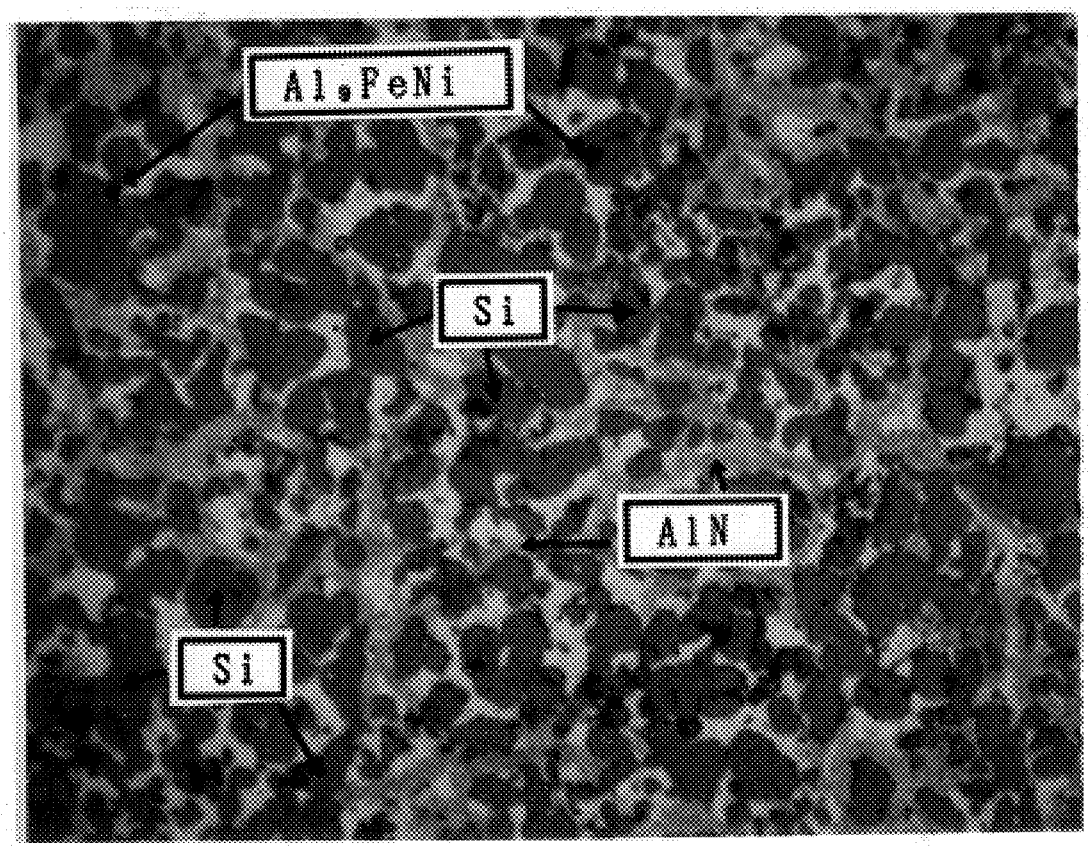
FIG. 10 is a metallographic photograph through an optical microscope.
Figure 11:
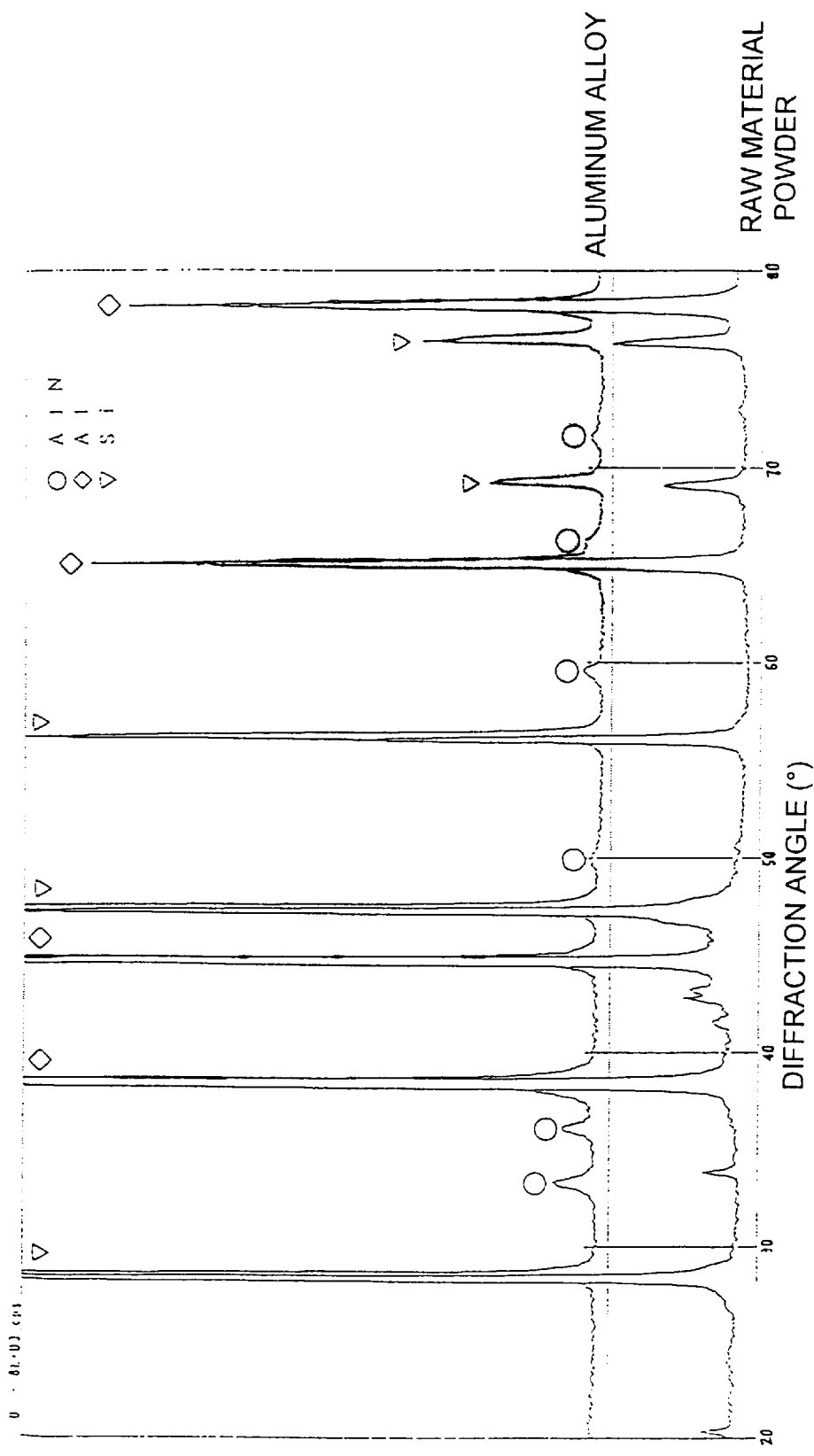
FIG. 11 is a diagram showing results of X-ray diffraction.

The metallographic photograph of FIG. 10 has a magnification of 1000. As understood from the photograph of FIG. 10, AlN layers have a mean grain size of 5 $\mu$m, and Si crystals have a mean grain size of 7 $\mu$m. From FIG. 11, further, AlN is identified in the aluminum alloy subjected to sintering processing although no AlN is detected in the raw material powder, and thereby it is also recognized that direct nitriding reaction progressed under the aforementioned sintering conditions. Further, it has been recognized that fine spherical intermetallic compounds of Al$_9$FeNi were homogeneously dispersed in the alloy in FIG. 10 and FIG. 11.

EXAMPLE 3

Aluminum alloy powder (43 $\mu$m in mean grain size) having a composition of Al—4 Fe—4 Ni—1 Mg (weight basis) that was rapidly solidified at $7 \times 10^{2\circ}$ C./sec. in degree of quenching was formed into a powder compact of 65% in true density ratio by cold stamp molding. The dimensions of the powder compact were 10×30×10 mm. This powder compact was heated and held in an atmosphere which was fed with nitrogen gas (20 l/min.) under sintering conditions of 540° C.×30 minutes, and thereafter immediately worked into a powder solidified body of 100% in true density ratio by hot forging (7 tons/cm$^2$ in surface pressure). The dimensions of the powder solidified body were 11×31×5 mm. As to the aluminum alloy thus obtained, FIG. 12 shows a metallographic photograph with an optical microscope, and FIG. 13 shows the results of analysis of raw material powder and its alloy by X-ray diffraction.

Figure 12:
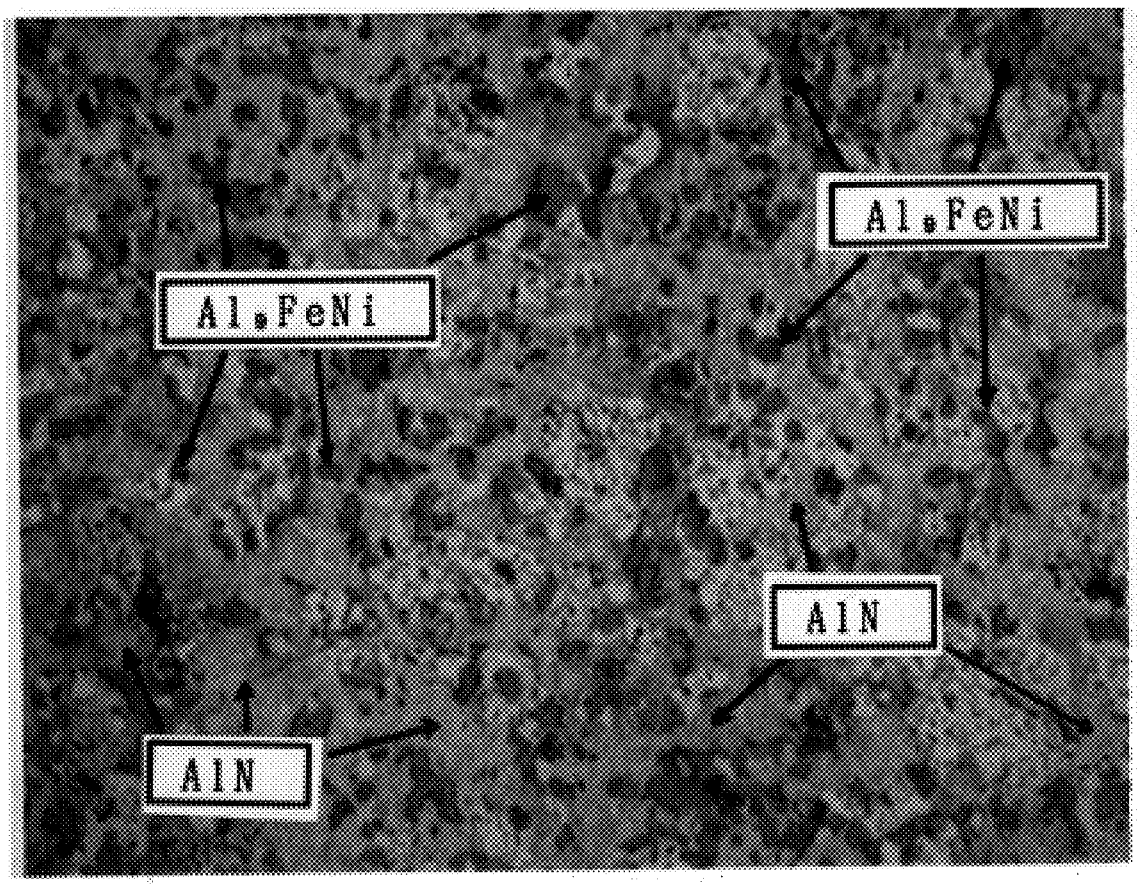
FIG. 12 is a metallographic photograph through an optical microscope.
Figure 13:
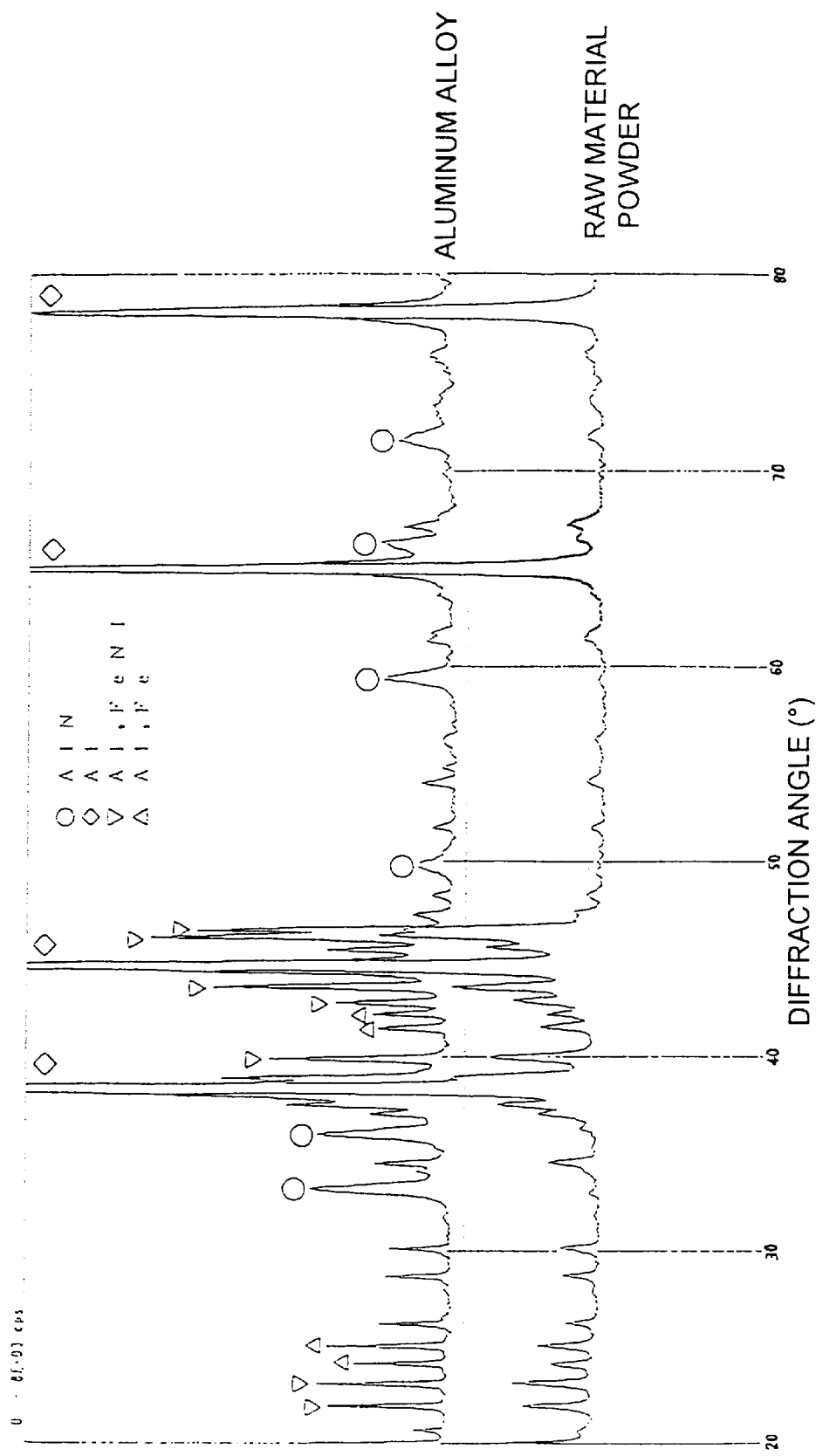
FIG. 13 is a diagram showing results of X-ray diffraction.

The metallographic photograph of FIG. 12 has a magnification of 1000. As understood from the photograph of FIG. 12, it is recognized that AlN layers have a mean grain size of about 8 $\mu$m, and are finely and homogeneously formed and dispersed in the alloy. From FIG. 13, further, AlN is identified in the aluminum alloy subjected to sintering processing although no AlN is detected in the raw material powder, and thereby it is also recognized that direct nitriding reaction progressed under the aforementioned sintering conditions. Further, it has been recognized that fine spherical intermetallic compounds of Al$_9$FeNi were homogeneously dispersed in the alloy in FIG. 12 and FIG. 13.

EXAMPLE 4

The following table 3 shows the composition degree of fluidity, and degree of quenching of sample materials according to the present Example 4.

TABLE 3

Composition (wt. %), Degree of Quenching (°C./sec.) and Fluidity (sec/50 g: 4 mmφ Orifice Tube)

| No. | Si | Fe | Ni | Fe/Ni | Cr | Ti | Mo | Zr | V | Total | Mg | Cu | Al | Lubricant Component | Degree of Quenching | Fluidity | Remarks |
|---|---|---|---|---|---|---|---|---|---|---|---|---|---|---|---|---|---|
| 1 | 10 | 0 | 0 | 0 | 0 | 0 | 0 | 0 | 0 | 0 | 0 | 0 | rest | no | $5 \times 10^2$ | 40 | |
| 2 | 25 | 0 | 0 | 0 | 0 | 0 | 0 | 0 | 0 | 0 | 0 | 0 | rest | no | $8 \times 10^2$ | 42 | |
| 3 | 40 | 0 | 0 | 0 | 0 | 0 | 0 | 0 | 0 | 0 | 0 | 0 | rest | no | $9 \times 10^2$ | 46 | |
| 4 | 0 | 4 | 4 | 1 | 0 | 0 | 0 | 0 | 0 | 0 | 0 | 0 | rest | no | $6 \times 10^2$ | 39 | |
| 5 | 0 | 6.5 | 6.5 | 1 | 0 | 0 | 0 | 0 | 0 | 0 | 0 | 3.5 | rest | no | $8 \times 10^2$ | 41 | HT[1] |
| 6 | 25 | 3.5 | 3.5 | 1 | 0 | 0 | 0 | 0 | 0 | 0 | 1.0 | 0 | rest | no | $9 \times 10^2$ | 45 | HT[1] |
| 7 | 30 | 2 | 2 | 1 | 0 | 0 | 0 | 0 | 0 | 0 | 0 | 0 | rest | no | $7 \times 10^2$ | 40 | |
| 8 | 25 | 0 | 0 | 0 | 1 | 0 | 1 | 0 | 0 | 2 | 0 | 0 | rest | no | $8 \times 10^2$ | 41 | |
| 9 | 25 | 0 | 0 | 0 | 0 | 0 | 0 | 1 | 1 | 2 | 0 | 0 | rest | no | $8 \times 10^2$ | 42 | |
| 10 | 25 | 0 | 0 | 0 | 0 | 0 | 0 | 0 | 0 | 0 | 0 | 0 | rest | C:1.5 | $7 \times 10^2$ | 51 | |
| 11 | 25 | 0 | 0 | 0 | 0 | 0 | 0 | 0 | 0 | 0 | 0 | 0 | rest | BN:15 | $7 \times 10^2$ | 49 | |
| 12 | 0 | 4 | 4 | 1 | 0 | 0 | 0 | 0 | 0 | 0 | 0 | 0 | rest | no | $8 \times 10^2$ | 47 | |
| 13 | 0 | 0 | 0 | 0 | 0 | 0 | 0 | 0 | 0 | 0 | 0 | 0 | rest | no | $1 \times 10^2$ | 38 | |
| 14 | 10 | 0 | 0 | 0 | 0 | a | 0 | a | 0 | 0 | 0 | 0 | rest | no | $2 \times 10$ | 36 | |
| 15 | 25 | 0 | 0 | 0 | a | 0 | 0 | 0 | 0 | 0 | 0 | 0 | rest | no | $7 \times 10$ | 37 | |
| 16 | 0 | 4 | 16 | 0.25 | 0 | 0 | 0 | 0 | 0 | 0 | 0 | 0 | rest | no | $8 \times 10^2$ | 40 | |
| 17 | 0 | 5 | 2 | 2.5 | 0 | 0 | 0 | 0 | 0 | 0 | 0 | 0 | rest | no | $5 \times 10^2$ | 38 | |
| 18 | 25 | 0 | 0 | 0 | 2 | 0 | 2 | 1 | 1 | 6 | 0 | 0 | rest | no | $9 \times 10^2$ | 46 | |
| 19 | 25 | 0 | 0 | 0 | 0 | 0 | 0 | 0 | 0 | 0 | 0 | 0 | rest | C:6.0 | $8 \times 10^2$ | unflowing | |
| 20 | 0 | 4 | 4 | 1 | 0 | 0 | 0 | 0 | 0 | 0 | 0 | 0 | rest | no | $7 \times 10^2$ | 46 | extrusion[2] |
| 21 | 0 | 4 | 4 | 1 | 0 | 0 | 0 | 0 | 0 | 0 | 0 | 0 | rest | no | $8 \times 10^2$ | 47 | forging[2] |
| 22 | 30 | 2 | 2 | 1 | 0 | 0 | 0 | 0 | 0 | 0 | 0 | 0 | rest | no | $2 \times 10^3$ | unflowing | |
| 23 | 40 | 0 | 0 | 0 | 0 | 0 | 0 | 0 | 0 | 0 | 0 | 0 | rest | no | $2 \times 10^3$ | 31 | granulating[3] |

(Nos. 1 to 12; inventive alloys, Nos. 13 to 23; comparative alloys)
[1]HT (heat treatment) conditions; 490° C. × 2 hr. - water cooling - 175° C. × 8 hr. - air cooling
[2]Hot extrusion was performed at extrusion ratio = 4 in No. 20 hot forging was performed with a forging surface pressure of 3 tons/cm² in No. 21.
[3]Raw material powder of 20 μm in mean grain size was subjected to granulating treatment, to be 80 μm in mean grain size.

Rapidly solidified aluminum alloy powder materials having the compositions shown in Table 3 were worked into powder compacts of 65% in true density ratio by cold stamp molding. The dimensions of each powder compact were 15×40×10 mm. These powder compacts were heated and held in an atmosphere which was fed with nitrogen gas (20 l/min.) under sintering conditions of 540° C.×1 hour, and thereafter immediately worked into powder solidified bodies of 100% in true density ratio by hot forging (6 tons/cm² in surface pressure). The dimensions of the powder solidified bodies were 16×41×5 mm. However, the samples No. 20 and No. 21 were subjected to hot solidification under conditions described in Table 3.

Table 4 shows characteristics of Si and AlN in aluminum alloys obtained in the aforementioned manner and material characteristics of the alloys.

TABLE 4

Material Characteristics of Aluminum Alloys

| | Si | | AlN | | | Si + AlN | Mechanical Characteristics | |
|---|---|---|---|---|---|---|---|---|
| No. | Maximum Diameter μm | Mean Diameter μm | Amount of Formation wt % | Maximum Diameter μm | Mean Diameter μm | Total Amount wt % | Hardness $H_R \cdot A$ | Transverse Rupture Strength MPa |
| 1 | 6 | 4 | 33 | 10 | 6 | 43 | 61 | 715 |
| 2 | 11 | 7 | 28 | 7 | 4 | 53 | 64 | 680 |
| 3 | 13 | 10 | 15 | 6 | 4 | 55 | 67 | 678 |
| 4 | 0 | 0 | 34 | 10 | 6 | 34 | 61 | 724 |
| 5 | 0 | 0 | 38 | 11 | 6 | 38 | 64 | 705 |
| 6 | 10 | 5 | 27 | 7 | 3 | 52 | 67 | 675 |
| 7 | 11 | 6 | 21 | 7 | 4 | 51 | 65 | 685 |
| 8 | 12 | 7 | 25 | 6 | 3 | 50 | 65 | 670 |
| 9 | 11 | 7 | 23 | 6 | 3 | 48 | 65 | 680 |
| 10 | 11 | 6 | 27 | 7 | 4 | 52 | 62 | 655 |
| 11 | 11 | 7 | 26 | 8 | 5 | 51 | 61 | 650 |
| 12 | 0 | 0 | 34 | 10 | 7 | 34 | 63 | 716 |
| 13 | 0 | 0 | <0.01 | 0 | 0 | 0 | unmeasurable | 980 |
| 14 | 11 | 6 | <0.01 | 0 | 0 | 10 | 18 | 835 |
| 15 | 12 | 7 | 2 | 4 | 2 | 27 | 31 | 775 |
| 16 | 0 | 0 | 35 | 11 | 7 | 35 | 71 | 413 |
| 17 | 0 | 0 | 31 | 10 | 6 | 31 | 64 | 475 |
| 18 | 10 | 5 | 26 | 8 | 4 | 51 | 67 | 423 |

TABLE 4-continued

Material Characteristics of Aluminum Alloys

| | Si | | AlN | | | Si + AlN | Mechanical Characteristics | Transverse |
| | | | | | | | | |
| No. | Maximum Diameter μm | Mean Diameter μm | Amount of Formation wt % | Maximum Diameter μm | Mean Diameter μm | Total Amount wt % | Hardness $H_R \cdot A$ | Rupture Strength MPa |
|---|---|---|---|---|---|---|---|---|
| 19 | 11 | 7 | 24 | 6 | 3 | 49 | 59 | 518 |
| 20 | 0 | 0 | 29 | 30 | 20 | 29 | 60 | 386 |
| 21 | 0 | 0 | 31 | 25 | 15 | 31 | 62 | 350 |
| 22 | 8 | 5 | 29 | 8 | 4 | 59 | 66 | 375 |
| 23 | 9 | 6 | 30 | 9 | 6 | 70 | 75 | 425 |

(Nos. 1 to 12; inventive alloys, Nos. 13 to 23; comparative alloys)

Further Table 5 shows results of evaluation of wear resistance (counter material: A390 ingot aluminum alloy) of the alloys of the present invention and comparative alloys by an abrasion test method shown in FIG. 14.

Figure 14:
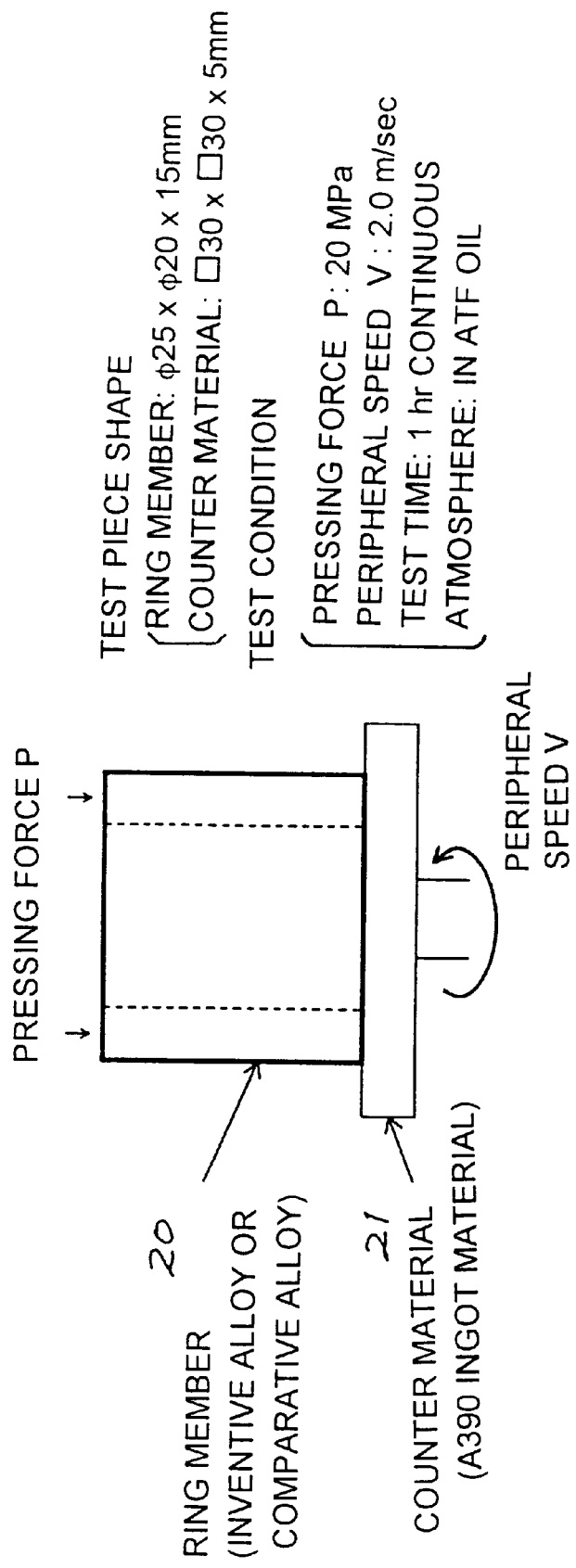
FIG. 14 is a diagram showing an abrasion test method.

Referring to FIG. 14, a ring member 20 consists of the inventive alloy or the comparative alloy, and a counter material 21 consists of an A390 ingot aluminum alloy. Pressing force P is applied to the ring member 20. The counter material 21 rotates at a peripheral speed V.

TABLE 5

Results of Abrasion Test and Durability Evaluation Test with Compressor

| | Results of Abrasion Test[1] | | | | Results of Continous 100 hr. Durability Evaluation Test with Compressor |
|---|---|---|---|---|---|
| No. | Ring Member g | Counter Material g | Abrasion Coefficient (μvalue) | Remarks | |
| 1 | 0.04 | 0.05 | 0.06 | | excellent with no abrasion/seizure |
| 2 | 0.02 | 0.03 | 0.04 | | excellent with no abrasion/seizure |
| 3 | 0.02 | 0.01 | 0.03 | | excellent with no abrasion/seizure |
| 4 | 0.03 | 0.02 | 0.04 | | excellent with no abrasion/seizure |
| 5 | 0.02 | 0.02 | 0.03 | | excellent with no abrasion/seizure |
| 6 | 0.03 | 0.03 | 0.04 | | excellent with no abrtsion/seizure |
| 7 | 0.02 | 0.02 | 0.03 | | excellent with no abrasion/seizure |
| 8 | 0.01 | 0.01 | 0.03 | | excellent with no abrasion/seizure |
| 9 | 0.02 | 0.01 | 0.03 | | excellent with no abrasion/seizure |
| 10 | 0.01 | 0.02 | 0.03 | | excellent with no abrasion/seizure |
| 11 | 0.01 | 0.01 | 0.03 | | excellent with no abrasion/seizure |
| 12 | 0.02 | 0.02 | 0.04 | | excellent with no abrasion/seizure |
| 13 | — | — | — | seized and stopped | seizure caused on forward end portion |
| 14 | — | — | — | seized and stopped | seizure caused on forward end portion |
| 15 | 1.56 | 4.25 | 0.77 | | seizure caused on forward end portion |
| 16 | 0.02 | 0.02 | 0.04 | | chipping caused in respective portions |
| 17 | 0.04 | 0.06 | 0.07 | | chipping caused in respective portions |
| 18 | 0.02 | 0.02 | 0.04 | | chipping caused in respective portions |
| 19 | 0.01 | 0.01 | 0.03 | | chipping caused in respective portlons |
| 20 | — | — | — | cracked during test | vane broken during test |
| 21 | — | — | — | cracked during test | vane broken during test |
| 22 | — | — | — | cracked during test | vane broken during test |
| 23 | 0.01 | 0.02 | 0.05 | | chipping caused in respective portions |

(Nos. 1 to 12; inventive alloys, Nos. 13 to 23; comparative alloys)
[1]The inventive alloy or comparative alloy was employed for ring member, A390 ingot aluminum alloy (T6 heat treated material) was employed for counter material.

Figure 15:
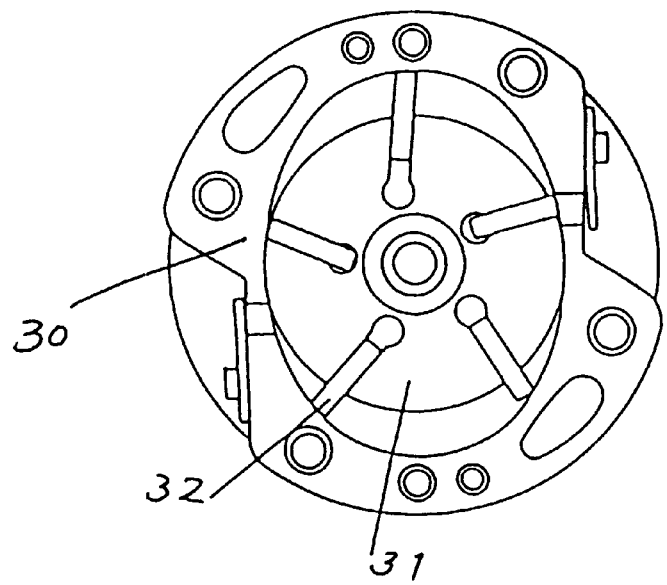
FIG. 15 is a side elevational view of a compressor.

Further each aluminum alloy was worked into the shape of a vane of 15×40×4 mm, and thereafter wear resistance and durability in relation to counter attackability were evaluated in a rotary compressor shown in FIG. 15. Referring to FIG. 15, numeral 30 denotes a cylinder, which consists of an A390 ingot aluminum alloy. Numeral 31 denotes a rotor, which consists of powder aluminum alloy of Al—17 Si—5 Fe—4 Cu—1 Mg. Numeral 32 denotes a vane, which consists of the inventive alloy or a comparative aluminum alloy. The test conditions were set at a rotational frequency of 5000 rpm and a test time of 100 hr. under an R134a substitutional fluorocarbon atmosphere (15 atm). Table 5 shows the results of this evaluation.

The powder compositions Nos. 1 to 12 are aluminum alloys according to the present invention, which had excellent mechanical characteristics and wear resistance, and caused neither abrasion damage nor seizure in the durability evaluation test in the actual compressor machine, but instead attained excellent results in wear resistance and counter attackability.

In relation to comparative examples Nos. 13 to 23, on the other hand, it has been recognized that these are not suitable for vane members, for the following reasons:

Sample No. 13:

Since pure aluminum powder was nitrided, no AlN was formed and it was impossible to ensure sufficient hardness and wear resistance, and hence seizure was caused on the forward end portion of the vane sliding in contact with the cylinder inner wall in the compressor machine evaluation as the result.

Sample No. 14:

Since the degree of quenching of the powder was small at $2 \times 10^0$ C./sec., direct nitriding reaction was not sufficiently facilitated and hence no AlN was formed and it was impossible to ensure sufficient hardness and wear resistance. Consequently, seizure was caused on the vane forward end portion sliding in contact with the cylinder inner wall in the compressor machine evaluation.

Sample No. 15:

Since the degree of quenching of the powder was small at $7 \times 10^0$ C./sec., direct nitriding reaction was not sufficiently facilitated and hence no AlN was formed and it was impossible to ensure sufficient hardness and wear resistance. Consequently, seizure was caused on the vane forward end portion sliding in contact with the cylinder inner wall in the compressor machine evaluation.

Sample No. 16:

Since the content of AlN and the content ratio (Fe/Ni) of Fe and Ni were not proper, intermetallic compounds dispersed in the base were converted into needle states and/or coarsened, whereby strength of the alloy was reduced and chipping was further recognized in respective portions of the vane in the compressor machine evaluation.

Sample No. 17:

Since the content ratio (Fe/Ni) of Fe and Ni was not proper, intermetallic compounds dispersed in the base were converted into needle states and/or coarsened, whereby strength of the alloy was reduced and chipping was further recognized in respective portions of the vane in the compressor machine evaluation.

Sample No. 18:

Since the total amount of addition of high melting point metal elements was large at 6 weight %, strength and toughness of the alloy were reduced, and hence chipping was recognized in respective portions of the vane in the compressor machine evaluation as the result.

Sample No. 19:

Since the amount of addition of the solid lubricant component (graphite) was large at 6 weight %, strength of the alloy was reduced, whereby chipping was recognized in respective portions of the vane in the compressor machine evaluation as the result.

Sample No. 20:

Since the extrusion ratio in hot extrusion was not sufficient at 4, fine pulverization of AlN and closure of holes were not sufficient, whereby strength of the alloy was reduced while breakage of the test piece in the abrasion test and chipping of respective portions of the vane material in the compressor machine evaluation were recognized as the result.

Sample No. 21:

Since the forging surface pressure in hot forging was not sufficient at 3 tons/cm$^2$, fine pulverization of AlN and closure of holes were not sufficient, whereby strength of the alloy was reduced while breakage of the test piece in the abrasion test and chipping of respective portions of the vane material in the compressor machine evaluation were recognized as the result.

Sample No. 22:

Powder charging was not homogeneously performed in powder molding since flowability of the powder was inferior, whereby AlN formation amounts in the interior of the sintered body were varied in respective portions, and hence strength of the hot solidified alloy was reduced while breakage of the test piece in the abrasion test and chipping of respective portions of the vane material in the compressor machine evaluation were recognized as the result.

Sample No. 23:

Since the total of the Si amount and the AlN formation amount was large at 70 weight %, strength and toughness of the alloy were reduced as the result, and breakage of the test piece in the abrasion test and chipping of respective portions of the vane material in the compressor machine evaluation were recognized.

EXAMPLE 5

The following Table 6 shows manufacturing conditions of example methods used for making respective sample materials in accordance with the present Example 5.

TABLE 6

| | | | Manufacturing Conditions | | | | | | | |
|---|---|---|---|---|---|---|---|---|---|---|
| | Molding Surface Pressure | Density Ratio % of | Heating Sintering Conditions[1] | | | | Time Solidification Method[2] | | Density Ratio % of Solidified | |
| No. | l/cm$^2$ | Compact | Temperature ° C. | Time hr | Atmosphere | Re-heating | Forging | Extrusion | Body | Remarks |
| 1 | 2.5 | 65 | 540 | 1.0 | nitrogen | no | 6 | — | 100 | |
| 2 | 2.5 | 65 | 540 | 1.0 | nitrogen | 48° C. × 10 min. | 6 | — | 100 | |
| 3 | 3.0 | 75 | 540 | 1.0 | nitrogen | no | 6 | — | 100 | |
| 4 | 2.5 | 65 | 510 | 1.0 | nitrogen | no | 6 | — | 100 | |
| 5 | 2.5 | 65 | 565 | 1.0 | nitrogen | no | 6 | — | 100 | |
| 6 | 2.5 | 65 | 540 | 0.5 | nitrogen | no | 6 | — | 100 | |
| 7 | 2.5 | 65 | 540 | 4.0 | nitrogen | no | 6 | — | 100 | |

TABLE 6-continued

Manufacturing Conditions

| No. | Molding Surface Pressure l/cm² | Density Ratio % of Compact | Heating Sintering Conditions[1] Temperature °C | Time hr | Atmosphere | Re-heating | Time Solidification Method[2] Forging | Extrusion | Density Ratio % of Solidified Body | Remarks |
|---|---|---|---|---|---|---|---|---|---|---|
| 8 | 2.5 | 65 | 540 | 1.0 | nitrogen | no | 4 | — | 98 | |
| 9 | 2.5 | 65 | 540 | 1.0 | nitrogen | no | — | 7 | 99 | |
| 10 | 2.5 | 65 | 540 | 1.0 | nitrogen | no | — | 10 | 100 | |
| 11 | 2.0 | 55 | 540 | 1.0 | nitrogen | no | — | 10 | 100 | |
| 12 | 2.5 | 65 | 540 | 1.0 | nitrogen | 450° C. × 20 min. | — | 10 | 100 | |
| 13 | 1.5 | 40 | — | — | — | — | — | — | — | compact cracking caused |
| 14 | 7.5 | 88 | 540 | 1.0 | nitrogen | no | 6 | — | 100 | |
| 15 | 2.5 | 65 | 460 | 4.0 | nitrogen | no | 6 | — | 100 | |
| 16 | 2.5 | 65 | 600 | 1.0 | nitrogen | no | 6 | — | 100 | |
| 17 | 2.5 | 65 | 540 | 0.2 | nitrogen | no | 6 | — | 100 | |
| 18 | 2.5 | 65 | 540 | 1.0 | in atmosphere | no | 6 | — | 100 | |
| 19 | 2.5 | 65 | 540 | 1.0 | nitrogen | no | 2 | — | 88 | |
| 20 | 2.5 | 65 | 540 | 1.0 | nitrogen | no | — | 4 | 91 | |
| 21 | 2.5 | 65 | 540 | 1.0 | nitrogen | 350° C. × 20 min. | — | 10 | 94 | |
| 22 | 2.5 | 65 | 540 | 1.0 | nitrogen | 560° C. × 20 min. | — | 10 | 100 | |

(Nos. 1 to 12; inventive methods, Nos. 13 to 22; comparative methods)
[1]Nitrogen gas flow rate was set at 20 l/min.
[2]Forging expresses surface pressure (tons/cm², extrusion expresses extrusion ratio.

On the basis of the manufacturing conditions shown in Table 6, powder compacts consisting of the rapidly solidified aluminum alloy powder of the sample No. 7 in Table 3 were prepared. The dimensions of the powder compacts were 16×41×5 mm.

Table 7 shows characteristics of Si and AlN in the aluminum alloys thus obtained and material characteristics of the alloys.

TABLE 7

Material Characteristics of Aluminum Alloys

| | Si | | | AlN | | Si + AlN | Mechanical Characteristics | |
|---|---|---|---|---|---|---|---|---|
| No. | Maximum Diameter μm | Mean Diameter μm | Amount of Formation wt % | Maximum Diameter μm | Mean Diameter μm | Total Amount wt % | Hardness $H_R \cdot A$ | Transverse Rupture Strength MPa |
| 1 | 11 | 6 | 21 | 7 | 4 | 51 | 65 | 685 |
| 2 | 10 | 5 | 20 | 8 | 5 | 50 | 64 | 675 |
| 3 | 10 | 5 | 13 | 7 | 4 | 43 | 62 | 702 |
| 4 | 9 | 5 | 18 | 7 | 3 | 48 | 64 | 680 |
| 5 | 15 | 10 | 27 | 10 | 8 | 57 | 68 | 655 |
| 6 | 9 | 5 | 16 | 8 | 4 | 46 | 63 | 689 |
| 7 | 13 | 8 | 25 | 9 | 5 | 55 | 66 | 674 |
| 8 | 11 | 6 | 20 | 8 | 5 | 50 | 63 | 662 |
| 9 | 10 | 4 | 20 | 6 | 4 | 50 | 64 | 705 |
| 10 | 9 | 4 | 21 | 7 | 4 | 51 | 64 | 713 |
| 11 | 11 | 6 | 25 | 9 | 5 | 55 | 66 | 694 |
| 12 | 12 | 5 | 20 | 8 | 6 | 50 | 63 | 671 |
| 13 | — | — | — | — | — | — | — | — |
| 14 | 12 | 6 | 1 | 4 | 2 | 31 | 27 | 785 |
| 15 | 9 | 4 | <0.01 | — | — | 30 | 26 | 760 |
| 16 | 18 | 15 | 35 | 12 | 7 | 65 | 71 | 388 |
| 17 | 10 | 6 | 2 | 5 | 2 | 32 | 29 | 750 |
| 18 | 11 | 6 | <0.01 | — | — | 30 | 26 | 755 |
| 19 | 11 | 6 | 20 | 8 | 4 | 50 | 53 | 379 |
| 20 | 12 | 5 | 21 | 8 | 5 | 51 | 55 | 395 |
| 21 | 11 | 5 | 20 | 8 | 5 | 50 | 58 | 403 |
| 22 | 22 | 17 | 20 | 9 | 5 | 50 | 57 | 386 |

(Nos. 1 to 12; inventive alloys, Nos. 13 to 22; comparative alloys)

Table 8 shows results of evaluation of wear resistance (counter material: A390 ingot aluminum alloy) of the inventive alloys and the comparative alloys by the abrasion test method shown in FIG. 14.

TABLE 8

Results of Abrasion Test and Durability Evaluation Test with Compressor

| No. | Results of Abrasion Test[1] | | | | Results of Continuous 100 hr. Durability Evaluation Test with Compressor |
|---|---|---|---|---|---|
| | Ring Member g | Counter Material g | Abrasion Coefficient (μvalue) | Remarks | |
| 1 | 0.02 | 0.02 | 0.03 | | excellent with no abrasion/seizure |
| 2 | 0.03 | 0.03 | 0.04 | | excellent with no abrasion/seizure |
| 3 | 0.04 | 0.05 | 0.06 | | excellent with no abrasion/seizure |
| 4 | 0.02 | 0.03 | 0.04 | | excellent with no abrasion/seizure |
| 5 | 0.01 | 0.02 | 0.03 | | excellent with no abrasion/seizure |
| 6 | 0.04 | 0.05 | 0.07 | | excellent with no abrasion/seizure |
| 7 | 0.01 | 0.01 | 0.03 | | excellent with no abrasion/seizure |
| 8 | 0.02 | 0.03 | 0.03 | | excellent with no abrasion/seizure |
| 9 | 0.02 | 0.01 | 0.03 | | excellent with no abrasion/seizure |
| 10 | 0.02 | 0.02 | 0.04 | | excellent with no abrasion/seizure |
| 11 | 0.01 | 0.01 | 0.03 | | excellent with no abrasion/seizure |
| 12 | 0.02 | 0.02 | 0.03 | | excellent with no abrasion/seizure |
| 13 | — | — | — | sample unpreparable | actual machine test impossible |
| 14 | 1.15 | 3.75 | 0.69 | | seizure caused on torward end portion |
| 15 | — | — | — | seized and test stopped | seizure caused on forward end portion |
| 16 | — | — | — | cracking caused during test | vane broken during test |
| 17 | 1.06 | 3.40 | 0.54 | | seizure caused on forward end portion |
| 18 | — | — | — | seized and test stopped | seizure caused on forward end portion |
| 19 | — | — | — | cracking caused during test | vane broken during test |
| 20 | — | — | — | cracking caused during test | vane broken during test |
| 21 | — | — | — | cracking caused during test | vane broken during test |
| 22 | — | — | — | cracking caused during test | vane broken during test |

(Nos. 1 to 12; inventive alloys, Nos. 13 to 22; comparative alloys)
[1]The inventive alloy or comparative alloy was employed for ring member, A390 ingot aluminum alloy (T6 heat treated material) was employed for counter material.

Further each aluminum alloy was worked into the shape of a vane of 15×40×4 mm, and thereafter wear resistance and durability in relation to counter attackability were evaluated using the rotary compressor shown in FIG. 15 (cylinder part: A390 ingot aluminum alloy, rotor part: powder aluminum alloy of Al—17 Si—5 Fe—4 Cu—1 Mg composition). The test conditions were set at a rotational frequency of 5000 rpm and a test time of 100 hr. under an R134a substitutional fluorocarbon atmosphere (15 atm). Table 8 shows the results of the evaluation.

The samples Nos. 1 to 12 are alloys according to the inventive manufacturing method, which had excellent mechanical characteristics and wear resistance and caused neither abrasion damage nor seizure in the durability evaluation test using the exact compression machine but instead attained excellent results in wear resistance and counter attackability.

In comparative examples Nos. 13 to 22, on the other hand, it has been recognized that these are not suitable for vane members, for the following reasons:

Sample No. 13:

Since the true density ratio of the compact was small at 40%, the compact did not have sufficient compact strength but was broken during handling, and it was impossible to prepare a sample.

Sample No. 14:

It was not possible to form sufficient AlN since the true density ratio of the compact was large at 88% and nitrogen gas did not homogeneously flow into the interior of the compact in the sintering process, whereby wear resistance of the alloy was so reduced that seizure was caused on the vane forward end portion in the compressor machine evaluation as the result.

Sample No. 15:

AlN formed by direct nitriding reaction was not sufficiently obtained since the sintering temperature was low at 460° C., whereby wear resistance of the alloy was so reduced that seizure was caused on the vane forward end portion in the actual machine compressor evaluation as the result.

Sample No. 16:

Si crystals and intermetallic compounds dispersed in the base were coarsely grown since the sintering temperature was high at 600° C., whereby strength and toughness of the alloy were reduced to cause cracking of the sample in the abrasion test and breakage of the vane in the compressor machine evaluation.

Sample No. 17:

AlN formed by direct nitriding reaction was not sufficiently obtained since the sintering time was short at 0.2 hours (12 minutes), whereby wear resistance of the alloy was so reduced that seizure was caused on the vane forward end portion in the compressor machine evaluation as the result.

Sample No. 18:

It was absolutely impossible to form AlN since the sintering was performed in the atmosphere, whereby wear resistance of the alloy was reduced to cause problems such as seizure with the counter material in the abrasion test and seizure of the vane forward end portion in the compressor machine evaluation.

Sample No. 19:

AlN formed in the sintered body was not finely dispersed and holes in the sintered body were not sufficiently closed since the forging surface pressure was low at 2 tons/cm² in the hot forging process, whereby strength and toughness of the alloy were so reduced that cracking of the sample in the abrasion test and breakage of the vane in the compressor machine evaluation were caused as the result.

Sample No. 20:

AlN formed in the sintered body was not finely dispersed and holes in the sintered body were not sufficiently closed since the extrusion ratio was low at 4 in the hot extrusion process, whereby strength and toughness of the alloy were so reduced that cracking of the sample in the abrasion test and breakage of the vane in the compressor machine evaluation were caused as the result.

Sample No. 21:

Holes in the sintered body were not sufficiently closed since the heating temperature in case of re-heating the sintered body was low at 350° C., whereby strength and toughness of the alloy were so reduced that cracking of the sample in the abrasion test and breakage of the vane in the compressor machine evaluation were caused as the result.

Sample No. 22:

Si crystals and intermetallic compounds dispersed in the base were coarsely grown since the heating temperature in case of re-heating the sintered body was high at 560° C., whereby strength and toughness of the alloy were so reduced that cracking of the sample in the abrasion test and breakage of the vane in the compressor machine evaluation were caused as the result.

According to the present invention, rapidly solidified aluminum alloy powder is employed as a starting material for homogeneously forming AlN in a powder compact by directly reacting Al of a base and nitrogen gas through an exothermic phenomenon thereof when the same is heated in a nitrogen gas atmosphere after being stamped or molded. Further, it is possible to obtain a slide member of a sintered aluminum alloy which is excellent in wear resistance, seizure resistance and high temperature strength by solidifying this powder compact by hot forging working. In the slide member of an aluminum alloy according to the present invention, in addition, a frictional coefficient i value in an abrasion test is 0.03 to 0.07, which is extremely low as compared with a conventional sliding material.

EXAMPLE 6

The following Table 9 shows the composition, degree of quenching and fluidity of sample materials used for making samples according to the present Example 6.

TABLE 9

Composition (wt. %), Degree of Quenching (° C./sec.) and Fluidity (sec/50 g: 4 mmφ Orifice Tube)

| No. | Si | Fe | Ni | Fe/Ni | Cr | Ti | Mo | Zr | V | Total | Mg | Cu | Al | Lubricant Component | Degree of Quenching | Fluidity | Remarks |
|---|---|---|---|---|---|---|---|---|---|---|---|---|---|---|---|---|---|
| 1 | 10 | 0 | 0 | 0 | 0 | 0 | 0 | 0 | 0 | 0 | 0 | 0 | rest | no | $5 \times 10^2$ | 40 | |
| 2 | 25 | 0 | 0 | 0 | 0 | 0 | 0 | 0 | 0 | 0 | 0 | 0 | rest | no | $8 \times 10^2$ | 42 | |
| 3 | 40 | 0 | 0 | 0 | 0 | 0 | 0 | 0 | 0 | 0 | 0 | 0 | rest | no | $9 \times 10^2$ | 46 | |
| 4 | 0 | 4 | 4 | 1 | 0 | 0 | 0 | 0 | 0 | 0 | 0 | 0 | rest | no | $6 \times 10^2$ | 39 | |
| 5 | 0 | 6.5 | 6.5 | 1 | 0 | 0 | 0 | 0 | 0 | 0 | 0 | 3.5 | rest | no | $5 \times 10^2$ | 41 | HT[1)] |
| 6 | 25 | 3.5 | 3.5 | 1 | 0 | 0 | 0 | 0 | 0 | 0 | 1.0 | 0 | rest | no | $9 \times 10^2$ | 45 | HT[1)] |
| 7 | 30 | 2 | 2 | 1 | 0 | 0 | 0 | 0 | 0 | 0 | 0 | 0 | rest | no | $7 \times 10^2$ | 40 | |
| 8 | 25 | 0 | 0 | 0 | 1 | 0 | 1 | 0 | 0 | 2 | 0 | 0 | rest | no | $8 \times 10^2$ | 41 | |
| 9 | 25 | 0 | 0 | 0 | 0 | 0 | 0 | 1 | 1 | 2 | 0 | 0 | rest | no | $8 \times 10^2$ | 42 | |
| 10 | 25 | 0 | 0 | 0 | 0 | 0 | 0 | 0 | 0 | 0 | 0 | 0 | rest | C:1.5 | $7 \times 10^2$ | 51 | |
| 11 | 25 | 0 | 0 | 0 | 0 | 0 | 0 | 0 | 0 | 0 | 0 | 0 | rest | BN:1.5 | $7 \times 10^2$ | 49 | |
| 12 | 0 | 4 | 4 | 1 | 0 | 0 | 0 | 0 | 0 | 0 | 0 | 0 | rest | no | $8 \times 10^2$ | 47 | |
| 13 | 0 | 0 | 0 | 0 | 0 | 0 | 0 | 0 | 0 | 0 | 0 | 0 | rest | no | $1 \times 10^2$ | 38 | |
| 14 | 10 | 0 | 0 | 0 | 0 | 0 | 0 | 0 | 0 | 0 | 0 | 0 | rest | no | $2 \times 10$ | 36 | |
| 15 | 25 | 0 | 0 | 0 | 0 | 0 | 0 | 0 | 0 | 0 | 0 | 0 | rest | no | $7 \times 10$ | 37 | |
| 16 | 0 | 4 | 16 | 0.25 | 0 | 0 | 0 | 0 | 0 | 0 | 0 | 0 | rest | no | $8 \times 10^2$ | 40 | |
| 17 | 0 | 5 | 2 | 2.5 | 0 | 0 | 0 | 0 | 0 | 0 | 0 | 0 | rest | no | $5 \times 10^2$ | 38 | |
| 18 | 25 | 0 | 0 | 0 | 2 | 0 | 2 | 1 | 1 | 6 | 0 | 0 | rest | no | $9 \times 10^2$ | 46 | |
| 19 | 25 | 0 | 0 | 0 | 0 | 0 | 0 | 0 | 0 | 0 | 0 | 0 | rest | C:6.0 | $8 \times 10^2$ | unflowing | |
| 20 | 0 | 4 | 4 | 1 | 0 | 0 | 0 | 0 | 0 | 0 | 0 | 0 | rest | no | $8 \times 10^2$ | 47 | forging[2)] |
| 21 | 30 | 2 | 2 | 1 | 0 | 0 | 0 | 0 | 0 | 0 | 0 | 0 | rest | no | $2 \times 10^2$ | unflowing | |
| 22 | 40 | 0 | 0 | 0 | 0 | 0 | 0 | 0 | 0 | 0 | 0 | 0 | rest | no | $2 \times 10^2$ | 31 | granulating[3)] |

(Nos. 1 to 12; inventive alloys, Nos. 13 to 22; comparative alloys)
HT (heat treatment) conditions; 490° C. × 2 hr. - water cooling - 175° C. × 8 hr. - air cooling
[2)]Hot forging was performed at forging surface pressure of 3 tons/cm².
[3)]Raw material powder of 20 μm in mean grain size was subjected to granulating treatment, to be 80 μm in mean grain size.

Rapidly solidified aluminum alloy powder materials having the compositions shown in Table 9 were worked into powder compacts of 65% in true density ratio by cold stamp molding. The dimensions of each powder compact were 95 mm in length×40 mm in width×10 mm in thickness. These powder compacts were heated and held in an atmosphere which was fed with nitrogen gas (20 l/min.) under sintering conditions of 540° C.×1 hour, and thereafter immediately worked into powder solidified bodies of 100% in true density ratio by hot forging (7 tons/cm² in surface pressure). The dimensions of the powder solidified bodies were 96×41×5 mm.

A plurality of V-shaped projecting wedges each having a cross-directional length of 40 mm, a height of 2 mm and a forward end angle of 60° are provided on a pressurizing surface of an upper punch mold. These wedges are provided in six locations at intervals of 15 mm along the longitudinal direction. Therefore, V grooves of the same shapes being 40 mm in width are formed in a pressurized surface of each powder solidified body during forging. Then, each powder solidified body was ruptured by applying a shearing load to the pressurized surface, for continuously preparing six aluminum powder alloy samples having prescribed shapes (15×40×5 mm) from one base material. However, the sample No. 20 was prepared by hot forging under the conditions described in Table 9.

Table 10 shows characteristics of Si and AlN in the aluminum alloys obtained in the aforementioned manner and material characteristics of the alloys.

TABLE 10

Material Characteristics of Aluminum Alloys

| | Si | | | AlN | | Si + AlN | Mechanical Characteristics | |
|---|---|---|---|---|---|---|---|---|
| | | | | | | | | Transverse |
| No. | Maximum Diameter $\mu$m | Mean Diameter $\mu$m | Amount of Formation wt % | Maximum Diameter $\mu$m | Mean Diameter $\mu$m | Total Amount wt % | Hardness $H_R \cdot A$ | Rupture Strength MPa |
| 1 | 6 | 4 | 33 | 10 | 6 | 43 | 61 | 715 |
| 2 | 11 | 7 | 28 | 7 | 4 | 53 | 64 | 680 |
| 3 | 13 | 10 | 15 | 6 | 4 | 55 | 67 | 678 |
| 4 | 0 | 0 | 34 | 10 | 6 | 34 | 61 | 724 |
| 5 | 0 | 0 | 38 | 11 | 6 | 38 | 64 | 705 |
| 6 | 10 | 5 | 27 | 7 | 3 | 52 | 67 | 675 |
| 7 | 11 | 6 | 21 | 7 | 4 | 51 | 65 | 685 |
| 8 | 12 | 7 | 25 | 6 | 3 | 50 | 65 | 670 |
| 9 | 11 | 7 | 23 | 6 | 3 | 48 | 65 | 680 |
| 10 | 11 | 6 | 27 | 7 | 4 | 52 | 62 | 655 |
| 11 | 11 | 7 | 26 | 8 | 5 | 51 | 61 | 6S0 |
| 12 | 0 | 0 | 34 | 10 | 7 | 34 | 63 | 716 |
| 13 | 0 | 0 | <0.01 | 0 | 0 | 0 | unmeasurable | 980 |
| 14 | 11 | 6 | <0.01 | 0 | 0 | i0 | 18 | 835 |
| 15 | 12 | 7 | 2 | 4 | 2 | 27 | 31 | 775 |
| 16 | 0 | 0 | 35 | 11 | 7 | 35 | 71 | 413 |
| 17 | 0 | 0 | 31 | 10 | 6 | 31 | 64 | 475 |
| 18 | 10 | 5 | 26 | 8 | 4 | 51 | 67 | 423 |
| 19 | 11 | 7 | 24 | 6 | 3 | 49 | 59 | 518 |
| 20 | 0 | 0 | 31 | 25 | 15 | 31 | 62 | 350 |
| 21 | 8 | 5 | 29 | 8 | 4 | 59 | 66 | 375 |
| 22 | 9 | 6 | 30 | 9 | 6 | 70 | 75 | 425 |

(Nos. 1 to 12; inventive alloys, Nos. 13 to 22; comparative alloys)

Further, Table 11 shows the results of evaluating wear resistance (counter material: A390 ingot aluminum alloy) of the inventive alloys and comparative alloys by the abrasion test method shown in FIG. 14.

TABLE 11

Results of Abrasion Test and Durability Evaluation Test with Compressor

| | Results of Abrasion Test[1] | | | | |
|---|---|---|---|---|---|
| No. | Ring Member g | Counter Material g | Abrasion Coefficient ($\mu$value) | Remarks | Results of Continous 100 hr. Durability Evaluation Test with Compressor |
| 1 | 0.04 | 0.05 | 0.06 | | excellent with no abrasion/seizure |
| 2 | 0.02 | 0.03 | 0.04 | | excellent with no abrasion/seizure |
| 3 | 0.02 | 0.01 | 0.03 | | excellent with no abrasion/seizure |
| 4 | 0.03 | 0.02 | 0.04 | | excellent with no abrasion/seizure |
| S | 0.02 | 0.02 | 0.03 | | excellent with no abrasion/seizure |
| 6 | 0.03 | 0.03 | 0.04 | | excellent with no abrasion/seizure |
| 7 | 0.02 | 0.02 | 0.03 | | excellent with no abrasion/seizure |
| 8 | 0.01 | 0.01 | 0.03 | | excellent with no abrasion/seizure |
| 9 | 0.02 | 0.01 | 0.03 | | excellent with no abrasion/seizure |
| 10 | 0.01 | 0.02 | 0.03 | | excellent with no abrasion/seizure |

TABLE 11-continued

Results of Abrasion Test and Durability Evaluation Test with Compressor

| No. | Results of Abrasion Test[1] | | | | Results of Continous 100 hr. Durability Evaluation Test with Compressor |
|---|---|---|---|---|---|
| | Ring Member g | Counter Material g | Abrasion Coefficient ($\mu$value) | Remarks | |
| 11 | 0.01 | 0.01 | 0.03 | | excellent with no abrasion/seizure |
| 12 | 0.02 | 0.02 | 0.04 | | excellent with no abrasion/seizure |
| 13 | — | — | — | seized and stopped | seizure caused on forward end portion |
| 14 | — | — | — | seized and stopped | seizure caused on forward end portion |
| 15 | 1.56 | 4.25 | 0.77 | | seizure caused on forward end portion |
| 16 | 0.02 | 0.02 | 0.04 | | chipping caused in respective portions |
| 17 | 0.04 | 0.06 | 0.07 | | chipping caused in respective portions |
| 18 | 0.02 | 0.02 | 0.04 | | chipping caused in respective portions |
| 19 | 0.01 | 0.01 | 0.03 | | chipping caused in respective portions |
| 20 | — | — | — | cracked during test | vane broken during test |
| 21 | — | — | — | cracked during test | Vane broken during test |
| 22 | 0.01 | 0.02 | 0.05 | | chipping caused in respective portions |

(Nos. 1 to 12; inventive alloys, Nos. 13 to 22; comparative alloys)
[1] The inventive alloy or comparative alloy was employed for ring member, A390 ingot aluminum alloy (T6 heat treated material) was employed for counter material.

Further, each aluminum alloy was worked into the shape of a vane of 15×40×4 mm, and thereafter wear resistance and durability in relation to counter attackability were evaluated using the rotary compressor shown in FIG. 15 (cylinder part: A390 ingot aluminum alloy, rotor part: powder aluminum alloy of Al—17 Si—Fe—4 Cu—1 Mg composition). The test conditions were set at a rotational frequency of 5000 rpm and a test time of 100 hr. under an R134a substitutional fluorocarbon atmosphere (15 atm). Table 11 shows the results of the evaluation.

The powder compositions Nos. 1 to 12 are aluminum alloys obtained according to the manufacturing method of the present invention, had prescribed vane shapes (40×15×5 mm) with neither chipping of end portions in rupture steps nor presence of fine cracks, had excellent mechanical characteristics and wear resistance, caused neither abrasion damage nor seizure in the durability evaluation test using the compressor machine, and attained excellent results in wear resistance and counter attackability.

In relation to comparative examples Nos. 13 to 22, on the other hand, it has been recognized that these are not suitable for vane members, for the following reasons:

Sample No. 13:

No AlN was formed and it was impossible to ensure sufficient hardness and wear resistance since pure aluminum powder was nitrided, whereby seizure was caused on the vane forward end portion sliding in content with the cylinder inner wall in the compressor machine evaluation.

Sample No. 14:

Direct nitriding reaction was not sufficiently facilitated since the degree of quenching of the powder was small at 2×10° C./sec., and hence no AlN was formed and it was impossible to ensure sufficient hardness and wear resistance. As the result, seizure was caused on the vane forward end portion sliding in contact with the cylinder inner wall in the compressor machine evaluation.

Sample No. 15:

Direct nitriding reaction was not sufficiently facilitated since the degree of quenching of the powder was small at 7×10° C./sec., and hence no AlN was formed and it was impossible to ensure sufficient hardness and wear resistance. As the result, seizure was caused on the vane forward end portion sliding in contact with the cylinder inner wall in the compressor machine evaluation.

Sample No. 16:

Since the content of AlN and the content ratio (Fe/Ni) of Fe and Ni were not proper, intermetallic compounds dispersed in the base were converted into needle states and/or coarsened whereby strength of the alloy was reduced and chipping was further recognized in respective portions of the vane in the compressor machine evaluation.

Sample No. 17:

Since the content ratio (Fe/Ni) of Fe and Ni was not proper, intermetallic compounds dispersed in the base were converted into needle states and/or coarsened, whereby strength of the alloy was reduced and chipping was further recognized in respective portions of the vane in the compressor machine evaluation.

Sample No. 18:

Since the total amount of addition of high melting point metal elements was large at 6 weight %, strength and toughness of the alloy were reduced, whereby chipping was recognized in respective portions of the vane in the compressor machine evaluation as the result.

Sample No. 19:

Since the amount of addition of the solid lubricant component (graphite) was large at 6 weight %, strength of the alloy was reduced, whereby chipping was recognized in respective portions of the vane in the compressor machine evaluation as the result.

Sample No. 20:

Fine pulverization of AlN and closure of holes were not sufficient since the forging surface pressure in the hot forging process was not sufficient at 3 tons/cm$^2$, whereby strength of the alloy was so reduced that breaking of the test piece in the abrasion test and chipping of respective portions of the vane material in the compressor machine evaluation were recognized as the result.

Sample No. 21:

The powder was not homogeneously charged into the mold during powder molding since flowability of the powder was inferior, whereby AlN formation amounts in the interior of the sintered body varied in different respective portions, and hence strength of the hot solidified alloy was reduced while breakage of the test piece in the abrasion test and chipping of respective portions of the vane material in the compressor machine evaluation were recognized.

Sample No. 22:

Since the total of the Si amount and the AlN formation amount was large at 70 weight %, strength and toughness of the alloy were so reduced that breakage of the test piece in the abrasion test and chipping of respective portions of the vane material in the compressor machine evaluation were recognized.

EXAMPLE 7

The following Table 12 shows manufacturing conditions of example methods used for making samples in accordance with the present Example 7 of the invention.

The rapidly solidified aluminum alloy powder having the composition of the sample No. 7 in Table 9 was cold stamp molded, to prepare a powder compact of 65% in true density ratio (the dimensions were 95 mm in length×40 mm in width×10 mm in thickness). Then, a powder solidified body was prepared by hot forging this powder compact on the basis of the manufacturing conditions shown in Table 12, and then the powder solidified body was ruptured by applying a shearing load to the pressurized surface, for continuously preparing six aluminum powder alloy samples having prescribed shapes (15×40×5 mm) from one base material.

Table 13 shows characteristics of Si and AlN in the aluminum alloys thus obtained and material characteristics of the alloys.

TABLE 12

Manufacturing Conditions

| No. | Molding Surface Pressure t/cm² | Density Ratio % of Compact | Heating Sintering Conditions¹⁾ Temperature ° C. | Time hr | Atmosphere | Re-heating | Hot Forging Method Surface Pressure²⁾ | Groove Shape³⁾ | Density Ratio % of Solidified Body | Remarks |
|---|---|---|---|---|---|---|---|---|---|---|
| 1 | 2.5 | 65 | 540 | 1.0 | nitrogen | no | 7 | one side (a) | 100 | |
| 2 | 2.5 | 65 | 540 | 1.0 | nitrogen | 480° C. × 10 min. | 6 | one side (a) | 100 | |
| 3 | 3.0 | 75 | 540 | 1.0 | nitrogen | no | 6 | one side (b) | 100 | |
| 4 | 2.5 | 65 | 510 | 1.0 | nitrogen | no | 7 | one side (b) | 100 | |
| 5 | 2.5 | 65 | 565 | 1.0 | nitrogen | no | 6 | one side (a) | 100 | |
| 6 | 2.5 | 65 | 540 | 0.5 | nitrogen | no | 6 | one side (a) | 100 | |
| 7 | 2.5 | 65 | 540 | 4.0 | nitrogen | no | 6 | both sides (a) | 100 | |
| 8 | 2.5 | 65 | 540 | 1.0 | nitrogen | no | 4.5 | both sides (a) | 98 | |
| 9 | 2.5 | 65 | 540 | 1.0 | nitrogen | 450° C. × 20 min. | 6 | both sides (b) | 100 | |
| 10 | 1.5 | 40 | — | — | — | — | — | — | — | compact cracking caused |
| 11 | 7.5 | 88 | 540 | 1.0 | nitrogen | no | 7 | one side (a) | 100 | |
| 12 | 2.5 | 65 | 460 | 4.0 | nitrogen | no | 6 | one side (a) | 100 | |
| 13 | 2.5 | 65 | 600 | 1.0 | nitrogen | no | 6 | one side (a) | 100 | |
| 14 | 2.5 | 65 | 540 | 0.2 | nitrogen | no | 6 | one side (b) | 100 | |
| 15 | 2.5 | 65 | 540 | 1.0 | in atmosphere | no | 6 | one side (a) | 100 | |
| 16 | 2.5 | 65 | 540 | 1.0 | nitrogen | no | 2 | one side (a) | 88 | |
| 17 | 2.5 | 65 | 540 | 1.0 | nitrogen | no | 6 | no groove | 100 | pulverized in rupturing |
| 18 | 2.5 | 65 | 540 | 1.0 | nitrogen | 350° C. × 20 min. | 6 | one side (a) | 94 | |
| 19 | 2.5 | 65 | 540 | 1.0 | nitrogen | 560° C. × 20 min. | 6 | both sides (a) | 300 | |

(Nos. 1 to 9; inventive methods, Nos. 10 to 19; comparative methods)
¹⁾Nitrogen gas flow rate was set at 20 l/min.
²⁾Unit of surface pressure in forging is tons/cm²
"Single side": means case of providing groove only on single surface, "both sides": means case of providing grooves on both surfaces respectively. In the case of both sides, grooves were so provided that straight lines connecting groove forward ends were perpendicular to pressurized surfaces. V and oblique V groove shapes are shown in the following figures respectively, and denoted as (a) and (b) respectively.

forward end angle 60°

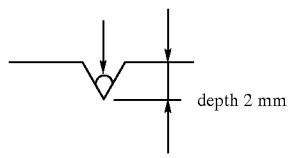

depth 2 mm (a) V-shaped groove forward end angle 45°

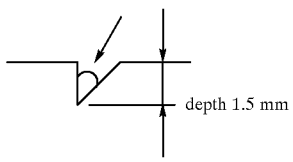

depth 1.5 mm (b) oblique V-shaped groove

TABLE 13

Material Characteristics of Aluminum Alloys

| | Si | | | AlN | | Si + AlN | Mechanical Characteristics | |
| --- | --- | --- | --- | --- | --- | --- | --- | --- |
| | | | | | | | | Transverse |
| No. | Maximum Diameter μm | Mean Diameter μm | Amount of Formation wt % | Maximum Diameter μm | Mean Diameter μm | Total Amount wt % | Hardness $H_R \cdot A$ | Rupture Strength MPa |
| 1 | 11 | 6 | 21 | 7 | 4 | 51 | 65 | 685 |
| 2 | 10 | 5 | 20 | 8 | 5 | 50 | 64 | 675 |
| 3 | 10 | 5 | 13 | 7 | 4 | 43 | 62 | 702 |
| 4 | 9 | 5 | 18 | 7 | 3 | 48 | 64 | 680 |
| 5 | 15 | 10 | 27 | 10 | 8 | 57 | 68 | 655 |
| 6 | 9 | 5 | 16 | 8 | 4 | 46 | 63 | 689 |
| 7 | 13 | 8 | 25 | 9 | 5 | 55 | 66 | 674 |
| 8 | 11 | 6 | 20 | 8 | 5 | 50 | 63 | 667 |
| 9 | 12 | 5 | 20 | 8 | 6 | 50 | 63 | 671 |
| 10 | — | — | — | — | — | — | — | — |
| 11 | 12 | 6 | 1 | 4 | 2 | 31 | 27 | 785 |
| 12 | 9 | 4 | <0.01 | — | 30 | 26 | 760 | |
| 13 | 18 | 15 | 35 | 12 | 7 | 65 | 71 | 388 |
| 14 | 10 | 6 | 2 | 5 | 2 | 32 | 29 | 750 |
| 15 | 11 | 6 | <0.01 | — | — | 30 | 26 | 755 |
| 16 | 11 | 6 | 20 | 8 | 4 | 50 | 53 | 379 |
| 17 | 12 | 5 | 21 | 8 | 5 | 51 | 55 | 395 |
| 18 | 11 | 5 | 20 | 8 | 5 | SO | 58 | 403 |
| 19 | 22 | 17 | 20 | 9 | 5 | s0 | 57 | 386 |

(Nos. 1 to 9; inventive alloys, Nos. 10 to 19; comparative alloys)

On the other hand, Table 14 shows the results of evaluating wear resistance (counter material: A390 ingot aluminum alloy) of the inventive alloys and comparative alloys by the abrasion test method shown in FIG. 14.

Further, each aluminum alloy was worked into the shape of a vane of 15×40×4 mm, and thereafter wear resistance and durability in relation to counter attackability were evaluated using the rotary compressor shown in FIG. 15 (cylinder part: A390 ingot aluminum alloy, rotor part: powder aluminum alloy of Al—17 Si—5 Fe—4 Cu—1 Mg composition). The test conditions were set at a rotational frequency of 5000 rpm and a test time of 100 hr. under an R134a substitutional fluorocarbon atmosphere (15 atm). Table 14 shows the results of the evaluation.

TABLE 14

Results of Abrasion Test and Durability Evaluation Test with Compressor

| | Results of Abrasion Test[1] | | | | Results of Continuous 100 hr. Durability Evaluation Test with Compressor |
| --- | --- | --- | --- | --- | --- |
| No. | Ring Member g | Counter Material g | Abrasion Coefficient (μvalue) | Remarks | |
| 1 | 0.02 | 0.02 | 0.03 | | excellent with no abrasion/seizure |
| 2 | 0.03 | 0.03 | 0.04 | | excellent with no abrasion/seizure |
| 3 | 0.04 | 0.05 | 0.a6 | | excellent with no abrasion/seizure |
| 4 | 0.02 | 0.03 | 0.04 | | excellent with no abrasion/seizure |
| 5 | 0.01 | 0.02 | 0.03 | | excellent with no abrasion/seizure |
| 6 | 0.04 | 0.05 | 0.07 | | excellent with no abrasion/seizure |
| 7 | 0.01 | 0.01 | 0.03 | | excellent with no abrasion/seizure |
| 8 | 0.02 | 0.03 | 0.03 | | excellent with no abrasion/seizure |
| 9 | 0.02 | 0.02 | 0.03 | | excellent with no abrasion/seizure |
| 10 | — | — | — | sample unpreparable | actual machine test impossible |
| 11 | 1.15 | 3.75 | 0.69 | | seizure caused on forward end portion |
| 12 | — | — | — | seized and test stopped | seizure caused on forward end portion |
| 13 | — | — | — | cracking caused during test | vane broken during |
| 14 | 1.06 | 3.40 | 0.54 | | seizure caused on forward end portion |
| 15 | — | — | — | seized and test stopped | seizure caused on forward end portion |
| 16 | — | — | — | cracking caused during test | vane broken during |
| 17 | — | — | — | sample unpreparable | actual machine test impossible |
| 18 | — | — | — | cracking caused during test | vane broken during |
| 19 | — | — | — | cracking caused during test | vane broken during |

(Nos. 1 to 9; inventive alloys, Nos. 10 to 19; comparative alloys)
[1]The inventive alloy or comparative alloy was employed for ring member, A390 ingot aluminum alloy (T6 heat treated material) was employed for counter material.

As described in Table 12 with respect to grooves provided in pressurized surfaces of the powder solidified bodies in hot forging, "one side": means provision of grooves only on single surfaces, and "both sides": means provision of grooves on both surfaces. In the case of "both sides", however, straight lines connecting bottom forward ends of both grooves are perpendicular to the pressurized surfaces of the powder solidified bodies. As to shapes of the grooves provided in the pressurized surfaces of the powder solidified bodies, "V groove" is a V-shaped groove having a depth of 2 mm and a forward end angle of 60°, and "oblique V groove" is an oblique V-shaped groove having a depth of 1.5 mm and a forward end angle of 45°.

Samples Nos. 1 to 9 are aluminum alloys obtained by the manufacturing method of the present invention, had prescribed vane shapes (40×15×5 mm) with neither chipping of end portions in rupture steps nor presence of fine cracks, had excellent mechanical characteristics and wear resistance, caused neither abrasion damage nor seizure in the durability evaluation test using the compressor machine, and attained excellent results in wear resistance and counter attackability.

In relation to comparative examples Nos. 10 to 19, on the other hand, it has been recognized that these are not suitable for vane members, for the following reasons:

Sample No. 10:

Since the true density ratio of the compact was small at 40%, the compact did not have sufficient compact strength but was broken during handling, and it was impossible to prepare a sample. Thus, no actual machine test evaluation was achieved.

Sample No. 11:

It was not possible to form sufficient AlN since the true density ratio of the compact was large at 88% and nitrogen gas did not homogeneously flow into the interior of the compact in the sintering process, whereby wear resistance of the alloy was so reduced that seizure was caused on the vane forward end portion in the compressor machine evaluation as the result.

Sample No. 12:

AlN formed by direct nitriding reaction was not sufficiently obtained since the sintering temperature was low at 460° C., whereby wear resistance of the alloy was so reduced that seizure was caused on the vane forward end portion in the compressor machine evaluation as the result.

Sample No. 13:

Si crystals and intermetallic compounds dispersed in the base were coarsely grown since the sintering temperature was high at 600° C., whereby strength and toughness of the alloy were reduced to cause cracking of the sample in the abrasion test and vane breakage in the compressor machine evaluation as the result.

Sample No. 14:

AlN formed by direct nitriding reaction was not sufficiently obtained since the sintering time was short at 0.2 hours (12 minutes), whereby wear resistance of the alloy was so reduced that seizure was caused on the vane forward end portion in the compressor machine evaluation as the result.

Sample No. 15:

It was absolutely impossible to form AlN since the sintering was performed in the atmosphere, whereby wear resistance of the alloy was reduced to cause problems such as seizure with the counter material in the abrasion test and seizure of the vane forward end portion in the compressor machine evaluation as the result.

Sample No. 16:

AlN formed in the sintered body was not finely dispersed and holes in the sintered body were not sufficiently closed since the forging surface pressure was low at 2 tons/cm$^2$ in the hot forging process, whereby strength and toughness of the alloy were so reduced that cracking of the sample in the abrasion test and breakage of the vane in the compressor machine evaluation were caused as the result.

Sample No. 17:

Neither V grooves nor oblique V grooves were provided in the pressurized surface of the powder solidified body in hot forging, but a shearing load was applied in the subsequent rupture step, whereby cracking did not progress in the thickness direction but the powder solidified body was finely pulverized. As the result, it was impossible to prepare an aluminum alloy having a prescribed vane shape, and no actual machine test evaluation was achieved.

Sample No. 18:

Holes in the sintered body were not sufficiently closed since the heating temperature in case of re-heating the sintered body was low at 350° C., whereby strength and toughness of the alloy were so reduced that cracking of the sample in the abrasion test and vane breakage in the compressor machine evaluation were caused as the result.

Sample No. 19:

Si crystals and intermetallic compounds dispersed in the base were coarsely grown since the heating temperature in case of re-heating the sintered body was high at 560° C., whereby strength and toughness of the alloy were so reduced that cracking of the sample in the abrasion test and breakage of the vane in the compressor machine evaluation were caused as the result.

EXAMPLE 8

Rapidly solidified aluminum alloy powder (43 μm in mean grain size) having a composition of Al—25 Si—3.5 Fe—3.5 Ni—0.1 Mg (weight % indication) that was formed at a solidification rate of 8×10$^{2°}$ C./sec. was stamp molded, to prepare a powder compact (dimensions: 10×30×10 mm) of 75% in true density ratio. This powder compact was heated and held in an atmosphere which was fed with nitrogen (10 l/min.) under sintering conditions of 550° C.×60 minutes, and thereafter a sintered aluminum powder alloy of at least 97% in true density ratio was immediately prepared by hot forging (8 tons/cm$^2$ in surface pressure). As to the aluminum alloy obtained by such a method of the present invention, FIG. 16 shows a metal structure photograph with an optical microscope.

Figure 16:
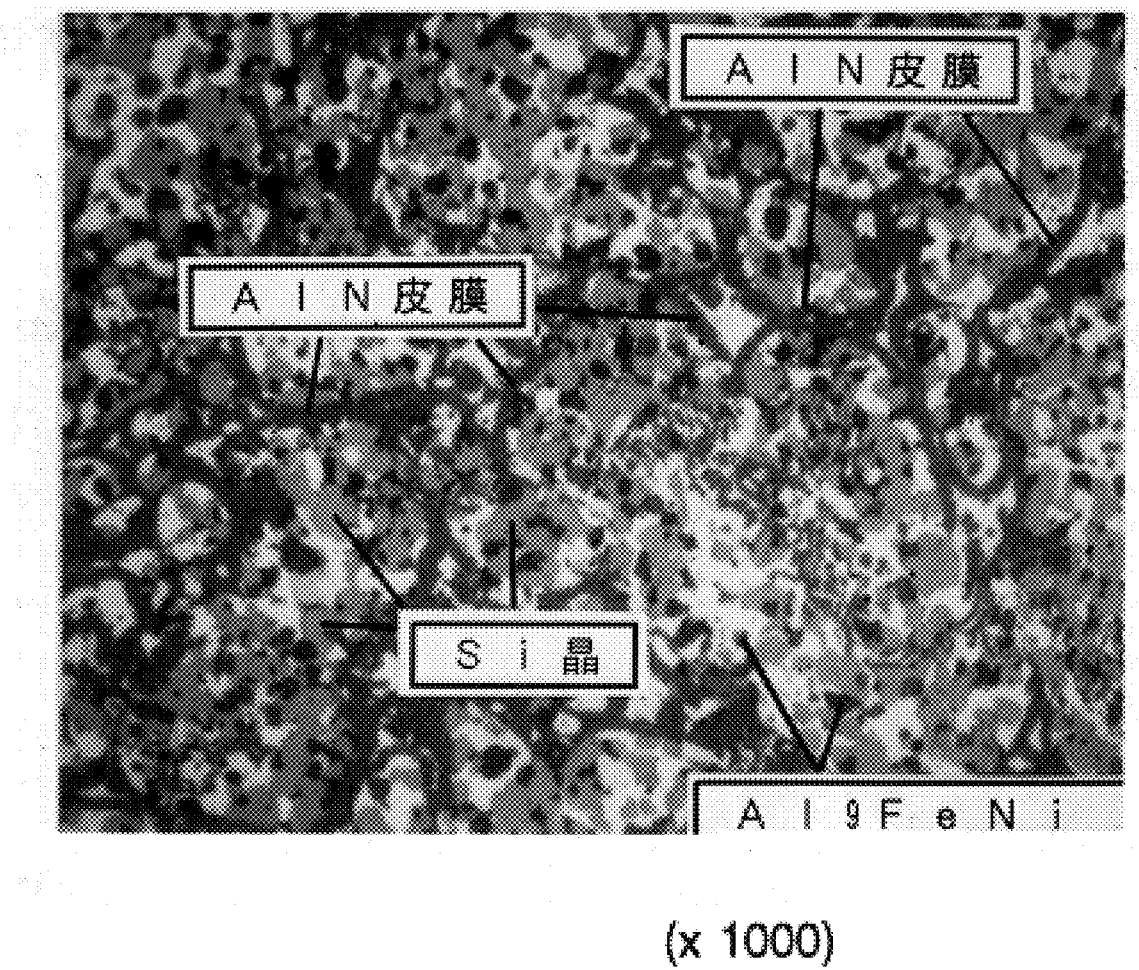
FIG. 16 is a metallographic photograph through an optical microscope.

The photograph of FIG. 16 has a magnification of 1000. As obvious from FIG. 16, it is recognized that AlN films have a mean film thickness of about 1.1 μm, and are discontinuously formed and dispersed on old powder grain boundaries or old powder grain surfaces of the sintered aluminum alloy. The amount of formation of aluminum nitride films in this case is 13 weight %, and a dispersion ratio thereof is about 55%.

Referring to FIG. 16, the maximum grain size of Si crystals dispersed in the matrix of the aluminum alloy is about 12 μm and the mean grain size is about 7 μm, while it is recognized that fine spherical intermetallic compounds of Al$_9$FeNi having a mean grain size of about 2 μm are homogeneously dispersed in the alloy.

EXAMPLE 9

The following Table 15 shows the composition, degree of quenching and fluidity of sample materials used for forming samples according to the present Example 9 of the invention.

TABLE 15

Composition (wt. %), Degree of Quenching (° C./sec.) and Fluidity (sec/50 g: 4 mmφ Orifice Tube)

| No. | Si | Fe | Ni | Fe/N | Cr | Ti | Mo | Zr | V | Total | Mg | Cu | Al | Lubricant Component | Degree of Quenching | Fluidity | Remarks |
|---|---|---|---|---|---|---|---|---|---|---|---|---|---|---|---|---|---|
| 1 | 12 | 5 | 5 | 1 | 0 | 0 | 0 | 0 | 0 | 0 | 0.10 | 0 | rest | no | 5 × 10$^2$ | 38 | |
| 2 | 18 | 4 | 4 | 1 | 0 | 0 | 0 | 0 | 0 | 0 | 0.09 | 0 | rest | no | 6 × 10$^2$ | 42 | |
| 3 | 25 | 3.5 | 3.5 | 1 | 0 | 0 | 0 | 0 | 0 | 0 | 0.12 | 0 | rest | no | 7 × 10$^2$ | 41 | |
| 4 | 28 | 3 | 2.5 | 12 | 0 | 0 | 0 | 0 | 0 | 0 | 0.06 | 0 | rest | no | 8 × 10$^2$ | 42 | |
| 5 | 20 | 5 | 6 | 0.8 | 0 | 0 | 0 | 0 | 0 | 0 | 0 | 0 | rest | no | 8 × 10$^2$ | 41 | |
| 6 | 25 | 3.5 | 3.5 | 1 | 0 | 0 | 0 | 0 | 0 | 0 | 0.14 | 3.5 | rest | no | 7 × 10$^2$ | 40 | HT[1] |
| 7 | 30 | 2 | 2 | 1 | 0 | 0 | 0 | 0 | 0 | 0 | 0.12 | 0 | rest | no | 9 × 10$^2$ | 40 | |
| 8 | 25 | 3.5 | 3.5 | 1 | 1 | 0 | 1 | 0 | 0 | 2 | 0.10 | 0 | rest | no | 8 × 10$^2$ | 41 | |
| 9 | 25 | 3.5 | 3.5 | 1 | 0 | 0 | 0 | 1 | 1 | 2 | 0.11 | 0 | rest | no | 8 × 10$^2$ | 42 | |
| 10 | 25 | 3.5 | 3.5 | 1 | 0 | 0 | 0 | 0 | 0 | 0 | 0.12 | 0 | rest | C:1.0 | 7 × 10$^2$ | 51 | |
| 11 | 25 | 3.5 | 3.5 | 1 | 0 | 0 | 0 | 0 | 0 | 0 | 0.12 | 0 | rest | BN:1.0 | 7 × 10$^2$ | 49 | |
| 12 | 15 | 4 | 4 | 1 | 1 | 0 | 0 | 1 | 0 | 2 | 0.14 | 0 | rest | C:1.0 | 7 × 10$^2$ | 51 | |
| 13 | 4 | 4 | 4 | 1 | 0 | 0 | 0 | 0 | 0 | 0 | 0.10 | 0 | rest | no | 7 × 10$^2$ | 40 | |
| 14 | 35 | 2 | 2 | 1 | 0 | 0 | 0 | 0 | 0 | 0 | 0.12 | 0 | rest | no | 9 × 10$^2$ | 42 | |
| 15 | 25 | 0 | 0 | 0 | 0 | 0 | 0 | 0 | 0 | 0 | 0.10 | a | rest | no | 7 × 10$^2$ | 40 | |
| 16 | 10 | 8 | 8 | 1 | 0 | 0 | 0 | 0 | 0 | 0 | 0.10 | 0 | rest | no | 9 × 10$^2$ | 43 | |
| 17 | 20 | 2 | 4 | 0.5 | 0 | 0 | 0 | 0 | 0 | 0 | 0.09 | 0 | rest | no | 8 × 10$^2$ | 40 | |
| 18 | 20 | 5 | 2 | 2.5 | 0 | 0 | 0 | 0 | 0 | 0 | 0.08 | 0 | rest | no | 8 × 10$^2$ | 41 | |
| 19 | 25 | 3.5 | 3.5 | 1 | 3 | 0 | 0 | 3 | 0 | 6 | 0.10 | 0 | rest | no | 9 × 10$^2$ | 44 | |
| 20 | 25 | 3.5 | 3.5 | 1 | 0 | 0 | 0 | 0 | 0 | 0 | 0.12 | 0 | rest | C:6.0 | 7 × 10$^2$ | 55 | |
| 21 | 25 | 3.5 | 3.5 | 1 | 0 | 0 | 0 | 0 | 0 | 0 | 0 | 0 | rest | no | 8 × 10$^2$ | 42 | |
| 22 | 25 | 3.5 | 3.5 | 1 | 0 | 0 | 0 | 0 | 0 | 0 | 0.12 | 0 | rest | no | 8 × 10 | 36 | |
| 23 | 25 | 3.5 | 3.5 | 1 | 0 | 0 | 0 | 0 | 0 | 0 | 0.12 | 0 | rest | no | 7 × 10$^2$ | 31 | granulating[2] |

(Nos. 1 to 12; inventive alloys, Nos. 13 to 23; comparative alloys)
[1]HT (heat treatment) conditions; 490° C. × 2 hr. - water cooling - 175° C. × 8 hr. - air cooling
[2]Raw material powder of 25 μm in mean grain size was subjected to granulating treatment, to be 90 μm in mean grain size.

Rapidly solidified aluminum alloy powder materials having the compositions shown in Table 15 were stamped and molded thereby preparing powder compacts of 70% in true density ratio. These powder compacts were heated and held in an atmosphere which was fed with nitrogen gas (15 l/min.) under sintering conditions of 550° C.×1 hour, and thereafter sintered aluminum powder alloys of at least 97% in true density ratio were immediately prepared by hot forging (8 tons/cm$^2$ in surface pressure).

In the respective sintered aluminum alloys, Table 16 shows results of investigation as to Si grain sizes in the alloys, amounts of formation and film thicknesses of AlN films, and material characteristics (HR-A hardness, transverse rupture strength, thermal expansion coefficient).

TABLE 16

Material Characteristics of Sintered Aluminum Alloys

| | Si | | AlN | | Si + AlN | Mechanical Characteristics | | Thermal Expansion Coefficient ×10$^{-1}$ ° C.$^{-1}$ |
|---|---|---|---|---|---|---|---|---|
| No. | Maximum Diameter μm | Mean Diameter μm | Amount of Formation wt % | Average Film Thickness μm | Total Amount wt % | Hardness $H_R \cdot A$ | Transverse Rupture Strength MPa | |
| 1 | 6 | 4 | 13 | 0.8 | 25 | 57 | 700 | 16.0 |
| 2 | 10 | 6 | 14 | 1.0 | 32 | 60 | 675 | 15.1 |
| 3 | 13 | 7 | 15 | 1.0 | 40 | 61 | 660 | 13.6 |
| 4 | 15 | 8 | 15 | 1.2 | 43 | 62 | 650 | 12.9 |
| 5 | 11 | 5 | 15 | 1.1 | 35 | 60 | 683 | 15.0 |
| 6 | 12 | 7 | 14 | 1.0 | 39 | 61 | 716 | 14.1 |
| 7 | 14 | 9 | 15 | 1.2 | 45 | 64 | 673 | 12.6 |
| 8 | 12 | 6 | 15 | 1.2 | 40 | 63 | 658 | 13.6 |
| 9 | 12 | 6 | 13 | 1.1 | 38 | 63 | 640 | 13.9 |
| 10 | 13 | 7 | 18 | 1.5 | 43 | 59 | 618 | 12.9 |
| 11 | 13 | 7 | 17 | 1.5 | 42 | 58 | 635 | 12.8 |
| 12 | 10 | 5 | 18 | 1.6 | 33 | 59 | 620 | 15.3 |
| 13 | 7 | 4 | 13 | 0.9 | 17 | 46 | 755 | 17.1 |
| 14 | 18 | 10 | 14 | 1.0 | 49 | 66 | 485 | 12.2 |
| 15 | 12 | 9 | 13 | 1.0 | 38 | 57 | 708 | 13.9 |
| 16 | 10 | 6 | 14 | 1.1 | 24 | 58 | 655 | 16.5 |
| 17 | 11 | 6 | 15 | 1.2 | 35 | 60 | 566 | 13.8 |
| 18 | 12 | 7 | 14 | 1.0 | 34 | 60 | 580 | 13.7 |
| 19 | 12 | 7 | 18 | 0.9 | 38 | 64 | 555 | 13.0 |
| 20 | 12 | 8 | 18 | 1.5 | 43 | 59 | 485 | 12.9 |
| 21 | 12 | 7 | <0.01 | 0 | 25 | 49 | 740 | 15.4 |

TABLE 16-continued

Material Characteristics of Sintered Aluminum Alloys

| | Si | | AlN | | Si + AlN | Mechanical Characteristics | | Thermal Expansion |
| --- | --- | --- | --- | --- | --- | --- | --- | --- |
| | Maximum | Mean | Amount of | Average Film | Total | | Rupture | Coefficient |
| | Diameter | Diameter | Formation | Thickness | Amount | Hardness | Strength | $\times 10^{-1}$ |
| No. | $\mu$m | $\mu$m | wt % | $\mu$m | wt % | $H_R \cdot A$ | MPa | $^\circ C.^{-1}$ |
| 22 | 15 | 10 | 3 | 0.2 | 28 | 52 | 709 | 14.7 |
| 23 | 12 | 7 | 15 | 1.2 | 40 | 62 | 682 | 13.5 |

(Nos. 1 to 12; inventive alloys, Nos. 13 to 23; comparative alloys)

Then, respective materials were worked into prescribed vane shapes (15 mm in width×40 mm in length×4 mm in thickness). As to the vane materials thus obtained, a durability test in relation to wear resistance and counter attackability of the materials and a compressor performance test were carried out using the rotary compressor shown in FIG. 15 (cylinder part: A390 ingot aluminum alloy, rotor part: powder aluminum alloy of Al—17 Si—5 Fe—4 Cu—1 Mg composition). Table 17 shows the results of the tests.

TABLE 17

Results of Durability Performance Evaluation with Compressor

| No. | Situation of Damage of Vane-Counter Material | Results of Performance (Efficiency) Evaluation |
| --- | --- | --- |
| 1 | excellent (with no abrasion/sintering) | excellent (target value attained) |
| 2 | excellent (with no abrasion/sintering) | excellent (target value attained) |
| 3 | excellent (with no abrasion/sintering) | excellent (target value attained) |
| 4 | excellent (with no abrasion/sintering) | excellent (target value attained) |
| 5 | excellent (with no abrasion/sintering) | excellent (target value attained) |
| 6 | excellent (with no abrasion/sintering) | excellent (target value attained) |
| 7 | excellent (with no abrasion/sintering) | excellent (target value attained) |
| 8 | excellent (with no abrasion/sintering) | excellent (target value attained) |
| 9 | excellent (with no abrasion/sintering) | excellent (target value attained) |
| 10 | excellent (with no abrasion/sintering) | excellent (target value attained) |
| 11 | excellent (with no abrasion/sintering) | excellent (target value attained) |
| 12 | excellent (with no abrasion/sintering) | excellent (target value attained) |
| 13 | seizure caused on forward end portion | locked and stopped in 12 hr. |
| 14 | vane broken during test | performance unevaluable |
| 1s | seizure caused on forward end portion | locked and stopped in 22 hr. |
| 16 | vane broken during test | performance unevaluable |
| 17 | vane broken during test | performance unevaluable |
| 18 | vane broken during test | performance unevaluable |
| 19 | chipped and attacked counter material | locked and stopped in 15 hr. |
| 20 | vane broken during test | performance unevaluable |
| 21 | seizure caused on forward end portion | locked and stopped in 5 hr. |
| 22 | seizure caused on forward end portion | locked and stopped in 3 hr. |
| 23 | excellent (with no abrasion/sintering) | excellent (target value attained) |

(Nos. 1 to 12; inventive alloys, Nos. 13 to 23; comparative alloys)

In the actual machine test, continuous 100 hr. driving was carried out under conditions in which the rotor was rotated at a rotational frequency of 500 rpm under an atmosphere containing a mixture of R134a substitutional fluorocarbon (15 atm) and fog lubrication oil. The atmosphere temperature in the driving was about 160° C.

The powder compositions Nos. 1 to 12 are aluminum alloys of the present invention, which have mechanical characteristics and thermal expansibility required for serving as vane materials. Also in durability and performance evaluation tests with the compressor machine, neither abrasion damage nor seizure was caused and excellent results were attained in wear resistance and counter attackability, while no performance reduction of the compressor was recognized even in high temperature driving. It has also been confirmed that hardness of the sintered aluminum alloy is improved by containing high melting point metal elements such as Cr, Ti, Mo, Zr and V in the aluminum alloy of the present invention.

In relation to comparative examples Nos. 13 to 23, on the other hand, it has been recognized that these are not suitable for vane members, for the following reasons:

Sample No. 13:

Sufficient wear resistance and seizure resistance were not attained since the Si content in the sintered body was small at 4 weight %, whereby seizure was caused on the vane forward end portion in the actual machine evaluation with the compressor, and the sample was locked and stopped in 12 hr. after starting of driving.

Sample No. 14:

Sufficient mechanical characteristics were not attained since the Si content in the sintered body was large at 35 weight %, whereby the vane was broken in the actual machine evaluation with the compressor as the result.

Sample No. 15:

Sufficient wear resistance and seizure resistance were not attained since Fe and Ni were not contained in the sintered body, whereby seizure was caused on the vane forward end portion in the actual machine evaluation with the compressor, and the sample was locked and stopped in 22 hr. after starting of driving.

Sample No. 16:

Sufficient mechanical characteristics were not attained since contents of Si and Ni were large at 8 weight % each in the sintered body, whereby the vane was broken in the actual machine evaluation with the compressor as the result.

Sample No. 17:

Sufficient mechanical characteristics were not attained since the content ratio of Fe and Ni was at 0.5 out of the proper range in the sintered body, whereby the vane was broken in the actual machine evaluation with the compressor as the result.

Sample No. 18:

Sufficient mechanical characteristics were not attained since the content ratio of Fe and Ni was at 2.5 out of the proper range in the sintered body, whereby the vane was broken in the actual machine evaluation with the compressor as the result.

Sample No. 19:

This sample extremely attacked the counter material since the total content of high melting point metal elements (Cr and Zr) in the sintered body was large at 6 weight %, whereby seizure was caused on the vane forward end portion in the actual machine evaluation with the compressor, and the sample was locked and stopped in 15 hr. after starting of driving.

Sample No. 20:

Sufficient mechanical characteristics were not attained since the content of graphite (C) was large at 6 weight % in the sintered body, whereby the vane was broken in the actual machine evaluation with the compressor as the result.

Sample No. 21:

It was not able to form a proper amount of AlN coatings and sufficient wear resistance and seizure resistance were not attained since no Mg was contained in the raw material powder, whereby seizure was caused on the vane forward end portion in the actual machine evaluation with the compressor, and the sample was locked and stopped in 5 hr.

Sample No. 22:

It was not able to form a proper amount of AlN coatings and sufficient wear resistance and seizure resistance were not attained since the solidification rate in the raw material powder was small at 80° C./sec., whereby seizure was caused on the vane forward end portion in the actual machine evaluation with the compressor, and the sample was locked and stopped in 3 hr.

Sample No. 23:

Granulating treatment was performed in order to improve flowability of the raw material powder, whereby the fluidity was extremely improved, and an excellent result was attained in the actual machine evaluation with the compressor with no reduction of mechanical characteristics and frictional slidability of the sintered body.

EXAMPLE 10

Powder compacts of 65% in true density ratio were prepared by stamping and molding rapidly solidified aluminum alloy powder materials having the composition shown at No. 3 in Table 15. These powder compacts were heated and held in a nitrogen atmosphere (15 l/min. in gas flow rate) under conditions shown in Table 18, and thereafter hot forging was immediately performed to prepare sintered aluminum powder alloys of at least 97% in true density ratio.

TABLE 18

Material Characteristics of Sintered Aluminum Alloys

| | Sintering Condition | | Si | | AlN | | | Si + AlN | Mechanical Characteristics | | Thermal Expansion Coefficient |
|---|---|---|---|---|---|---|---|---|---|---|---|
| | | | Maximum | Mean | Amount of | Average Film | Dispersion | Total | Transverse | | |
| | Temperature | Time | Diameter | Diameter | Formation | Thickness | Ratio | Amount | Hardness | Rupture Strength | $\times 10^{-1}$ |
| No. | °C. | hr | μm | μm | wt % | μm | % | % | $H_R \cdot A$ | MPa | °C.$^{-1}$ |
| 1 | 550 | 1.0 | 9 | 5 | 12 | 1.0 | 54 | 37 | 59 | 668 | 14.1 |
| 2 | 525 | 1.0 | 11 | 6 | 14 | 1.2 | 58 | 39 | 61 | 642 | 13.4 |
| 3 | 540 | 0.5 | 12 | 6 | 13 | 1.1 | 55 | 38 | 60 | 655 | 13.7 |
| 4 | 550 | 0.5 | 12 | 6 | 15 | 1.3 | 60 | 40 | 61 | 635 | 13.1 |
| 5 | 550 | 1.0 | 12 | 7 | 17 | 1.5 | 63 | 42 | 62 | 640 | 13.0 |
| 6 | 550 | 3.0 | 13 | 8 | 19 | 1.7 | 68 | 44 | 63 | 631 | 12.6 |
| 7 | 570 | 0.5 | 14 | 7 | 18 | 1.6 | 65 | 43 | 62 | 625 | 12.8 |
| 8 | 570 | 2.0 | 15 | 8 | 22 | 1.8 | 73 | 47 | 65 | 575 | 12.3 |
| 9 | 480 | 6.0 | 8 | 4 | 3 | 0.2 | 38 | 28 | 55 | 703 | 14.9 |
| 10 | 590 | 1.0 | 22 | 15 | 25 | 1.9 | 75 | 50 | 64 | 505 | 12.2 |
| 11 | 600 | 0.5 | 15 | 8 | 27 | 2.4 | 76 | 52 | 65 | 492 | 11.8 |
| 12 | 600 | 2.0 | 25 | 18 | 29 | 2.6 | 80 | 54 | 68 | 445 | 11.4 |
| 13 | 530 | 12 | 14 | 10 | 27 | 1.2 | 92 | 52 | 63 | 478 | 11.7 |

(Nos. 1 to 8; inventive alloys, Nos. 9 to 13; comparative alloys)

First results of investigation in relation to the amounts of formation, film thicknesses and dispersion ratios of AlN films and material characteristics (HR-A hardness, transverse rupture strength, thermal expansion coefficient) are shown in Table 18 in the respective sintered aluminum alloys.

Then, the respective materials were finished into prescribed vane shapes (15 mm in width×40 mm in length×4 mm in thickness) by machine work. A continuous 100 hr. durability test and a performance test were performed on the obtained vane materials in relation to wear resistance and counter attackability of the materials under conditions similar to those in Example 9 with a rotary compressor. Table 19 shows the results of the rest.

Sample No. 12:

Si crystals in the sintered body were coarsened while the amount of formation and film thicknesses of AlN films were so increased beyond proper ranges that sufficient transverse

TABLE 19

Results of Durability Performance Evaluation with Compressor

| No. | Situation of Damage of Vane-Counter Material | Results of Performance (Efficiency) Evaluation |
|---|---|---|
| 1 | excellent (with no abrasion/sintering) | excellent (target value attained) |
| 2 | excellent (with no abrasion/sintering) | excellent (target value attained) |
| 3 | excellent (with no abrasion/sintering) | excellent (target value attained) |
| 4 | excellent (with no abrasion/sintering) | excellent (target value attained) |
| 5 | excellent (with no abrasion/sintering) | excellent (target value attained) |
| 6 | excellent (with no abrasion/sintering) | excellent (target value attained) |
| 7 | excellent (with no abrasion/sintering) | excellent (target value attained) |
| 8 | excellent (with no abrasion/sintering) | excellent (target value attained) |
| 9 | seizure caused on forward end portion | locked and stopped in 12 hr. |
| 10 | vane broken during test | performance unevaluable |
| 11 | vane broken during test | performance unevaluable |
| 12 | vane broken during test | performance unevaluable |
| 13 | vane broken during test | performance unevaluable |

(Nos. 1 to 8; inventive alloys, Nos. 9 to 13; comparative alloys)

The powder compositions Nos. 1 to 8 are aluminum alloys of the present invention, which have mechanical characteristics and thermal expansibility required for serving as vane materials. Further, neither abrasion damage nor seizure was caused also in duribility and performance evaluation tests with a compressor machine and excellent results were attained in wear resistance and counter attackability, while no performance reduction of the compressor was recognized even in high temperature driving, but target performance (efficiency) was attained.

In relation to comparative examples Nos. 9 to 13, on the other hand, it has been recognized that these are not suitable for vane members, for the following reasons:

Sample No. 9

A proper amount of AlN coatings cannot be formed since the sintering temperature is low at 480° C., and sufficient wear resistance and seizure resistance cannot be attained. As the result, seizure was caused on the vane forward end portion in the actual machine evaluation with the compressor, and the sample was locked and stopped in 2 hr.

Sample No. 10:

Si crystals in the sintered body were so coarsened that sufficient transverse rupture strength for serving as a vane material was not attained since the sintering conditions were improper at 590° C.×1 hr, whereby the vane was broken in the actual the machine evaluation with the compressor as the result.

Sample No. 11:

The amount of formation and film thicknesses of AlN coatings were increased beyond proper ranges and sufficient transverse rupture strength for serving as a vane material was not attained since the sintering conditions were improper at 600° C.×0.5 hr. whereby the vane was broken in the actual machine evaluation with the compressor as the result. Further, a problem was caused with regard to performance as a vane material because the thermal expansion coefficient was below $12 \times 10^{-6}/°$ C. since the total content of AlN coatings and Si crystals in the sintered body exceeded 50 weight %.

rupture strength for serving as a vane material was not attained since sintering conditions were improper at 600° C.×2 hr, whereby the vane was broken in the actual machine evaluation with the compressor as the result. Further, a problem was caused with regard to performance as a vane material, because the thermal expansion coefficient was below $12 \times 10^{-6}/°$ C. since the total content of AlN coatings and Si crystals in the sintered body exceeded 50 weight %.

Sample No. 13:

The dispersion ratio of AlN coatings was increased to 92% by long-time nitriding processing, whereby bondability between powder grains was inhibited, sufficient transverse rupture strength for serving as a vane material was not attained, and hence the vane was broken in the actual machine evaluation with the compressor as the result. Further, a problem was caused with regard to performance as a vane material because the thermal expansion coefficient was below $12 \times 10^{-6}/°$ C., since the total content of AlN coatings and Si crystals in the sintered body exceeded 50 weight %.

EXAMPLE 11

Powder compacts of 70% in true density ratio were prepared by stamping and molding rapidly solidified aluminum alloy powder having the composition shown at No. 4 in Table 15. These powder compacts were heated and held in a nitrogen atmosphere (flow rate: 15 l/min.) under conditions shown in Table 20, and thereafter hot forging was immediately performed to prepare sintered aluminum powder alloys. In the respective sintered aluminum alloys, results of investigation as to amounts of formation, film thicknesses and dispersion ratios of AlN films and material characteristics (HR-A hardness, transverse rupture strength, thermal expansion coefficient, true density ratio) are shown in Table 20.

TABLE 20

Material Characteristics of Sintered Aluminum Alloys

| | Sintering Condition | | Si | | AlN | | | Si + AlN | True Density Ratio of | Mechanical Characteristics | | Thermal Expansion Coefficient |
|---|---|---|---|---|---|---|---|---|---|---|---|---|
| | | | Maximum | Mean | Amount of | Average Film | Dispersion | Total | Forged | Hard- | Transverse Rupture | |
| No. | Temperature °C. | Time hr | Diameter μm | Diameter μm | Formation wt % | Thickness μm | Ratio % | Amount wt % | Body % | ness $H_R \cdot A$ | Strength MPa | $\times 10^{-1}$ °C.$^{-1}$ |
| 1 | 550 | 1.0 | 15 | 8 | 15 | 1.2 | 55 | 43 | 99 | 62 | 650 | 12.9 |
| 2 | 570 | 0.5 | 13 | 7 | 17 | 1.4 | 58 | 45 | 100 | 62 | 641 | 12.6 |
| 3 | 530 | 12 | 15 | 10 | 24 | 1.5 | 76 | 52 | 98 | 64 | 607 | 11.7 |
| 4 | 550 | 1.0 | 15 | 8 | 15 | 1.2 | 55 | 43 | 90 | 52 | 440 | 12.8 |

(Nos. 1, 2; inventive alloys, Nos. 3, 4; comparative alloys)

Then, the respective materials were finished into prescribed vane shapes (15 mm in width×40 mm in length×4 mm in thickness) by machine work. A continuous 100 hr. durability test and a performance test were performed on the obtained vane materials under conditions similar to those of Example 9 with a rotary compressor in relation to wear resistance and counter attackability of the materials. Table 21 shows the test results.

TABLE 21

Results of Durability Performance Evaluation with Compressor

| No. | Situation of Damage of Vane-Counter Material | Results of Performance (Efficiency) Evaluation |
|---|---|---|
| 1 | excellent (with no abrasion/sintering) | excellent (target value attained) |
| 2 | excellent (with no abrasion/sintering) | excellent (target value attained) |
| 3 | excellent (with no abrasion/sintering) | 80% of target value attained |
| 4 | vane broken during test | performance unevaluable |

(Nos. 1, 2: inventive alloys, Nos. 3, 4; comparative alloys)

Samples Nos. 1 and 2 are aluminum alloys of the present invention, which have mechanical characteristics and thermal expansibility required as vane materials. Further, neither abrasion damage nor seizure was caused also in durability and performance evaluation tests with a compressor machine and excellent results were attained in wear resistance and counter attackability, while no performance reduction of the compressor was recognized even in high temperature driving, but target performance (efficiency) was attained.

In relation to comparative examples Nos. 3 and 4, on the other hand, it has been recognized that these are not suitable for vane members, for the following reasons:

Sample No. 3

The thermal expansion coefficient was below $12 \times 10^{-6}/°$C. since the total content of AlN films and Si crystals in the sintered body exceeded 50 weight %, and the efficiency of the compressor was achievable to only 80% of the target value.

Sample No. 4:

Since the surface pressure in hot forging was reduced to 3 tons/cm$^2$, the true density ratio of the forged body was 90% and sufficient hardness and transverse rupture strength for serving as a vane material were not attained, whereby the vane was broken in actual machine evaluation with a compressor as the result.

A slide member of a sintered aluminum alloy obtained according to the present invention has high strength and high hardness, and is excellent in wear resistance. Typical applications of this slide member are sliding parts for compressors such as a vane, a shoe and a side plate, and a rotor for an oil pump. Other applications are also possible, such as for automobile parts such as a piston, a cylinder and a con'rod to which wear resistance, slidability and heat resistance are required, and household electric parts.

We claim:

1. A slide member of a sintered aluminum alloy, being obtained by molding and sintering an aluminum alloy powder of powder grains, including a matrix of an aluminum alloy formed from said powder grains and aluminum nitride films being dispersed along old powder grain boundaries of said powder grains forming said matrix, said matrix containing Al and at least 0.05 weight % and not more than 0.15 weight % of Mg as a percentage of said matrix overall, said aluminum nitride films being discontinuously dispersed along said old powder grain boundaries at a dispersion ratio of not more than 80%, wherein said dispersion ratio is defined such that a dispersion ratio of 100% pertains to a state in which aluminum nitride films completely continuously enclose the peripheries of said old powder grain boundaries.

2. The slide member of a sintered aluminum alloy in accordance with claim 1, wherein said powder grains of said aluminum alloy powder have been rapidly solidified at a solidification rate of at least $10^{2°}$ C./sec.

3. The slide member of a sintered aluminum alloy in accordance with claim 1, wherein said slide member is a vane material for a compressor.

4. The slide member of a sintered aluminum alloy in accordance with claim 1, wherein
said aluminum nitride films are not more than 2 μm thick, and said aluminum nitride films make up at least 5 weight % and not more than 25 weight % of said sintered aluminum alloy overall.

5. The slide member of a sintered aluminum alloy in accordance with claim 1, wherein said matrix further contains at least 10 weight % and not more than 30 weight % of Si, at least 2 weight % and not more than 6 weight % of Fe, and at least 2 weight % and not more than 6 weight % of Ni, with the remainder made up of said Al and unavoidable impurities.

6. The slide member of a sintered aluminum alloy in accordance with claim 1, wherein said sintered aluminum alloy contains $W_{Si}$ weight % of Si and $W_{AlN}$ weight % of AlN, satisfying the relational expression of:

$$15\% \leq W_{Si+}W_{AlN} \leq 50\%.$$

7. The slide member of a sintered aluminum alloy in accordance with claim 1, wherein said sintered aluminum alloy contains Si crystals, the maximum grain size of said Si crystals in said sintered aluminum alloy is not more than 15 μm, and the mean grain size of said Si crystals in said sintered aluminum alloy is not more than 10 μm.

8. The slide member of a sintered aluminum alloy in accordance with claim 1, wherein said sintered aluminum alloy contains Al, $W_{Fe}$ weight % of Fe and $W_{Ni}$ weight % of Ni, satisfying the relational expression:

$$0.8 \leq W_{Fe}/W_{Ni} \leq 1.25.$$

9. The slide member of a sintered aluminum alloy in accordance with claim 1, wherein said sintered aluminum alloy contains spherical intermetallic compounds of $Al_9FeNi$ having a mean grain size of not more than 5 μm dispersed in said sintered aluminum alloy.

10. The slide member of a sintered aluminum alloy in accordance with claim 1, wherein said sintered aluminum alloy has a true density ratio of at least 97%, hardness (HR-A) of at least 55, transverse rupture strength of at least 600 MPa, and a thermal expansion coefficient of at least $12 \times 10^{-6}/°C$.

11. A slide member of a sintered aluminum alloy prepared by heating and holding, in a nitrogen gas atmosphere, a powder compact consisting of aluminum alloy powder that has been rapidly solidified at a solidification rate of at least $10^{2°}$ C./sec., thereby forming a sintered body in which aluminum nitride is dispersed and formed on the surface and in the interior, and solidifying said sintered body by hot forging or hot extrusion.

12. The slide member of a sintered aluminum alloy in accordance with claim 11, having hardness (HR-A) of at least 55 and transverse rupture strength of at least 600 MPa.

13. The slide member of a sintered aluminum alloy in accordance with claim 11, wherein said aluminum alloy powder contains aluminum and 3 to 40 weight % of Si, and
the maximum grain size of Si crystals in said sintered body is not more than 15 μm, and the mean grain size is not more than 10 μm.

14. The slide member of a sintered aluminum alloy in accordance with claim 11, wherein
said aluminum alloy powder contains aluminum, 2 to 7.5 weight % of Fe and 2 to 7.5 weight % of Ni, and
spherical intermetallic compounds of $Al_9FeNi$ having a mean grain size of not more than 5 μm are dispersed in said sintered aluminum alloy.

15. A method of manufacturing a slide member of a sintered aluminum alloy, comprising:
a step of pressure-molding rapidly solidified aluminum alloy powder for forming a powder compact;
a step of heating and holding said powder compact in a nitrogen gas atmosphere thereby facilitating reaction between aluminum and nitrogen through an exothermic phenomenon following deposition of elements that are solidly dissolved in said aluminum alloys, for forming aluminum nitride films on aluminum alloy powder grain surfaces;
a step of sintering said powder compact for forming a sintered body in which aluminum nitride is dispersed; and
solidifying said sintered body by hot forging or hot extrusion.

16. The method of manufacturing a slide member of a sintered aluminum alloy in accordance with claim 15, wherein said aluminum alloy powder is powder that has been rapidly solidified at a solidification rate of at least $10^{2°}$ C./sec.

17. The method of manufacturing a slide member of a sintered aluminum alloy in accordance with claim 15, wherein said step of forming aluminum nitride films on aluminum alloy powder grain surfaces and said step of sintering said powder compact progress at the same time.

18. The method of manufacturing a slide member of a sintered aluminum alloy in accordance with claim 15, wherein the components of said aluminum alloy powder are expressed in a general formula Al—a.Fe—b.Ni, and composition weight ratios thereof satisfy:
a: 2 to 7.5%
b: 2 to 7.5%
rest: Al and unavoidable impurities $0.8 \leq a/b \leq 1.25$.

19. The method of manufacturing a slide member of a sintered aluminum alloy in accordance with claim 15, wherein the components of said aluminum alloy powder are expressed in a general formula Al—a.Si—b.Fe—c.Ni, and composition weight ratios thereof satisfy:
a: 3 to 40%
b: 2 to 7.5%
c: 2 to 7.5%
rest: Al and unavoidable impurities $0.8 \leq b/c \leq 1.25$.

20. The method of manufacturing a slide member of a sintered aluminum alloy in accordance with claim 15, wherein said rapidly solidified aluminum alloy powder contains aluminum and at least one element being selected from a group consisting of Cr, Ti, Mo, Zr and V in a range of not more than 5 weight %.

21. The method of manufacturing a slide member of a sintered aluminum alloy in accordance with claim 15, wherein said rapidly solidified aluminum alloy powder contains aluminum and at least one component being selected from a group consisting of C, BN, $MOS_2$ and $CaF_2$ in a range of not more than 5 weight %.

22. The method of manufacturing a slide member of a sintered aluminum alloy in accordance with claim 15, wherein said rapidly solidified aluminum alloy powder contains aluminum, and at least one of Cu in a range of 0.4 to 8.0 weight % and Mg in a range of 0.5 to 1.5 weight %.

23. The method of manufacturing a slide member of a sintered aluminum alloy in accordance with claim 15, wherein said aluminum alloy powder has fluidity satisfying conditions of not more than 60 seconds/50 g for flowing through an orifice tube of 4 mmφ.

24. The method of manufacturing a slide member of a sintered aluminum alloy in accordance with claim 15, wherein said step of forming a powder compact includes a step of solidifying said aluminum alloy powder to be 50% to 80% in true density ratio by cold stamp molding, said step of forming aluminum nitride films and said step of sintering said powder compact include steps of heating and holding said powder compact in a nitrogen gas atmosphere of a temperature of 500° C. to 570° C. for at least 30 minutes, and said step of solidifying said sintered body by hot forging or hot extrusion is carried out so as to make the true density ratio of said sintered body at least 97%.

25. The method of manufacturing a slide member of a sintered aluminum alloy in accordance with claim 15, further comprising a step of heating said sintered body to 400° C. to 500° C. in advance of said step of solidifying said sintered body by hot forging or hot extrusion.

26. The method of manufacturing a slide member of a sintered aluminum alloy in accordance with claim 25, further comprising a step of carrying out solution heat treatment on said sintered body at a temperature of 300° C. to 500° C. for 0.5 to 4 hours after said step of solidifying said sintered body by hot forging or hot extrusion.

27. The method of manufacturing a slide member of a sintered aluminum alloy in accordance with claim 26, further comprising a step of carrying out an aging treatment on said sintered body at not more than 200° C. after said solution heat treatment step.

28. The method of manufacturing a slide member of a sintered aluminum alloy in accordance with claim 15, further comprising a step of forming a groove on a pressurized surface of said sintered body in said step of solidifying said sintered body, which comprises said hot forging.

29. The method of manufacturing a slide member of a sintered aluminum alloy in accordance with claim 28, wherein said groove has a V-shaped sectional shape.

30. The method of manufacturing a slide member of a sintered aluminum alloy in accordance with claim 28, further comprising a step of rupturing said sintered body along said groove by applying a shearing load or a bending load to said pressurized surface of said sintered body after said step of solidifying said sintered body.

31. The method of manufacturing a slide member of a sintered aluminum alloy in accordance with claim 15, wherein said step of forming said aluminum nitride films on said aluminum alloy powder grain surfaces and said step of sintering said powder compact are simultaneously carried out in said nitrogen gas atmosphere, which is being controlled in a temperature range of 500 to 570° C., for discontinuously dispersing at least 5 weight % and not more than 25 weight % of said aluminum nitride films, as a percentage of said sintered aluminum alloy overall, along old powder grain boundaries in said sintered body.

32. The method of manufacturing a slide member of a sintered aluminum alloy in accordance with claim 31, wherein the true density ratio of said sintered body after said hot forging or hot extrusion is at least 97%.

33. The method of manufacturing a slide member of a sintered aluminum alloy in accordance with claim 31, wherein said aluminum alloy powder has a composition expressed in a general formula Al—a.Si—b.Fe—c.Ni—d.Mg, and composition weight ratios thereof satisfy:

a: 10 to 30% b: 2 to 6% c: 2 to 6% d: at least 0.05% rest: Al and unavoidable impurities $0.8 \leq b/c \leq 1.25$.

* * * * *

UNITED STATES PATENT AND TRADEMARK OFFICE
CERTIFICATE OF CORRECTION

PATENT NO. : 5,976,214

DATED : Nov. 2, 1999

Page 1 of 5

INVENTOR(S) : Kondoh et al.

It is certified that error appears in the above-identified patent and that said Letters Patent is hereby corrected as shown below:

Title Page: under "[56] References Cited U.S. PATENT DOCUMENTS" insert:
--4,923,674    5/1990    Weber--.
following the list . of references cited, insert:

--FOREIGN PATENT DOCUMENTS"
```
   6-33164    02/1994   Japan.
   6-57363    03/1994   Japan.
   4-308002   10/1992   Japan.
   1-132734   05/1989   Japan.
  61-55188    04/1985   Japan.
   5-33298    03/1986   Japan.
   3-151589   06/1991   Japan.
   6-96188    07/1986   Japan.
   5-311302   11/1993   Japan.
  63-167092   07/1988   Japan.
   2-136586   05/1990   Japan.
  64-32087    02/1989   Japan.
   4-314868   11/1992   Japan.
   6-57363    03/1994   Japan.
   6-33164    02/1994   Japan.
   1-272705   10/1989   Japan.
```

OTHER PUBLICATIONS

Shinji Hirai et al. "Various Synthesis Process of Aluminum Nitride Powder" (Nihon Kinzoku Kassai Kaiho Vol. 29, No. 7, 1990)534,538,539

Hermann Scholz et al. "Synthesis of High Purity Aln by Nitridation of Li-Doped Al-Melt, (Journal of the European Ceramic Society 6 (1990))237-238--.

Under [57] Abstract,
line 3, after "former" insert --or--.

UNITED STATES PATENT AND TRADEMARK OFFICE
CERTIFICATE OF CORRECTION

PATENT NO. : 5,976,214

DATED : Nov. 2, 1999

INVENTOR(S) : Kondoh et al.

It is certified that error appears in the above-identified patent and that said Letters Patent is hereby corrected as shown below:

Col. 1, line 11, after "resistance" insert --,--;
 line 60, before "atmosphere", replace "florocarbon" by --fluorocarbon--.
Col. 2, line 50, after "substitutional" replace "florocar-" by --fluorocar-;
Col. 3, line 52, after "may", replace "seperate" by --separate--;
Col. 4, line 54, after "spraying", insert --,--.
Col. 5, line 2, after "original" insert --,--;
 line 31, after "15", replace "μand" by --μ and--;
Col. 6, line 23, after "formula", replace "Al-a.Fe-b.Ni," by --Al-a · Fe-b · Ni,--;
 line 29, after "formula", replace "Al-a.Si-b.Fe-c.Ni," by --Al-a · Si-b · Fe-c · Ni,--;
Col. 7, line 26, after "formula", replace "Al-a.Si-b.Fe-c.Ni-d.Mg," by --Al-a · Si-b · Fe-c · Ni-d · Mg,--;
Col. 8, line 53, after "(Al)" insert --,--;
 line 55, after "powder" (first occurrence), insert --,--;
 line 56, after "atmosphere" insert --,--.
Col. 9, line 15, after "cause", replace "coarsing" by --coarsening--.
Col. 10, line 15, after "temperature" (both instances), insert --,--.
Col. 14, line 37, after "content", replace "($W_{si}$)" by --($W_{Si}$)--.
Col. 15, line 6, after "least", replace "12x10-" by --$12 \times 10^{-6}/°C$.--.
 line 7, delete the entire line.
Col. 16, line 11, after "are", replace "coarsered" by --coarsened--.
Col. 17, line 14, after "formed", replace "-dispersed" by --and dispersed--;
 line 51, after "inadequate", delete "in";
 line 60, after "temperature" (first occurrence), insert --,--.

UNITED STATES PATENT AND TRADEMARK OFFICE
CERTIFICATE OF CORRECTION

PATENT NO. : 5,976,214

DATED : Nov. 2, 1999

INVENTOR(S) : Kondoh et al.

It is certified that error appears in the above-identified patent and that said Letters Patent is hereby corrected as shown below:

Col. 23, Table 3, col. 6, under "Cr", No. 15, replace "a" by --0--;
          col. 7, under "Ti", No. 14, replace "a" by --0--;
          col. 8, under "Zr", No. 14, replace "a" by --0--.

Col. 27, Table 6, col. 2, under "Molding Surface Pressure", replace the heading "l/cm$^2$", by --t/cm$^2$--;

Col. 29, Table 6-continued, col. 2, under "Molding Surface Pressure", replace the heading "l/cm$^2$", by --t/cm$^2$--;

Col. 31, line 51, after "the", replace "exact compression" by --actual compressor--.

Col. 32, Table 8, col. 6, under the heading "Results of Continuous 100 hr. Durability Evaluation Test with Compressor", No. 14, after "on", replace "torward" by --forward--.

Col. 32, line 45, before "evaluation", replace "actual machine compressor" by --compressor machine--;

Col. 34, line 5, after "coefficient", replace "i" by -- $\mu$ --;

Cols. 33 and 34, Table 9, col. 16, No. 5, under the heading "Degree of Quenching", replace "5 x 10$^2$" by --8 x 10$^2$ --;
          No. 2, replace "2 x 10$^2$" by --2 x 10$^3$--;
          No. 2 replace "2 x 10$^2$" by --2 x 10$^3$--;
          following Table 9, No. 2, replace "-" (all three instances), by --→--;

Col. 35, Table 11, col. 1, under the heading "No.", replace "S" by --5--;

Col. 36, Table 10, col. 7, under the heading "Si + AlN Total Amount wt%", No. 14, replace "i0" by --10--;
          col. 8, under the heading "Transverse Rupture Strength MPa", No. 11, replace "6S0" by --650--.

Col. 36, Table 11, col. 6, in the heading, line 1, after "Results of", replace "Continous" by --Continuous--.

UNITED STATES PATENT AND TRADEMARK OFFICE
CERTIFICATE OF CORRECTION

PATENT NO. : 5,976,214

DATED : Nov. 2, 1999

INVENTOR(S) : Kondoh et al.

It is certified that error appears in the above-identified patent and that said Letters Patent is hereby corrected as shown below:

Col. 37, Table 11-continued", col. 6, in the heading, line 1, after "Results of", replace "Continous" by --Continuous--.

under the heading, No.21, replace "Vane" by --vane--;

Col. 37, line 49, after "in", replace "content" by --contact--;

Col. 38, line 28, after "coarsened", insert --,--;

Col. 40, Table 12, col. 10, under the heading "Density Ratio of Solidified Body", No. 19, replace "300" by --100--.

Col. 41, Table 13, col. 6, under the heading "Mean Diameter μm", No.12, replace "30" by ----;

col. 7, under the heading "Si + AlN Total Amount wt.%",

No. 12, replace "26" by --30--;

No. 18, replace "SO" by --50--;

No. 19, replace "s0" by --50--;

col. 8, replace the title to read: --Hardness $H_R$ - A--,

No. 12, replace "760" by --26--;

col. 9, No. 12, insert --760--;

Col. 41, Table 14, col. 4, under the heading "Abrasion Coefficient (μvalue)", No.3, replace "0.a6" by --0.06--;

Col. 42, Table 14, under the heading "Results of Continuous 100 hr. Durability Evaluation Test with Compressor", No. 13, after "during" insert --test--;

No. 16, after "during" insert --test--;

No. 18, after "during" insert --test--;

No. 19, after "during" insert --test--.

Col. 45, Table 15, col. 5, replace "Fe/N" by --Fe/Ni--;

col. 12, under the heading "Mg", No. 5, replace "0" by --0.07--;

following Table 15, line 2, replace "-" (all three instances), by --→--;

Col. 47, Table 17, col. 1, under the heading "No.", No. 15, replace "1s" by --15--;

Col. 50, Table 18, col. 9, replace the heading to read: --Si + AlN Total Amount wt%--;

UNITED STATES PATENT AND TRADEMARK OFFICE
CERTIFICATE OF CORRECTION

PATENT NO. : 5,976,214

DATED : Nov. 2, 1999

INVENTOR(S) : Kondoh et al.

It is certified that error appears in the above-identified patent and that said Letters Patent is hereby corrected as shown below:

Col. 51, line 50, after "actual", delete "the";
        line 60, after "material" insert --,--;
Col. 52, line 44, after "material" insert --,--
Col. 54, Table 20, col. 11, replace "Hardness $H_R \cdot A$" by --Hardness $H_R$ - A--;
Col. 55, line 19, (Claim 6, last line), replace "15% ≤ "$W_{Si+}$ $W_{AlN}$ ≤50%." by --15% ≤ "$W_{Si}$ + $W_{AlN}$ ≤50% --;
Col. 56, line 31, after "formula", replace "Al-a.Fe-b.Ni," by --Al-a · Fe-b · Ni,--;
        line 39, after "formula", replace "Al-a.Si-b.Fe-c.Ni," by --Al-a · Si-b · Fe-c · Ni,--;
        line 56, after "BN,", replace "$MOS_2$" by --$MoS_2$--
Col. 58, line 27, after "formula", replace "Al-a.Si-b.Fe-c.Ni-," by --Al-a · Si-b · Fe-c · Ni-,--;
        line 28, before "Mg", replace "d." by --d · --;
        line 29, after "a:", replace "10to" by --10 to--;
        line 30, after "b:", replace "2to" by --2 to--;
        line 31, after "c:", replace "2to" by --2 to--.

Signed and Sealed this

Thirty-first Day of October, 2000

Attest:

Q. TODD DICKINSON

*Attesting Officer*      *Director of Patents and Trademarks*